(12) United States Patent
Gotoh et al.

(10) Patent No.: US 9,282,250 B2
(45) Date of Patent: *Mar. 8, 2016

(54) PHOTOGRAPHY APPARATUS, CONTROL METHOD, PROGRAM, AND INFORMATION PROCESSING DEVICE

(71) Applicant: Sony Corporation, Tokyo (JP)

(72) Inventors: Tomohiko Gotoh, Kanagawa (JP); Daisuke Mochizuki, Chiba (JP); Miruka Ishii, Tokyo (JP); Tsunayuki Ohwa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,106

(22) Filed: Nov. 11, 2014

(65) Prior Publication Data

US 2015/0070513 A1    Mar. 12, 2015

Related U.S. Application Data

(63) Continuation of application No. 12/264,761, filed on Nov. 4, 2008, now Pat. No. 8,917,326.

(30) Foreign Application Priority Data

Nov. 5, 2007  (JP) ................................ P2007-287517

(51) Int. Cl.
*H04N 5/225*  (2006.01)
*H04N 5/232*  (2006.01)
(Continued)

(52) U.S. Cl.
CPC ....... *H04N 5/23293* (2013.01); *H04N 1/00132* (2013.01); *H04N 1/00183* (2013.01); *H04N 1/00973* (2013.01); *H04N 5/23222* (2013.01); *H04N 2101/00* (2013.01)

(58) Field of Classification Search
CPC ........................ H04N 5/23222; H04N 1/00183
USPC .......... 348/207.1, 207.2, 239, 333.12, 333.01
See application file for complete search history.

(56) References Cited

U.S. PATENT DOCUMENTS

| | | | |
|---|---|---|---|
| 7,898,572 B2 | 3/2011 | Edwards et al. | |
| 8,073,287 B1 | 12/2011 | Wechsler et al. | |

(Continued)

FOREIGN PATENT DOCUMENTS

| | | |
|---|---|---|
| JP | 10-66005 | 3/1998 |
| JP | 2001-94916 | 4/2001 |

(Continued)

*Primary Examiner* — Antoinette Spinks
(74) *Attorney, Agent, or Firm* — Hazuki International, LLC

(57) ABSTRACT

A photography apparatus includes: an imaging unit configured to image a subject and acquire photographed image data; a display unit configured to perform an image display; and a control unit; wherein the control unit executes reading processing for reading out, from a storage medium which stores template information arranged to fit and display photographed image data imaged by the imaging unit into a target region within display screen data according to a predetermined display format, the template information, wherein instruction information for instructing what sort of image should be photographed as the photographed image data to be fit and displayed in the target region is correlated therewith, and instruction information display control processing for controlling the display unit so as to display the instruction information in a correlated manner with the target region, in accordance with the template information.

11 Claims, 34 Drawing Sheets

(51) Int. Cl.
  *H04N 1/00* (2006.01)
  *H04N 101/00* (2006.01)

(56) References Cited

U.S. PATENT DOCUMENTS

| | | |
|---|---|---|
| 2001/0048802 A1 | 12/2001 | Nakajima et al. |
| 2003/0081266 A1 | 5/2003 | Seaman et al. |
| 2003/0169350 A1 | 9/2003 | Wiezel et al. |
| 2003/0215144 A1 | 11/2003 | Kito et al. |
| 2004/0125423 A1 | 7/2004 | Nishi et al. |
| 2005/0172147 A1 | 8/2005 | Edwards et al. |
| 2008/0136918 A1 | 6/2008 | Yamazaki et al. |
| 2008/0136919 A1 | 6/2008 | Tsuji |

FOREIGN PATENT DOCUMENTS

| | | |
|---|---|---|
| JP | 2002-77691 | 3/2002 |
| JP | 2003-79937 | 3/2003 |
| JP | 2004-15247 | 1/2004 |
| JP | 2004-30118 | 1/2004 |

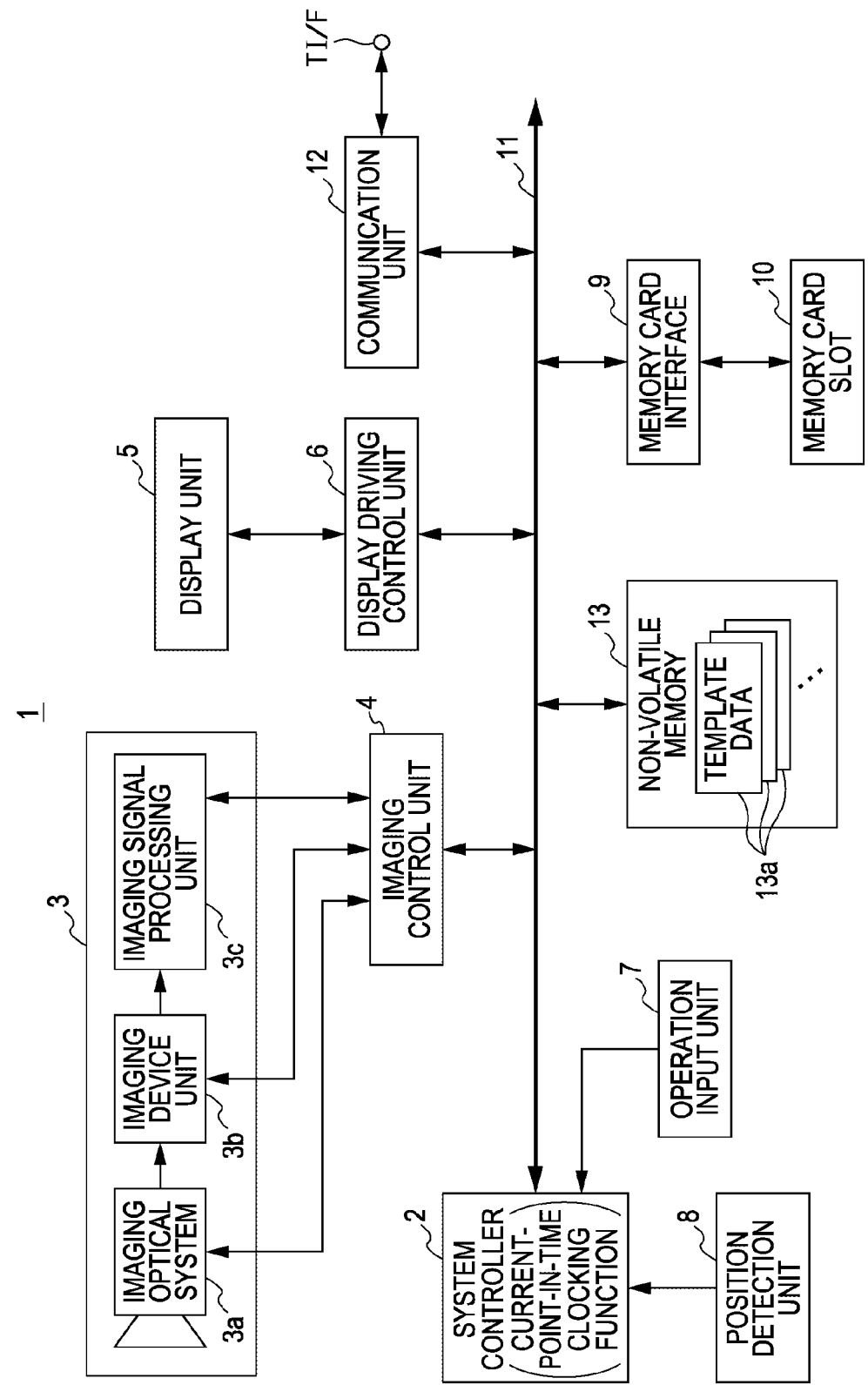

FIG. 3A

```
<title>09,13,2005 - 09,18,2005</title>
<theme>TOUR OF PLACES OF INTEREST OF ROME</theme>
<category>TRAVEL GUIDE</category>
<datas>
  <data name="img_background" type="image">data/background.jpg</data>
  <data name="img_text_bg" type="image">data/text_bg.png</data>
  <data name="img_colosseum-sample" type="image">data/colosseum.jpg</data>
  <data name="img_trevi-sample" type="image">data/trevi.jpg</data>

<data name="text_colosseum" type="text">
  THE COLOSSEUM IS AN AMPHITHEATER THAT WAS COMPLETED IN THE YEAR 80 BC. CAPABLE OF HOLDING 50,000 SPECTATORS, VARIOUS
  TYPES OF COMPETITIONS AND GLADIATOR FIGHTS WERE HELD HERE. ABOUT A ONE MINUTE WALK FROM THE SUBWAY STATION "COLOSSEO".
  </data>
  <data name="text_trevi" type="text">
  THE TREVI FOUNTAIN IS THE LARGEST BAROQUE PERIOD FOUNTAIN IN ROME. LEGEND HAS IT THAT IF YOU THROW A COIN OVER YOUR
  SHOULDER INTO THE FOUNTAIN, YOU CAN RETURN TO ROME AGAIN. ABOUT EIGHT MINUTES BY FOOT FROM THE SUBWAY STATION "BARBERINI".
  </data>
  <data name="map_colosseum" type="component map">
    <param gpoint="cx1,cy1" zoom="zz" flags="x1,y1"/>
  </data>
  <data name="map_trevi" type="component map">
    <param gpoint="cx2,cy2" zoom="zz" flags="x2,y2"/>
  </data>
</datas>

<background ref="img_background"/>
  <object rect="20,130,300,80" ref="img_text_bg"/>
  <object rect="20,130,300,80" ref="text_colosseum"/>
  <object rect="330,20,300,100" ref="map_colosseum"/>
  <object rect="20,20,300,100" ref="photo0" ref_default="img_colosseum-sample" target="yes"/>

<background ref="img_background"/>
  <object rect="20,130,300,80" ref="img_text_bg"/>
  <object rect="20,130,300,80" ref="text_trevi"/>
  <object rect="330,20,300,100" ref="map_trevi"/>
  <object rect="20,20,300,100" ref="photo1" ref_default="img_trevi-sample" target="yes"/>

| TARGET ID (photo ID) | ID OF PHOTOGRAPHED IMAGE |
|---|---|
|  |  |
| ..... | ..... |

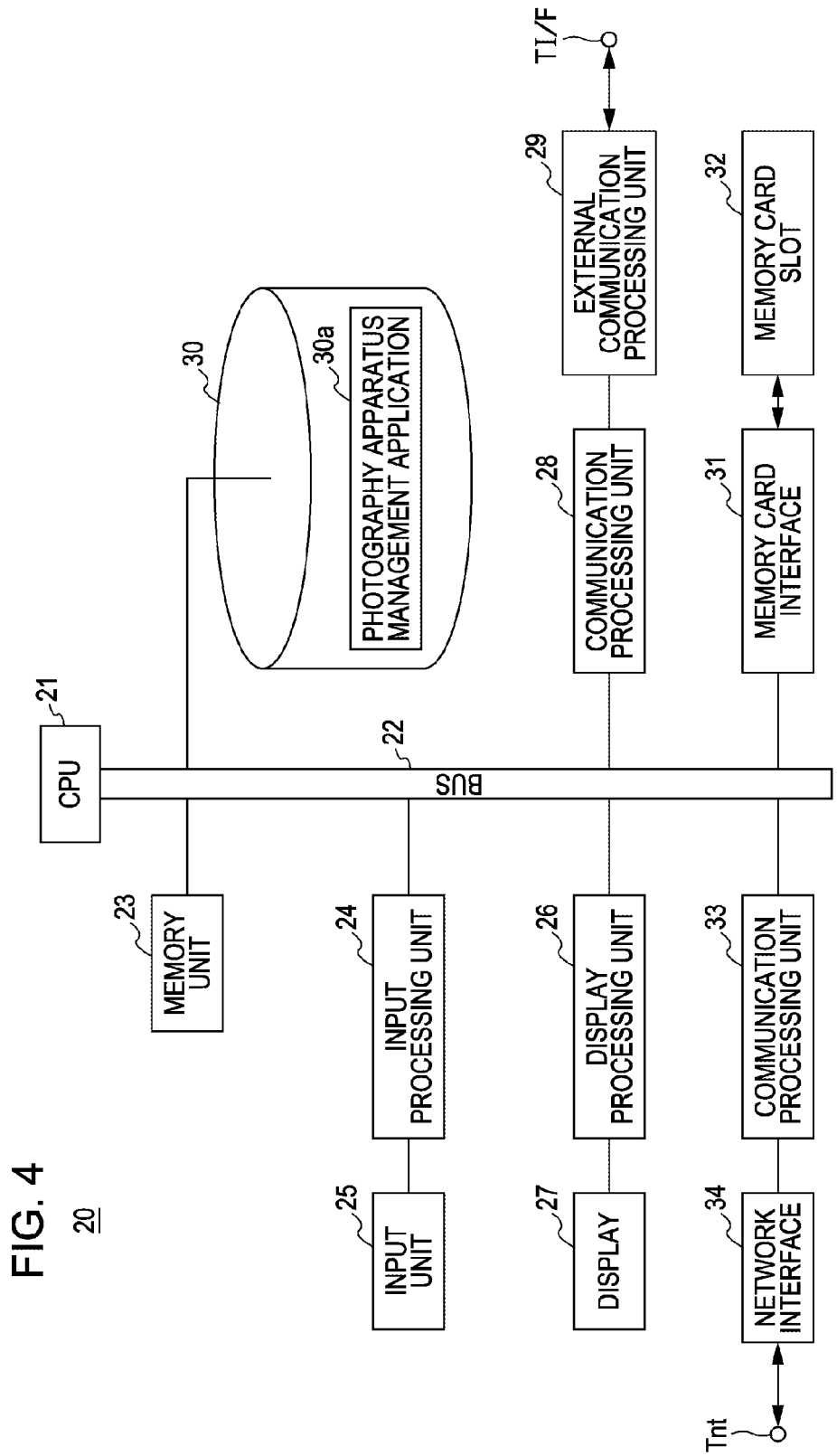

FIG. 18

| TARGET ID | MATCHING ITEM | MATCHING REFERENCE INFORMATION |
|---|---|---|
| 1 | POSITION | POSITION INFORMATION |
| 2 | POINT-IN-TIME | POINT-IN-TIME INFORMATION |
| 3 | COLOR OF IMAGE | COLOR RANGE INFORMATION |
| 4 | PERSON (FACE) | FACIAL DATA |
| ⋮ | ⋮ | ⋮ |
| n | INTER-IMAGE DISTANCE | IMAGE FEATURE DATA |

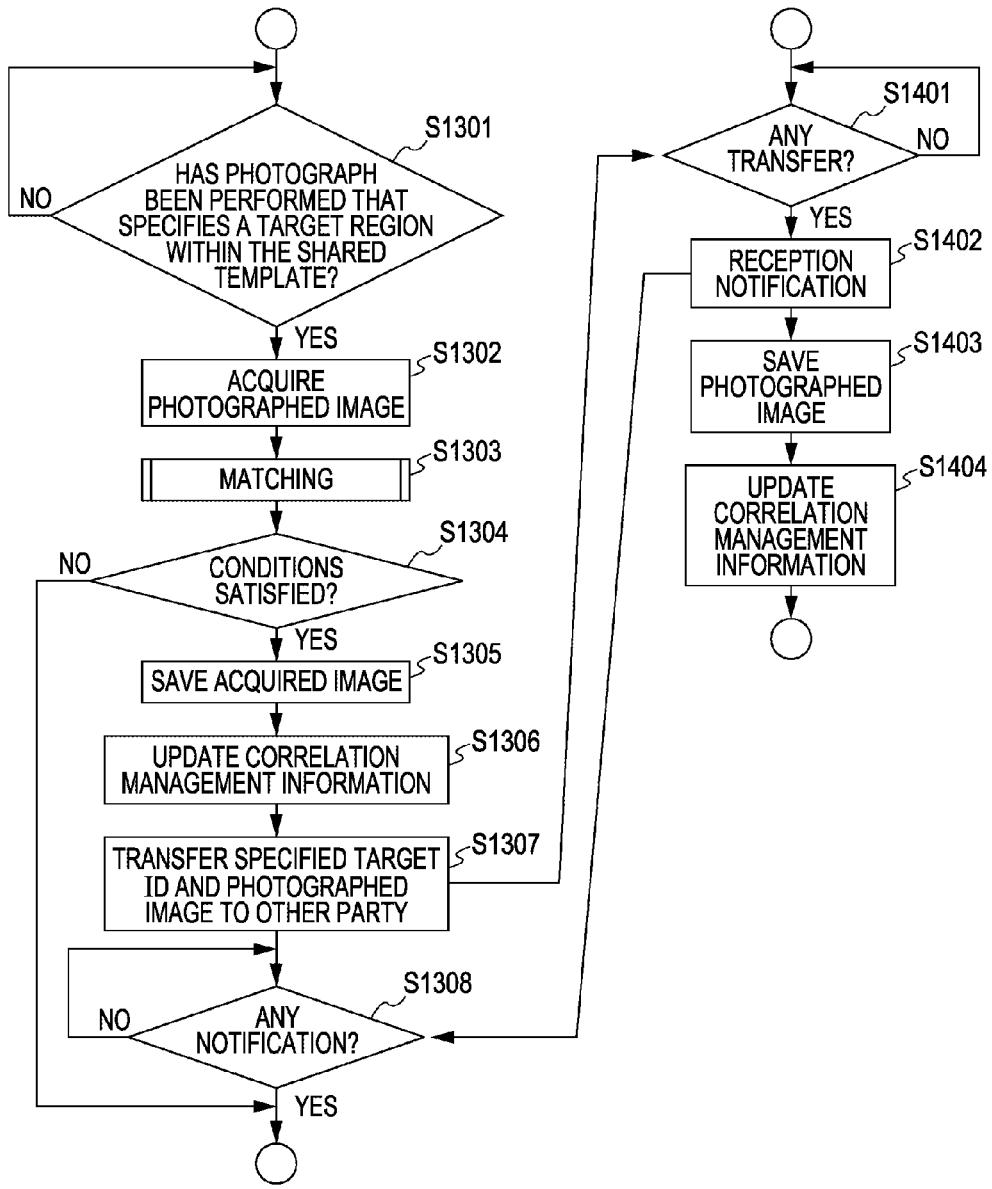

PHOTOGRAPHY APPARATUS, CONTROL METHOD, PROGRAM, AND INFORMATION PROCESSING DEVICE

CROSS REFERENCES TO RELATED APPLICATIONS

This is a continuation of application Ser. No. 12/264,761, filed Nov. 4, 2008, which is based upon and claims the benefit of priority from prior Japanese Patent Application No. 2007-287517, filed Nov. 5, 2007, the entire contents of both of which are incorporated by reference.

BACKGROUND OF THE INVENTION

1. Field of the Invention

The present invention relates to a photography apparatus and control method thereof, a program, and an information processing device and control method thereof.

2. Description of the Related Art

Digital still cameras which image subjects using imaging devices such as CCD (Charge Coupled Device) sensors and CMOS (Complementary Metal Oxide Semiconductor) sensors for example, and save the imaged images as digital data, have come into widespread use.

Generally, a digital still camera has a display whereby an imaged image obtained by an imaging device can be displayed in real time, whereby the user can confirm in real time what sort of imaged image is being obtained. Also, data acquisition/saving of the photographed image can be instructed by performing shutter operations while confirming the displayed image. Further, photographed image data that has been acquired/saved can be confirmed on the spot using such a display. Digital still cameras are superior to film cameras used heretofore in such points, for example.

Description of related art can be found in, for example, Japanese Unexamined Patent Application Publication No. 2001-94916.

SUMMARY OF THE INVENTION

However, digital still cameras still have the following problems.

1) How to take a subject depends on the user who is the photographer, so images taken by the same user tend to repeat the same pattern.

2) While there are a wide range of camera functions and photography can be performed which is appropriate for various photography conditions, users who are not familiar with the camera apparatus in particular do not sufficiently understand which function to use at what timing, and consequently the functions of the camera apparatus are not fully used.

3) Image data saved at the digital still camera main unit side can be transferred and saved in a personal computer or the like, but organizing and editing work (such as renaming files) of image data takes time and is troublesome, and as a result, photographed images tend to be often saved in an unorganized manner.

4) Images being saved in an unorganized manner means that when a user desires to browse the photographed images again, the images are not efficiently viewed as memories with a story.

There has been realized demand for a photography apparatus and information processing device wherein the above issues have been addressed.

A photography apparatus according to an embodiment of the present invention includes an imaging unit configured to image a subject and acquire photographed image data, a display unit configured to perform an image display, and a control unit. The control unit executes reading processing for reading out, from a storage medium which stores template information arranged to fit and display photographed image data imaged by the imaging unit into a target region within display screen data according to a predetermined display format, the template information, wherein instruction information for instructing what sort of image should be photographed as the photographed image data to be fit and displayed in the target region is correlated therewith. Instruction information display control processing is performed for controlling the display unit so as to display the instruction information in a correlated manner with the target region, in accordance with the template information.

An information processing device according to an embodiment of the present invention includes a storage unit configured to store template information arranged to fit and display photographed image data imaged by the imaging unit into a target region within display screen data according to a predetermined display format, wherein instruction information for instructing what sort of image should be photographed regarding the photographed image data to be fit and displayed in the target region is correlated therewith, and photographed image data. The information processing device also includes a control unit configured to correlate the target region and the photographed image data, such that photographed image data stored in the storage unit is fit and displayed as to the target region in the screen displayed on a suitable display unit in accordance with the template information stored in the storage unit.

According to the above configuration, instruction information indicating what sort of image to take is displayed at the photography apparatus. Such a photography apparatus which displays this instruction information can motivate the user to take photographs.

Also, display screen forms or templates, for fitting photographed image data into, are provided as the template information. These are forms for display screens to display photographed image data image target regions at the time of viewing, to which photographed images have not yet been fit. Photographs that are taken are fit into the target regions of the forms.

Such a configuration does away with the load of organizing photographs following photography, and saving of unorganized photographed images can be effectively prevented.

Instruction information for instructing what sort of photograph should be taken can be presented to the user with the photography apparatus, so photographs can be prevented from becoming monotonous.

Also, enabling instruction information to be displayed at a camera apparatus enables the user to perform photography based on the instruction information, and accordingly the user will be provided with more chances to use the various functions of the camera device through photography of various subjects based on such instruction information, and eventually, the user can be led to use such functions in a natural manner.

Also, by displaying a screen in a display format wherein photographed images have not yet been filled in, as a template, provides the user with motivation to fill in the images based on the instruction information, i.e., motivation for photography.

Also, a technique is employed wherein a form for displaying images at the time of viewing is provided beforehand as a template, and photographed images are fit therein, whereby post-photography image organizing becomes unnecessary, and saving unorganized photographed images can be prevented. Consequently, when a user desires to browse the imaged images again, the images can be efficiently viewed as memories with a story.

Also, by transferring the template information and photographed image data from the photography apparatus to the information processing device allows photographed image data to be correlated to the target regions at the information processing device side, as well.

BRIEF DESCRIPTION OF THE DRAWINGS

FIG. 2 is a block diagram illustrating an example of the internal configuration of a photography apparatus as an embodiment;

FIGS. 3A and 3B are diagrams for describing display data layout management information and correlation management information;

FIG. 4 is a block diagram illustrating an example of the internal configuration of an information processing device as an embodiment;

FIG. 18 is a diagram illustrating an example of the configuration of matching condition management information;

FIG. 33 is a flowchart illustrating processing operations to be executed in the event of real-time sharing of photographed images between photography apparatuses.

DESCRIPTION OF THE PREFERRED EMBODIMENTS

Preferred embodiments of the present invention will now be described.

First Embodiment

Configuration of Image Photographing/Viewing System

Figure 1:
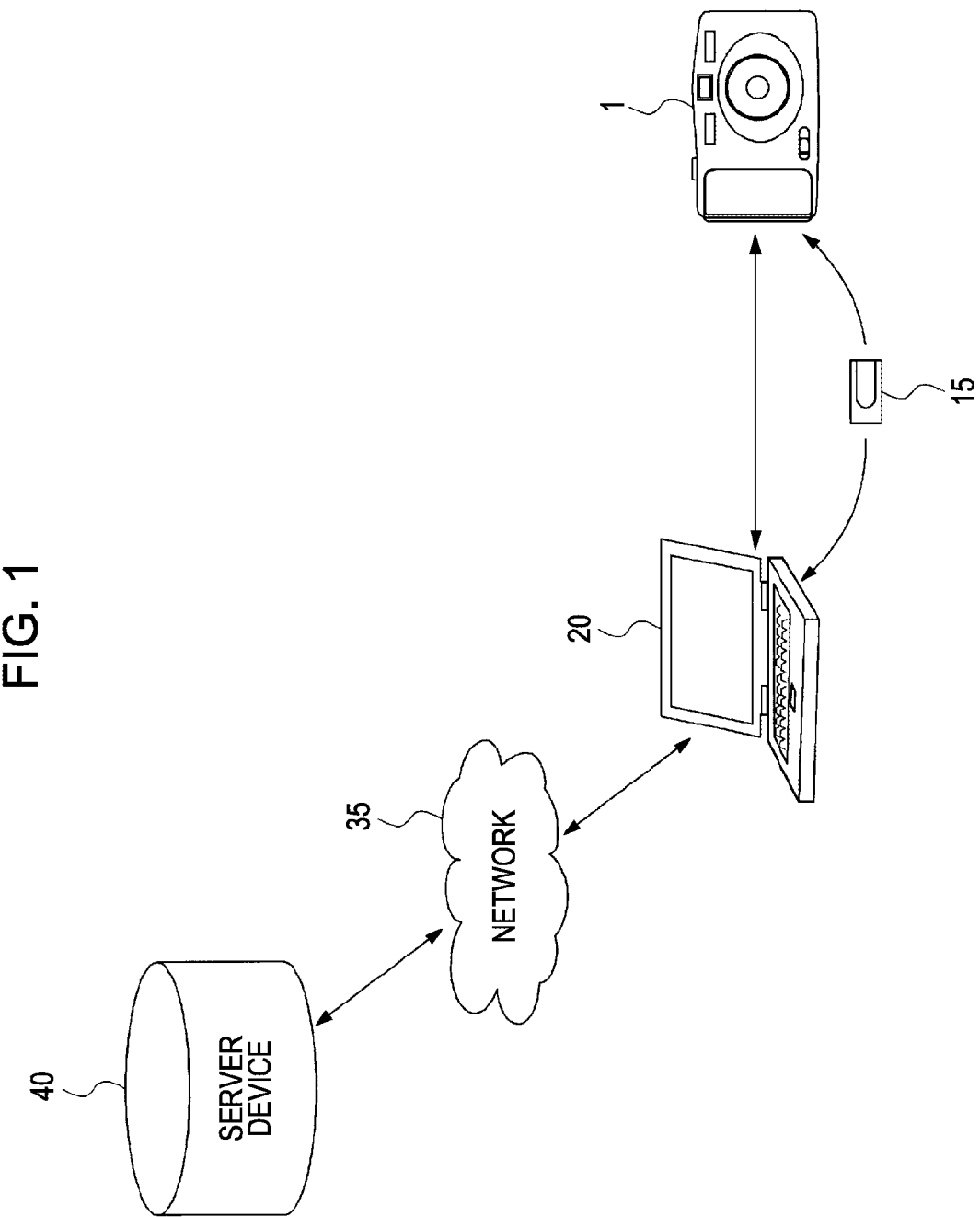
FIG. 1 is a diagram for describing the overview of an image photographing/viewing system configured including a photography apparatus and a personal computer, as an embodiment.

FIG. 1 is a diagram illustrating the configuration of an image photographing/viewing system serving as an embodiment of the present invention. The image photographing/viewing system according to the present embodiment includes at least a photography apparatus 1, personal computer 20, network 35, and server device 40.

The photography apparatus 1 is a digital still camera, having components such as a camera lens for photographing subjects, an imaging device such as a CCD (Charge Coupled Device) sensor or CMOS (Complementary Metal Oxide Semiconductor) for obtaining image data based on an imaged image, and a display unit for displaying photographed image data and so forth. Also provided are various types of operating elements, such as a shutter button for instructing acquisition/saving of imaged image data, a D-pad and enter key for selecting and entering of various types of items, and so forth.

The personal computer 20 is a device principally for acquiring image data saved by the photography apparatus and for viewing image data that has been acquired. Acquisition of the photographed image data from the photography apparatus 1 can be performed by way of a memory card 15 shown in the drawing, or by communication via a suitable communication cable such as a USB (Universal Serial Bus) cable. Also, the personal computer 20 also has a function of downloading template data stored in the server device 40 (described later) via the network 35, and transferring to the photography apparatus 1 via the memory card 15 or communication cable.

Template data is stored in the server device 40. The server device 40 can be expected to be managed by a service provider or the like, and the template data stored in the server device 40 can be expected to frequently be updated to include new template data.

Overview of Templates

Now, in advance of description of the components of the system, the concept of templates used with the image photographing/viewing system according to the present embodiment will be described with reference to FIGS. 10 and 11.

First, templates in the present embodiment are a layout of photographs to be taken and fit in, in accordance with a certain theme, a layout of instruction information to be displayed correlated with each image taken, and further a layout of other data such as background art decorating the background. As a specific example, the screen shown exemplarily in FIGS. 10 and 11 is a display screen example within a template of which the theme is "Tour of places of interest of Rome". In this overall template, there are provided regions, for displaying photographs to be taken later (target region A1 in the drawings) for each subject following themes such as "Colosseum" (FIG. 10) and "Trevi Fountain" (FIG. 11), and display regions to display instruction information correlated with the images (text display region A2 and so forth).

Figure 10:
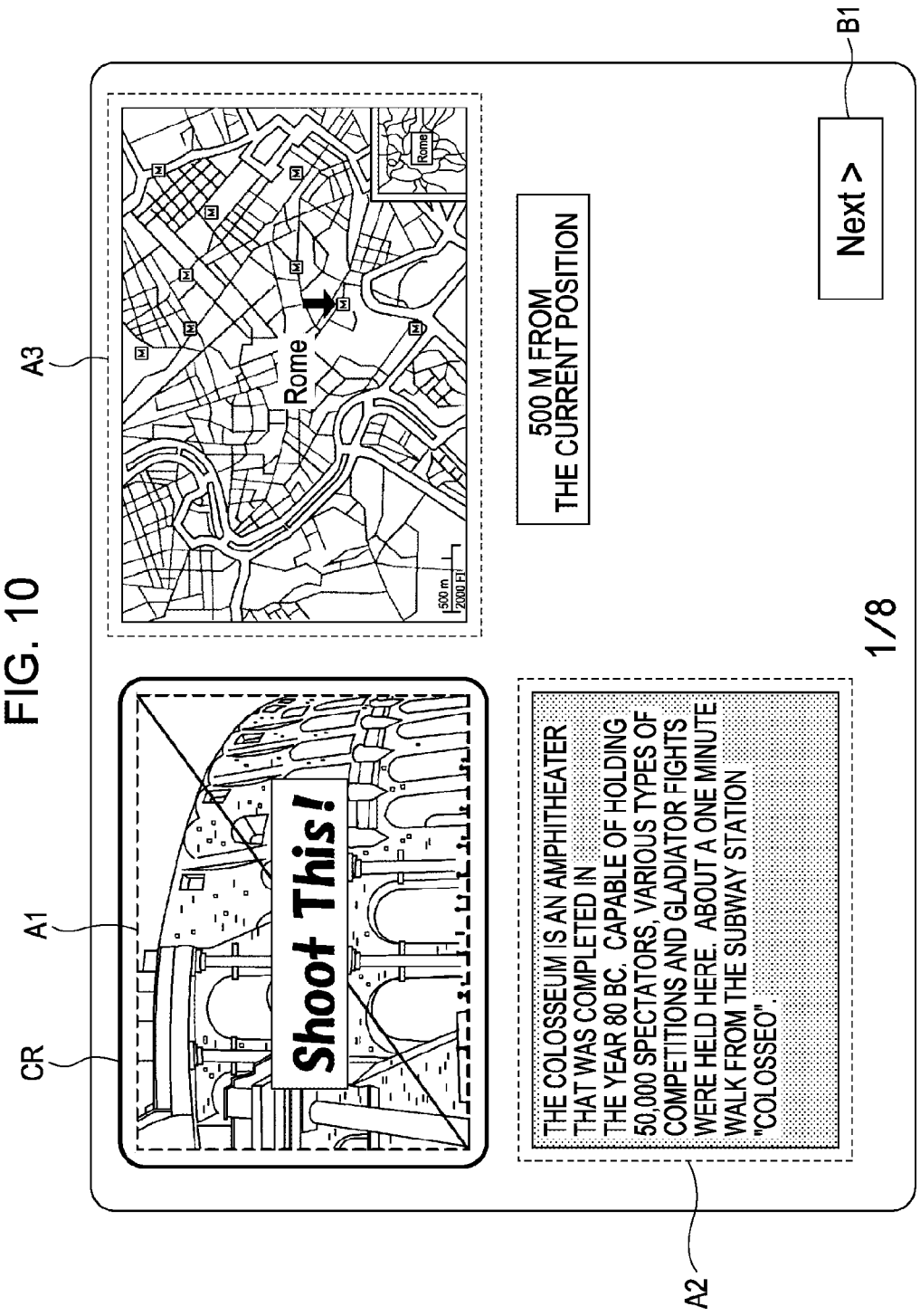
FIG. 10 is a diagram illustrating a configuration example of a page screen of a template.
Figure 11:
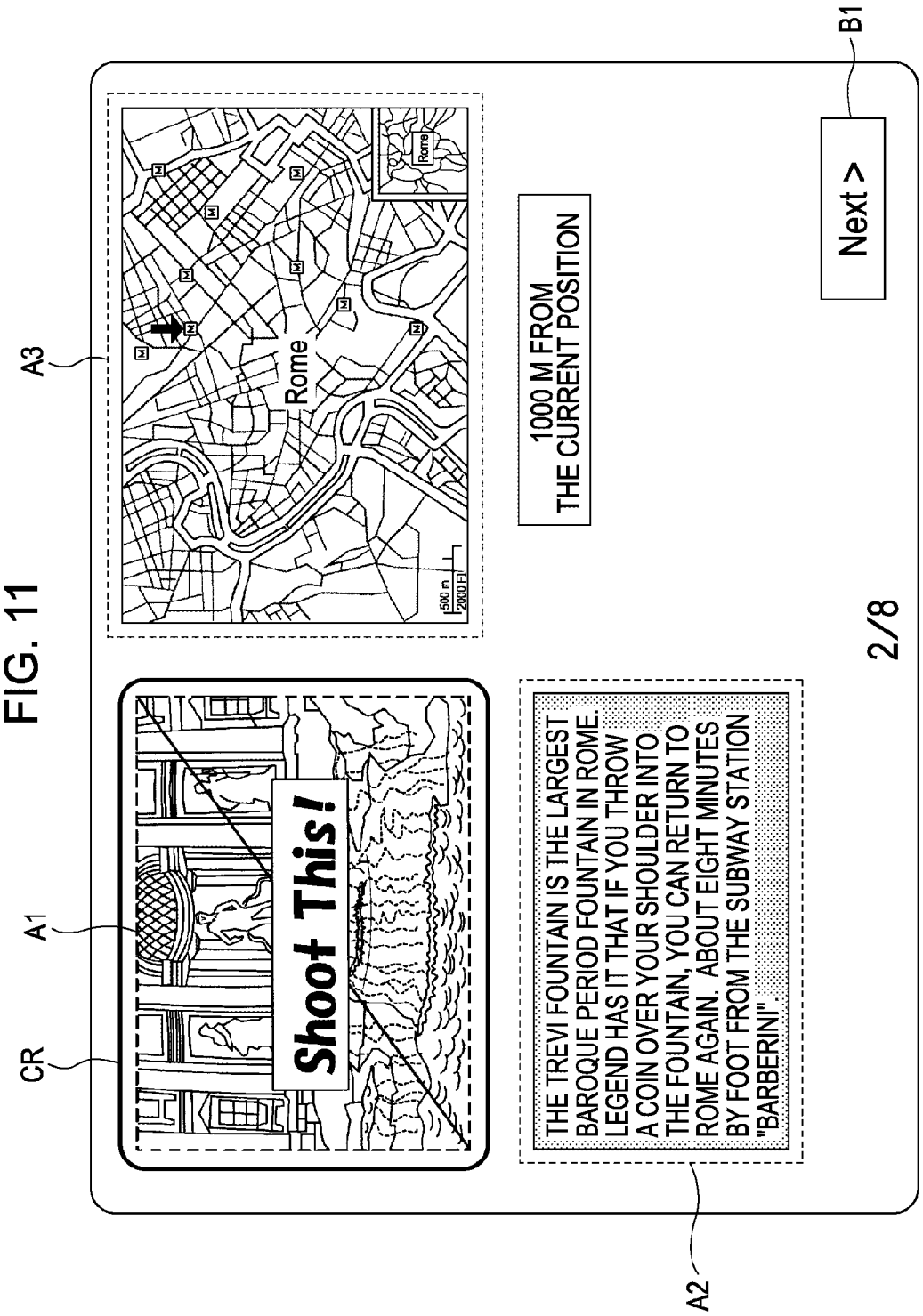
FIG. 11 is another diagram illustrating a configuration example of a page screen of a template.

With the template in this example, one page is appropriated to each subject, with page 1 being the "Colosseum" shown in FIG. 10, page 2 being the "Trevi Fountain" shown in FIG. 11, and page 3 being something else, for example. The images for each theme are fit into each page. In this case, the template for "Tour of places of interest of Rome" is exemplarily shown as being configured of a total of eight pages.

Specific configuration of each page screen of the template will now be described. Each page screen has a target region A1, text display region A2, and location display region A3, as shown in FIGS. 10 and 11.

The target region A1 is a region set aside for fitting in image data obtained by photography operations later by the user. In FIGS. 10 and 11, a screen configuration is exemplarily illustrated in a state wherein no photographed image has yet been fit into the target region A1. In the example in this case, predetermined image data is correlated to the target region A1 beforehand. Specifically, a sample image of a photograph to be taken and fit into the target region A, and also a message (the message "Shoot This!" in the drawing, for example) for prompting the user to take such a photograph, are displayed in this case.

While all that has to be displayed in the target region A1 is something indicating that the photograph for the target region A1 has not been taken yet (e.g., a message of "No Data" or the like), it can be said that a sample image and a message such as "Shoot This!" for prompting the user to take such a photograph might further motivate the user to that end.

Also, the text display region A2 displays text information as an explanation regarding the subject of the image to be fit and displayed in the target region A1.

Moreover, the location display region A3 displays map information (which may include aerial photographs) including the location of the subject, with a mark indicating the location of the subject being shown in the map. Further, with the example in these drawings, a case wherein the current position of the user holding the photography apparatus 1 is also shown, is exemplarily illustrated.

Now, in a screen within a template such as exemplarily described above, the sample image displayed in the target region A1 represents a photographing example of the subject, gives the user an idea of how a photographed image should look, and serves as instruction information to instruct the user what sort of image should be photographed.

Also, information in the form of text that is displayed in the text display region A2 gives the user an idea of how a photographed image should look by describing the subject, and serves as instruction information to instruct the user what sort of image should be photographed. This information might also be directly instructive information on what sort of photograph to take, such as "Shoot so-and-so".

Also, the location information of the subject displayed on the map in the location display region A3 is information instructing the user where the subject should be photographed, more particularly from which position the subject should be photographed, and serves as instruction information to instruct the user what sort of image should be photographed.

Alternatively, the user can view the above information comprehensively as information on what sort of image should be photographed.

A template is realized based on various types of display data making up the screen of the template, such as screen background images and data serving as instruction information to be displayed in each of the target region A1, text display region A2, and location display region A3, and management data for display control which defines the layout of each display data on the screen (i.e., the layout of the regions A1 through A3). This management information is later-described display data layout management information.

Hereinafter, data including the display data and management information for display control, serving as data to realize the template in this way, will be referred to as "template data".

Now, with the present example, template data for realizing templates for each theme are held in the photography apparatus 1, and specified templates are displayed in accordance with user operations, a point which will be described later as well. Accordingly, the user can be provided with instruction information to motivate photography, and the user can be instructed what sort of images to photograph.

The image data that has been photographed based on the instruction information is then correlated such that the image data is displayed fit into the corresponding target region A1. Accordingly, photographed image data can be organized and saved according the theme of each template, without the user having to perform troublesome image organizing.

Internal Configuration Example of Photography Apparatus

FIG. 2 is a block diagram illustrating an example of the internal configuration of the photography apparatus 1 shown in FIG. 1. As shown in FIG. 1, the photography apparatus 1 has a system controller 2, an imaging unit 3, an imaging control unit 4, a display unit 5, a display driving control unit 6, an operation input unit 7, a position detection unit 8, a memory card interface 9, a memory card slot 10, a bus 11, a communication unit 12, and non-volatile memory 13.

The system controller 2 is configured of a microcomputer having, for example, a CPU (Central Processing Unit), ROM (Read Only Memory), RAM (Random Access Memory), and an interface unit, and serves as a control unit controlling the entirety of the photography apparatus 1. This system controller 2 performs various types of computation processing, and exchanges information with various components of the photography apparatus 1 over the bus 11, based on programs held in the aforementioned internal ROM, so that the various components perform the predetermined operations thereof. The system controller 2 also has a function for keeping the current point-in-time, as indicated by "current point-in-time clocking function" in FIG. 2. The system controller 2 in this case has a function of clocking the current point-in-time in year/month/day/hour/minute/second, as the current point-in-time clocking function shown in the drawing.

The imaging unit 3 has an imaging optical system 3a, an imaging device unit 3b, and an imaging signal processing unit 3c. The imaging optical system 3a of the imaging unit 3 includes the aforementioned camera lens, a driving system for carrying out focusing operations and zoom operations with the camera lens, and so forth. The imaging device unit 3b of the imaging unit 3 has a solid-state imaging device array for generating imaging signals by performing photoelectric conversion. Examples of solid-state imaging device arrays include CCD sensor arrays and CMOS sensor arrays.

The imaging signal processing unit 3c of the imaging unit 3 has a sample hold/AGC (Automatic Gain Control) circuit for performing gain adjustment and waveform shaping on signals obtained by the solid-state imaging device, and a video A/D converter, whereby imaged image data, which is digital data, is obtained. The imaging signal processing unit 3c also performs processing on the imaged image data such as white balance processing, luminance processing, chrominance signal processing, and so forth. Thus, the imaging unit 3 having the above-described imaging optical system 3a, imaging device unit 3b, and imaging signal processing unit 3c performs imaging, whereby imaged image data is obtained.

The image data obtained by the imaging operation of the imaging unit 3 is processed at the imaging control unit 4. The imaging control unit 4 performs processing such as image compression processing for compressing the image data by various compression rates, image size conversion processing, image format conversion processing, and so forth, and also performs processing for transferring the image data to the components connected via the bus 11 (display driving control unit 6, memory card interface 9, etc.), as necessary.

Also, based on instructions from the system controller 2, the imaging control unit 4 performs on/off control of imaging operations at the imaging unit 3, shutter processing, driving control of the zoom lens and focus lens of the imaging optical system 3a, control of the sensitivity and frame rate of the imaging device unit 3b, parameter control and execution processing of the various processes of the imaging signal processing unit 3c, and so forth.

The configuration for performing display as to the user with the photography apparatus 1 includes the display unit 5 and display driving control unit 6. The display unit 5 has a display panel unit such as a liquid crystal display or the like formed. Also, the display driving control unit 6 displays a predetermined display image by performing driving control of the display unit 5, under control of the system controller 2. The display driving control unit 6 is provided with a display driving unit for performing display driving of the display panel unit at the display unit 5. The display driving unit is configured of a pixel driving circuit for performing image display on the display panel unit. The pixel driving circuit applies driving signals based on video signals for each pixel arrayed in matrix fashion on the display panel unit, at predetermined horizontal/vertical driving timings each, thereby executing display.

Real-time display (monitor display) of the image imaged with the imaging unit 3 display of a playback image with regard to photographed image data that has been saved in the memory card 15 mounted to the later-described memory card slot 10, and so forth, are executed by driving control of the display panel unit by the display driving control unit 6.

Also, the display driving control unit 6 can perform luminance level adjustment, color correction, contrast adjustment, sharpness (outline enhancement) adjustment, and so forth, for the display described above. Further, the display driving control unit 6 can perform image effect processing such as generating an enlarged image wherein a part of the image data has been enlarged, or generating a reduced image, soft focusing, mosaic, luminance inversion, partial highlighting (enhanced display) of a part of the image, changing the atmosphere of the overall color, and so forth.

The operation input unit 7 has operating elements, such as for example, keys, buttons, dials, or the like, and has operating elements for predetermined input operations, such as power on/off operations, shutter operation, zoom operation, and moreover D-pad and enter key for selecting and entering buttons (icons) on the screen, which will be described later. The operation input unit 7 supplies information obtained from such operating elements to the system controller 2, and the system controller 2 performs appropriate computation processing and control corresponding to such information.

The position detection unit 8 has a GPS (Global Positioning System) antenna, and detects the current position. The position detection unit 8 detects at least latitude and longitude information as information of the current position, based on the arrival time of airwaves sent from an unshown GPS satellite that are received by the GPS antenna. The current position information detected by the position detection unit 8 is supplied to the system controller 2.

The memory card interface 9 performs recording to and playing from the memory card 15 mounted to the memory card slot 10. Note that the term "memory card" as used here refers to a card-type storage medium having solid-state memory such as flash memory. The memory card interface 9 performs recording to and playing from the memory card 15 regarding photographed image data and other types of data, based on control of the system controller 2.

The communication unit 12 is provided as a member for performing data communication with external devices. In this case for example, the communication unit 12 connects with an external device (in particular, the personal computer 20 shown in FIG. 1) using an interface such as USB or the like, and exchanges data. Specifically, with the communication unit 12 in this case data communication is performed with an external device connected via a USB cable connected to the interface terminal TI/F in FIG. 2. The communication unit 12 allows photographed image data stored in the memory card 15 after photography to be transferred to the personal computer 20 or other external devices.

The non-volatile memory 13 is memory which can continue to hold data even if electric power supply is cut off, and is provided for holding various types of data. In the case of this example in particular, template data 13a for realizing templates as described earlier is stored in this non-volatile memory 13. An arrangement can be conceived wherein template data 13a stored in the non-volatile memory 13 beforehand is preset template data of themes which a wide range of users would feel is acceptable to use, for example.

Now, as described earlier, template data 13a is configured including display data layout management information (management information for display control) for realizing the display form as a template, and display data (the instruction information and screen background art and so forth, described above) serving as parts making up the screen.

Now, with the case of the present example, this display data layout management information is realized with relatively versatile XML (eXtensible Markup Language). An example thereof is shown in FIG. 3A, where it can be seen that in this case of display data layout management information, one template is managed with one file. That is to say, in the case of FIGS. 10 and 11 described earlier, one file is information for managing the display form for the entire eight pages worth within the template.

In FIG. 3A, first, "title", "theme", and "category" are information representing the title, theme, and category of that template. The "category" represents the category, to which the template belongs, "theme" represents the theme of the template, and "title" represents the file name which the user has given to the template of a certain theme.

For example, in the case of the template with the theme "Tour of places of interest of Rome" as shown in FIGS. 10 and 11, "category" will be "travel guide" or the like. Also, there may be cases wherein templates with the same theme may be saved as separate files according to the photography date, a point which will be described later. Accordingly, with the present example, the template can be given a file name such that the date can be differentiated from templates with the same theme. The "title" also functions as information for representing separate files for templates with the same theme in this way.

Also, the ID ("ref=") of data to be displayed for each display region ("object rect=") is defined for each page in the display data layout management information. For example, "map_colosseum" is correlated with the display region "330, 20,300,100", representing that a map image representing the location of the Colosseum, such as shown in FIG. 10 for example, should be displayed in the display region "330,20, 300,100".

Now, with the display data layout management information in this case, the data to be displayed in each display region is managed by a unique ID, while the actual entity of the data which each ID indicates is managed by <data>. Specifically, with regard to the ID of the "img_closseum-sample" described in <object> in page 1, "colosseum.jpg" which represents the actual entity of the data to be actually displayed (file name in this case) is described in <data>, so the data to be displayed can be determined by tracing the information of <data> from the information of the ID described in <object>.

The reason such a management technique is used for managing the display data is because a situation can be readily assume wherein the same data is repeatedly used, such as images used in common for each page (as with background images, for example).

Also, with the display data layout management information, attribute information of 'target="yes"' is added separately to the display region which is target region A1 in particular. In this case, attribute information of 'target="yes"' is added correlated with the region "20,20,300,100", meaning that the region "20,20,300,100" should be the target region A1.

Image data to be displayed in a display region regarding which 'target="yes"' holds as above is managed by a photoID such as "photo0" or "photo1" as shown in the drawing. Note however, that this photoID is not an ID appropriated to the photographed image data, but is information for linking with the ID appropriated to the photographed image data. In this case, the actual correlation of the photographed image data as to the target region A1 is performed using the correlation management information such as shown in FIG. 3B.

In FIG. 3B, the correlation management information is information representing the ID of the photographed image data for each photoID correlated with the target region A in the display data layout management information such as described above. Now, as can be understood from the above description, a photoID is information correlated with a target region A1 in a one-on-one manner, so hereinafter, this photoID will be referred to as "target ID".

In FIG. 3B, in the event that photographed image data has been acquired and saved by a shutter operation, the ID of the photographed image is an ID which the system controller 2 assigns to the saved image data, and the saving destination of the photographed image data is managed by this ID and the saving destination of the photographed image being correlated. That is to say, the ID of the photographed image is an ID assigned by a general photographed image management process.

Note that the correlation management information shown in FIG. 3B is provided separately for each project, so as to handle the fact that multiple projects exists as to the same template theme. That is to say, projects of the same theme use the same template, and accordingly different projects have the same target ID of each target region A1 therein. In other words, the information of the target ID is insufficient to determine which target A1 in which project. Accordingly, correlation management information is provided in increments of projects. Thus, target IDs can be managed separately according to the projects.

Template display processing and processing for correlating photographed images, performed using the display data layout management information and correlation management information shown in FIGS. 3A and 3B will now be described. First, at the time of displaying a template, processing is performed wherein display data for each display region within a specified page within the template is obtained, with reference to the display data layout management information shown in FIG. 3A. Note however, with the target region A1, the ID of the image data to be fit into and displayed in the target region A1 is obtained by referencing the correlation management information shown in FIG. 3B, based on the photoID correlated with the target region A1.

Accordingly, in a state wherein the photographed image to be fit into the target region A1 has not yet been photographed, information of the ID of the photographed image data is not correlated to the target ID of the target region A1 in the correlation management information in FIG. 3B. In the event that no ID of photographed image data has been found to have been correlated with the target ID as a result of referencing the correlation management information in this way, a sample image correlated with the target region A1 in the display data layout management information is obtained.

Specifically, with regard to page 1 shown in FIG. 3A (), the sample image data of the Colosseum ("colosseum.jpg" in <data>) identified by "img_colosseum-sample" to which is provided the attribute of "ref_default" correlated with the region "20,20,300,100" is obtained. Display control is then performed to display image data and the message data such as "Shoot This!" in the target region A1.

On the other hand, in the event that a photographed image to be fit into the target region A has already been taken, this means that the ID of the photographed image data has already been correlated with the target ID representing the target region A1. In this case, the image data identified by the information of the ID of the photographed image is obtained, and display control is performed such that the obtained image data is displayed on the target region A1 of the page in which it is to be displayed.

It should be noted that the display control processing using the above-described management information is carried out by the system controller 2. In this case, the display data layout management information and correlation management information are each stored in the non-volatile memory 13 shown in FIG. 2, as a part of the template data 13a.

Display control processing using the display data layout management information and correlation management information such as described above allows templates to be appropriately displayed.

Now, as can be understood from the above description, with the present example, the photographed image data to be fit into and displayed in the target region A1 is not directly managed by the display data layout management information, but rather is managed with correlation management information which is provided separately. The reason that such a management form is employed with the present example is for the display data layout management information to be a read-only file, with no rewriting of data within the display data layout management information in the event of the photographed image data to be fit into the target region A1 going from an unphotographed state to a photographed state.

Of course, various additions and/or omissions of components to and from the photography apparatus 1 according to the embodiment shown in FIG. 2 can be conceived in accordance with actually-implemented operation examples and functions. For example, while a case of using a memory card as the storage medium for performing recording/playing of photographed image data has been exemplarily illustrated, other recording media can be employed instead, such as a HDD (hard disk drive), optical discs such as CD (Compact Disc) or DVD (Digital Versatile Disc), magneto-optical disks, hologram memory, and so forth, for example.

Internal Configuration Example of Information Processing Device

FIG. 4 illustrates the internal configuration of the personal computer 20 shown in FIG. 1. First, a CPU 21 performs overall control and computation processing of the personal computer 20 based on activated programs. Examples include operations in accordance with operation input from a later-described input unit 25, storing of data files in an HDD 30, creating/updating of management information, and so on.

Note that the CPU 21 exchanges control signals and data with the components of the personal computer 20 via a bus 22.

A memory unit 23 collectively refers to ROM, RAM, flash memory, etc., which the CPU 21 uses for processing. Stored in the ROM of the memory unit 23 are operation programs, program loaders, and so forth. Also, stored in the flash memory are various types of computational coefficients, parameters used with programs, and so forth, and temporarily secured in the RAM are a data region and task region for executing the programs.

Data files are stored, management information is created/updated, and so forth, at the HDD 30, under control of the CPU 21. In this case, the HDD 30 stores the photography apparatus management application 30a for performing management of the photography apparatus 1, such as acquisition of photographed image data and template data from the photography apparatus 1, transfer of template data downloaded and acquired from the server device 40 to the imaging apparatus 1, and so forth. Various functions realized by processing at the CPU 21 based on programs serving as the photography apparatus management application 30a will be described later. Also note that photographed image data and template data acquired from the photography apparatus 1 side can be recorded in the HDD 30.

The input unit 25 includes input devices such as an unshown keyboard and mouse, remote commander, and so forth, provided for the user to perform operation input. The information input at the input unit 25 is subjected to predetermined processing at the input processing unit 24, and is transmitted to the CPU 21 as input of operations or data. The CPU 21 is arranged to perform appropriate computation and control in accordance with the input information.

The display 27 is a display such as a liquid crystal display for example, and performs display of various types of information to the user. Upon the CPU 21 supplying display data to a display processing unit 26 in accordance with various operating states, input conditions, communication conditions, and so forth, the display processing unit 26 performs display driving of the display 27 based on the supplied display data, and accordingly performs display output of various types of information. In the case of the present example in particular, the CPU 21 supplies display data generated based on the photographed image data and template data acquired from the photography apparatus 1 side, and the display processing unit 26 performs display driving of the display 27 based on the display data so that a screen display is made accordingly.

A communication processing unit 28 performs encoding processing of transmission data and decoding processing of received data, based on the control of the CPU 21.

An external communication interface 29 transmits transmission data encoded at the communication processing unit 28 to an external device (the photography apparatus 1 in particular, in this case) connected via a communication cable connected to the interface terminal TI/F (e.g., USB terminal or the like) shown in the drawing. Also, the external communication interface 29 hands signals transmitted from an external device such as the photography apparatus 1 via the communication cable, to the communication processing unit 28. The communication processing unit 28 then transfers the received information to the CPU 21.

A memory card interface 31 performs recording/playing of information to and from the memory card 15 mounted to a memory card slot 32. The memory card interface 31 performs recording/playing of various types of data to and from the memory card 15 under control of the CPU 21.

Also, a communication processing unit 33 and network interface 34 are provided for network communication via a network terminal Tnt shown in the drawing. The communication processing unit 33 performs encoding processing of transmission data and decoding processing of received data, based on the control of the CPU 21. The network interface 34 transmits transmission data encoded at the communication processing unit 33 to an external device (the server device 40 in particular, in this case) on the network 35 via the network terminal Tnt. Also, the network interface 34 hands signals transmitted from a device on the network 35 such as the server device 40 via the network terminal Tnt, to the communication processing unit 33. The communication processing unit 33 then transfers the received information to the CPU 21.

Figure 5:
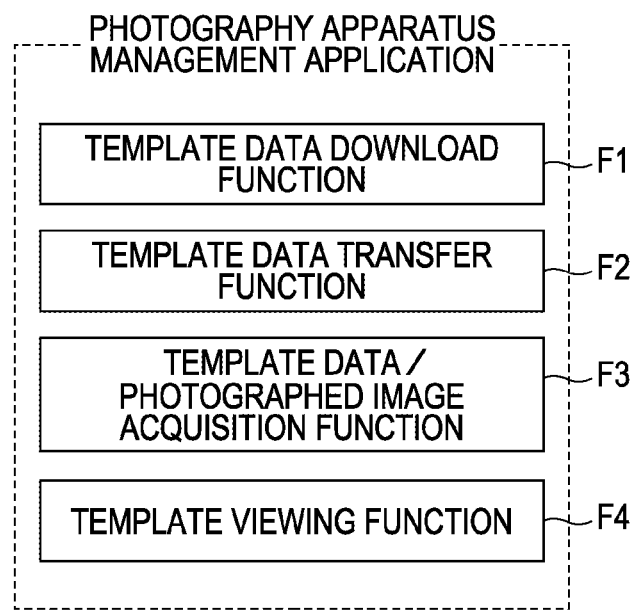
FIG. 5 is a diagram illustrating functions realized by software processing of the information processing device, in block form.

FIG. 5 is a block representation of functions realized by the photography apparatus management application 30a described above. As shown in FIG. 5, the photography apparatus management application 30a realizes a template data download function F1, a template data transfer function F2, a template data/photographed image acquisition function F3, and a template viewing function F4.

The template data download function F1 is a function for downloading template data stored at the server device 40 so to the personal computer 20 side. Specifically, by performing communication with the server device 40 via the network interface 34 described earlier, template data stored in the server device 40 is downloaded via the network 35, and is stored in a storage medium such as the HDD 30, for example.

The template data transfer function F2 is a function for transferring, to the photography apparatus 1, template data stored at the personal computer 20 side, such as template data downloaded with the above template data download function F1, template data provided to the photography apparatus management application 30a in a preset manner, and so forth, via the memory card 15 or the external communication interface 29.

Specifically, in a state wherein the memory card 15 is mounted to the memory card slot 32, or the photography apparatus 1 is connected to the personal computer 20 side via the communication cable, and wherein the photography apparatus management application 30a is running, transferable template data is displayed on the display 27 so that the user can specify the template data to transfer. Processing for storing the template data which has been specified in the memory card 15, or transferring to the photography apparatus 1 side via the external communication interface 29, is then executed.

The template data/photographed image acquisition function F3 is a function for acquiring photographed image data and template data, photographed and saved at the photography apparatus 1 side, via the memory card 15 or the external communication interface 29. As for the template data/photographed image acquisition function F3, in a state wherein the memory card 15 is mounted to the memory card slot 32, or the photography apparatus 1 is connected to the personal computer 20 side via the communication cable, and wherein the photography apparatus management application 30a is running, photographed image data/template data to be stored in the memory card 15 is displayed on the display 27, so that the user can specify the photographed image data and template data to acquire. Processing for reading out the specified photographed image data/template data from the memory card 15, or acquiring from the memory card 15 mounted to the photography apparatus 1 via the external communication interface 29, and storing in a predetermined storage medium such as the HDD 30 for example, is executed.

Another alternative to this is an arrangement wherein unacquired photographed image data/template data is automatically recognized and acquired, instead of photographed image data/template data being specified.

The template viewing function F4 is a function for displaying a template based on template data and/or photographed image data, for the user to view. Specifically, a list of templates stored in the HDD 30 which can be viewed is displayed on the display 27 for example, and the user specifies a template to view. Display screen data is then generated based on the management information (display data layout management information and correlation management information) within the template data regarding the specified template, and the display screen data is displayed on the display 27.

It should be noted that in the event that the specified template is unedited (i.e., in the event that the image is not yet photographed for all target regions A1), no correlation of IDs of photographed image data as to target IDs has been performed in the correlation management information in the template data, and no photographed image data to be fit into and displayed in the target regions A1 exist. In this case, only display of the template to which photographed image data has not been fit is performed, based on only the display data layout management information.

Internal Configuration Example of Server Device

Figure 6:
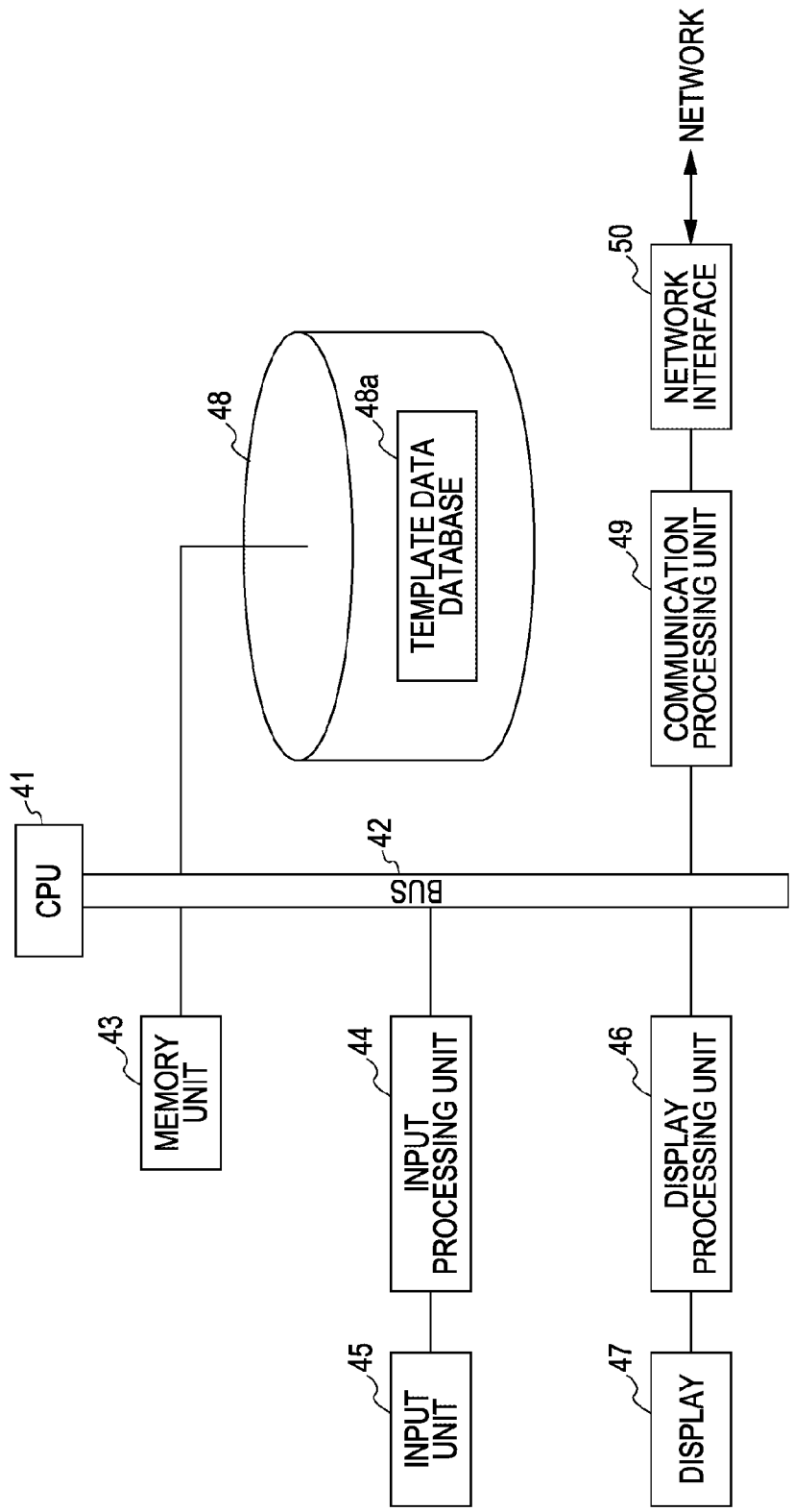
FIG. 6 is a block diagram illustrating an example of the internal configuration of a server device as an embodiment.

FIG. 6 is a block diagram illustrating an example of the internal configuration of the server device 40 shown in FIG. 1. In FIG. 6, the CPU 41 performs overall control of the server device 40 and computational processing, based on activated programs. For example, the CPU 41 performs operations according to input at an input unit 45, storage of data files to an HDD 48, creating/updating of management information, and so forth. Also, the CPU 41 exchanges control signals and data with the components of the server device 40 via a bus 42.

A memory unit 43 collectively refers to ROM, RAM, flash memory, etc., which the CPU 41 uses for processing. Stored in the ROM of the memory unit 43 are operation programs, program loaders, and so forth. Also, stored in the flash memory are various types of computational coefficients, parameters used with programs, and so forth, and temporarily secured in the RAM are a data region and task region for executing the programs.

Data files are stored, management information is created/updated, and so forth, at the HDD 48, under control of the CPU 41. A template database 48a is stored in the HDD 48, as shown in the drawing. Multiple sets of template data are stored in the template database 48a.

The input unit 45 includes input devices such as an unshown keyboard and mouse, remote commander, and so forth, provided for the user to perform operation input. The input unit 45 is assumed to be that which an operator on the side of providing a service can perform various types of operational input and data input. The information input at the input unit 45 is subjected to predetermined processing at the input processing unit 44, and is transmitted to the CPU 41 as input of operations or data. The CPU 41 is arranged to perform appropriate computation and control in accordance with the input information.

The display 47 is a display such as a liquid crystal display for example, and performs display of various types of information to the user. Upon the CPU 41 supplying display data to a display processing unit 46 in accordance with various operating states, input conditions, communication conditions, and so forth, the display processing unit 46 performs display driving of the display 47 based on the supplied display data, and accordingly performs display output of various types of information.

A communication processing unit 49 performs encoding processing of transmission data and decoding processing of received data, based on the control of the CPU 41.

A network interface 50 transmits transmission data encoded at the communication processing unit 49 to a predetermined device (the personal computer 20 shown in FIG. 1 in particular) via the network 35. Also, the network interface 50 hands signals transmitted from an external device such as the personal computer 20 via the network 35, to the communication processing unit 49. The communication processing unit 49 then transfers the received information to the CPU 41.

Operation Procedures

As can be understood from the description so far, the present embodiment assumes that the user will perform photography at the photography apparatus 1 side using a template. The following is a description of user operation procedures at the time of photography using such a template, along with actions performed at the device side in accordance with the operations.

FIGS. 7 through 13 illustrate an example of each screen displayed in accordance with operations, as drawings for describing operation procedures for photography using templates. First, as can be understood from the description made earlier regarding FIGS. 10 and 11, at the time of performing photography using templates with the present example, a template is displayed at the display unit 5, from which a predetermined target region A1 is specified. That is to say, in the event of performing photography using templates with the present example, the operations are the same as those for viewing templates part of the way. Specifically, the operations up to displaying a predetermined template are the same as the operations for viewing templates.

With this as a premise, the user first performs a predetermined operation input by way of the operation input unit 7 at the time of performing photography using templates, thereby displaying the main screen for template photography/viewing. This main screen display conceivably has items for template photography/viewing provided within a menu list displayed in accordance with operations of a menu button provided to the operation input unit 7 for example, which are carried out in accordance with specifying operations of the items being performed.

Figure 7:
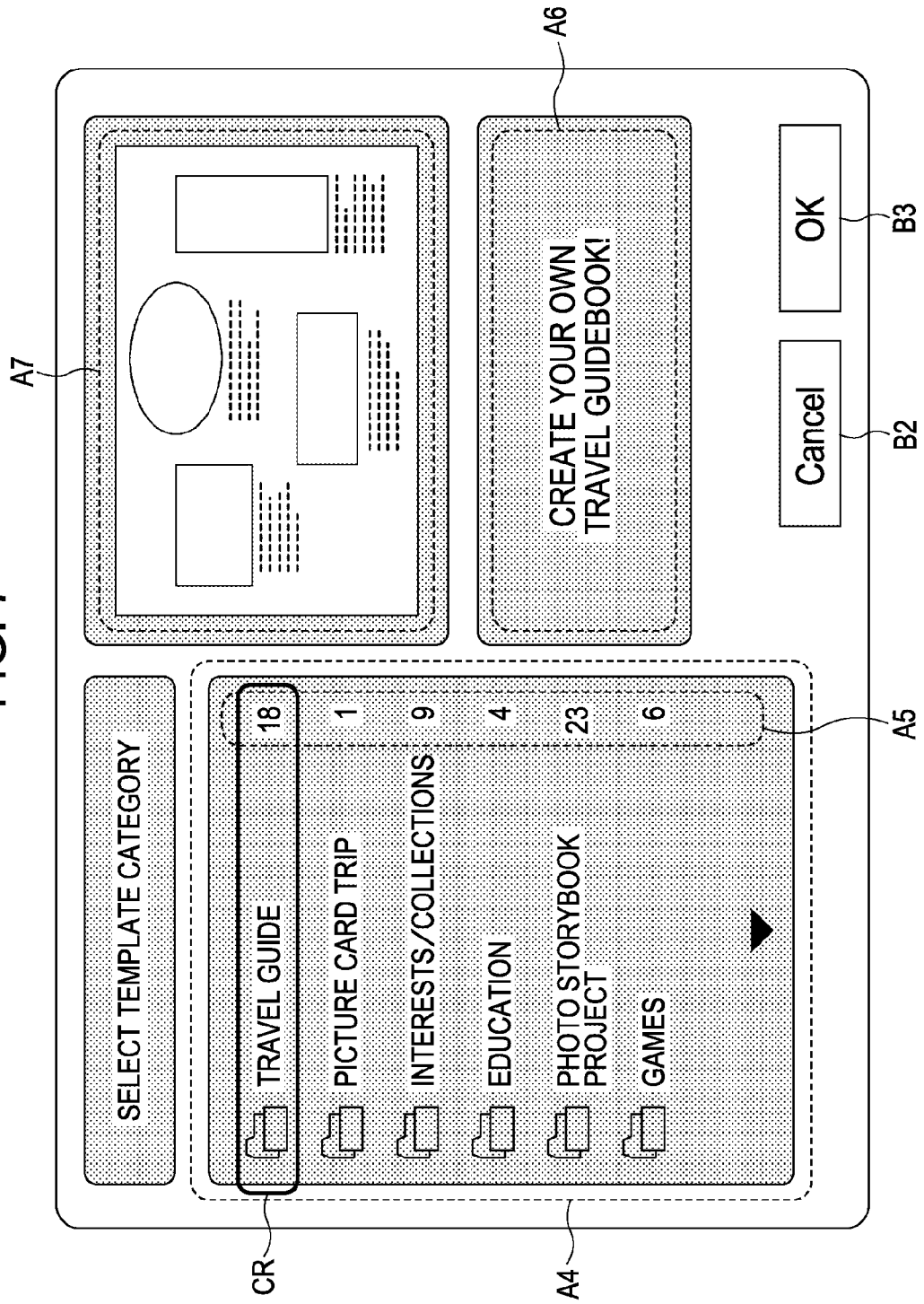
FIG. 7 is a diagram illustrating a configuration example of a main screen at the time of performing photography using a template.

As shown in FIG. 7, the main screen is provided with a template category display region A4 where a message such as "select template category" and a cursor CR are displayed along with a list of template categories, a project number display region A5 displaying the number of projects within a category (the same as the number of titles of a template, which will be described later) for each category of templates displayed in the template category display region A4, a category description display region A6 for displaying description information regarding the category of a template selected by the cursor CR, and a template preview display region A7 for displaying a template preview for each category of the template selected by the cursor CR. The template preview display region A7 in this main screen displays a reduced array example of display data of a common template in the selected category.

Also, displayed on the main screen are icons, serving as a cancel button B2 for canceling selected items, and an OK button B3 for okaying a selected item.

In the main screen, the cursor CR can be moved and a displayed item selected by operating the D-pad in the operation input unit 7. In the initial state where this main screen has been displayed, the cursor CR is situated within the template category display region A4, and the user selects a template category by operating the D-pad.

Accordingly, the template categories are classification of templates in accordance with the purpose of photography and template functions and so forth, the examples here being "travel guide", "picture card trip", "interests/collections", "education", "photo storybook project", and "games". The categories involve the following.

Travel guide: A template to use for photography while on vacation. Information regarding sightseeing spots and scenic spots at the travel destination (instruction information) has already been input, and the user can take photographs corresponding to the instruction information. Examples might include a travel guide of Rome, a travel guide of Hokkaido, etc.

Picture card trip: A template for a user to visit locations where postcard photographs were shot and take his/her own photographs. Instruction information might include the name and photography position of subjects to be photographed, season, point-in-time (dawn, evening, etc.), shutter speed, f-stop, and so on.

Interests/collections: A template used for photographing interest of the user, objects being collected, and so forth. Examples might include railway photograph collections, gourmet dining reports, etc.

Education: A template enabling the user to obtain new knowledge through photography. Examples might include an "observation diary" where the user observes change in a subject over time while taking photographs, a "collection of works" where the user creates a work (of art for example) following procedures presented as instruction information and photographs and records the object being created, a "camera technique lesson" where the user photographs a given theme (e.g., flowers), and in the process learns to naturally use the various functions of the camera, and so on.

Photo storybook project: A template using storybook-like text. Portions which serve as the pictures are to be photographed, and the user completes an original storybook of his/her own following the story. Examples of instruction information might include text which is the body of the story, names of objects to photograph, themes of objects to photograph (e.g., a "whitish scenery"), and so on.

Games: A template with a gaming nature which proceeds by taking photographs. This would be a type of photographing experience, and might be something like a "stamp rally" (a game, race, or event, where participants go to various locations, perform various acts, purchase goods, or the like, being awarded with stamps each time on a predetermined sheet beforehand, and upon the sheet being completed, is declared to have finished the rally, and may win prizes or the like) using position information and point-in-time information where photographs to take are instructed, such as photographing instructed objects a certain positions by a certain time, for example, or something like creating a jigsaw puzzle using image feature amounts.

The user can tentatively specify the selected category by operating the enter key at the operation input unit 7 in a state wherein a desired category has been selected by moving operations of the cursor CR with the D-pad.

While omitted from the drawing, in the event that a category has been tentatively specified, the cursor CR moves to the Cancel button B2, and either the Cancel button B2 or the OK button B3 can be selected with the D-pad. In the event of undoing the tentative specification of the category, the enter key is operated in a state with the Cancel button B2 selected. Accordingly, the cursor CR moves to the category display region A4, and categories becomes selectable again.

In the event of finalizing the tentative specification of the category, the enter key is operated in a state with the OK button B3 selected by operating the D-pad. As an example here, we will say that specification of the category "travel guide" has been finalized.

Figure 8:
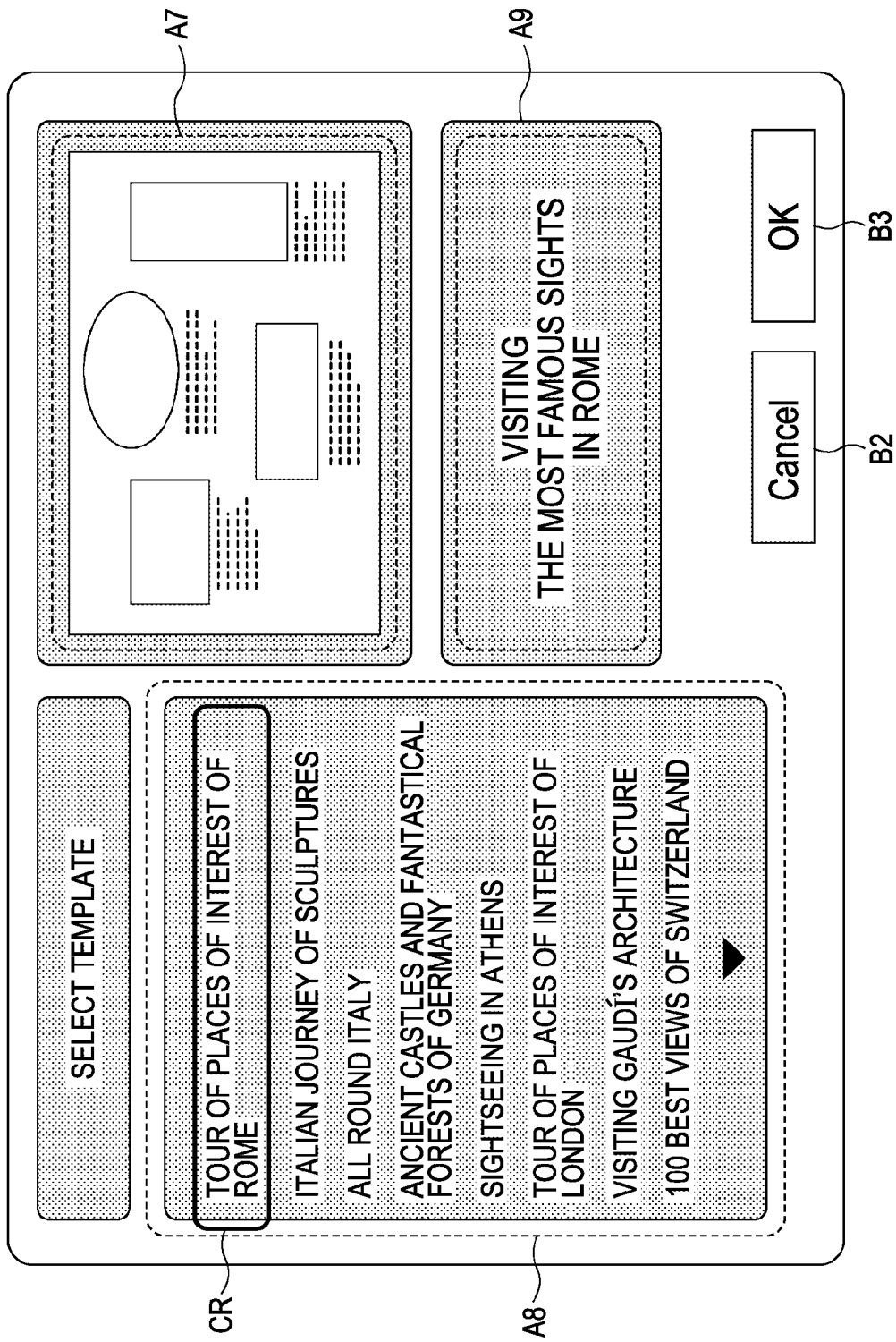
FIG. 8 is a diagram illustrating a configuration example of a template selection screen.

In response to operation of the OK button B3 so as to finalize specification of the category, a template selection screen such as shown in FIG. 8, regarding templates within the specified category, is displayed on the display unit 5. Here, a case is exemplarily illustrated wherein a template selection screen regarding templates in the category of "travel guide" has been displayed in response to the above finalization operation.

This template selection screen shows the cursor CR along with a message such as "select template" for example, and also is provided with a template name display region A8 where information of the template name of each template belonging to the specified category belongs, and a template description display region A5 where information for describing the contents of the template selected by the cursor CR are displayed. This template selection screen also is provided with the cancel button B2 and OK button B3.

Also, a template preview display region A7 is provided for this template selection screen as well, with a preview screen regarding the template selected by the cursor CR (e.g., a reduced template in this case as well) being displayed in the template preview display region A7 in the template selection screen.

In this template selection screen, the user can select a template displayed in the template name display region A8 by moving the cursor CR by operating the D-pad, and can perform tentative specification of a template selected by the cursor CR by operating the enter key.

In this case as well, in the event tentative specification has been made, the cursor CR moves to the Cancel button B2, and in the event of undoing the tentative specification the enter key is operated in a state with the Cancel button B2 selected, which returns the cursor CR to the template name display region A8. Also, in the event of finalizing specification of the template, the enter key is operated in a state with the OK button B3 selected by operating the D-pad. As an example here, we will say that specification of the category "tour of places of interest of Rome" has been finalized.

Figure 9:
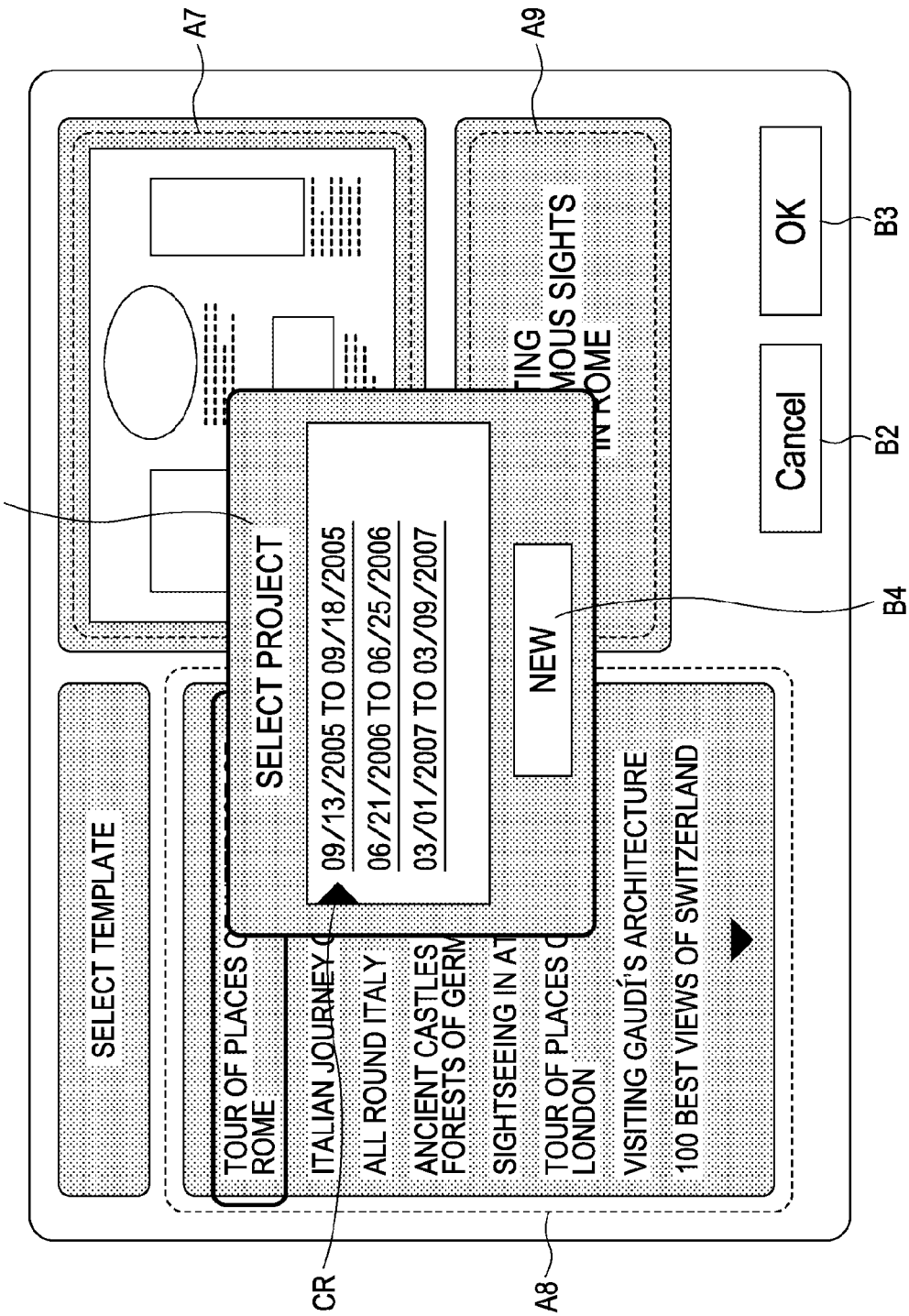
FIG. 9 is a diagram illustrating a configuration example of a project selection screen.

In response to a template having been specified in this way, a screen display for selecting a project within the specified template comes up in the form of a popup window W1, such as shown in FIG. 9, for example. Note that with the present embodiment, multiple projects can be created using the same template. That is to say, while the instruction information and layout of display data will be the same (i.e., the form itself is the same), multiple projects, created as different completed works with different photographed images fit therein, are permitted to coexist. Specifically, in the case of the "tour of places of interest of Rome" in the example, a user might create a new project each year he/she visits Rome, using photographs newly taken that time.

In order to allow multiple projects using the same template to coexist, the template has, in addition to the information of "template name" which is the name of the template itself, a "title", which the user can arbitrarily set. For example, in the case of creating a project each year Rome is visited in the above example, an arrangement might be conceived wherein the year/month/date thereof is assigned as the "title" of each project.

In the window W1 shown in FIG. 9, a list of "titles" is displayed for projects belonging to the template that has been specified, along with message information such as "select project", and the cursor CR. Also, a New button B4 for instructing creating of a new content is displayed.

While description by way of drawings is omitted here, in the event that the New button B4 is specified, a template title information input screen is displayed, and the user can input a title by inputting text by operating the operation input unit 7 within the text input box displayed in the title information input screen. Pressing the enter key for example with the title input allows creating of a new template with the input title name to be instructed.

In response to a new template having been created in response to such creation instructions, information of the title of the newly-created template is added to the list display in the popup window W1, and then the screen returns to a state where a selection can be made of the title (project) from the list.

In the popup window W1, moving the cursor CR with the D-pad allows the user to select a desired project or newly creating one, and pressing the enter key in a state wherein a desired one of these items has been selected allows the selected item to be tentatively specified. In this case as well, in the event tentative specification has been made, the cursor CR moves to the Cancel button B2, and in the event of undoing the tentative specification the enter key is operated in a state with the Cancel button B2 selected, which returns the cursor CR to the popup window W1 side. Also, in the event of finalizing specification, the enter key is operated in a state with the OK button B3 selected by operating the D-pad.

FIG. 10 illustrates a page screen of a template displayed in response to a certain project having been specified from the list of projects in the project selection screen shown in FIG. 9. In this page is displayed the target region A1 into which the photographed image data is to be fit in and displayed as described earlier, the text display region A2 for displaying text for instruction regarding the subject of the image which is to be fit into and displayed in the target region A1 (also referred to as "target subject"), and the location display region A3 showing the location of the target subject on the map. Also, a page-turn button B1 (also referred to as "Next button B1") for going to a next page in order is displayed, as well as the cursor CR for selecting the target region A1 or page-turn button B1.

Moreover, the example in this drawing also displays information indicating the total number of pages making up the template, and information indicating which of these pages the currently-displayed page is (shown as "1/8" in FIG. 10), and further displays information indicating the distance from the current position to the location of the target subject ("500 m from the current position" in FIG. 10).

The user can select the target region A1 or page-turn button B1 in a page screen of the template by moving the cursor CR by operating the D-pad. In the event that the enter key is operated in a state wherein the page-turn button B1 is selected by the cursor CR, the screen of the next page within the template is displayed as shown in FIG. 11. That is to say, the pages within the template can be fed forward by such operation of the page-turn button B1.

On the other hand, in the event of preparing to photograph an image to be fit into the target region A1, the enter key is operated in a state of the target region A1 having been selected with the cursor CR. Here, let us say that an operation has been performed for specifying the target region A1 on the page screen regarding the "colosseum" shown in FIG. 10.

Figure 12:
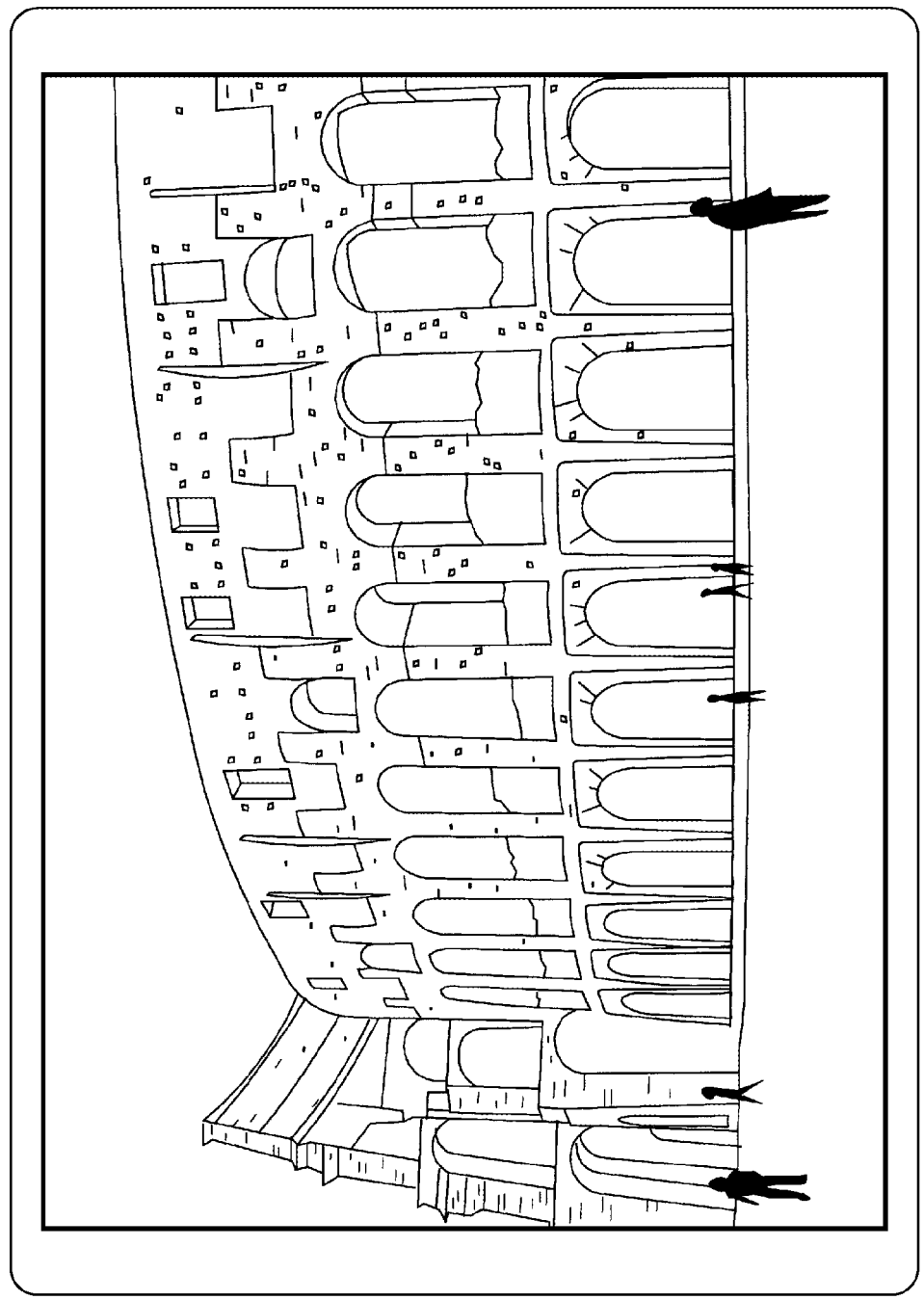
FIG. 12 is a diagram illustrating a configuration example of a real-time display screen of an imaged image.

In the event that such an operation for specifying the target region A1 has been performed, a real-time display of the imaged image is made on the display unit 5, as shown in FIG. 12. Performing such a real-time display allows the user to perform photography while confirming the imaged image of the subject.

In response to a shutter operation having been performed in this real-time display state, the imaged image data is acquired and the acquired image data is saved to the memory card 15. Upon such photographed image data having been saved, the saved photographed image data is fit into and displayed in the specified target region A1.

Figure 13:
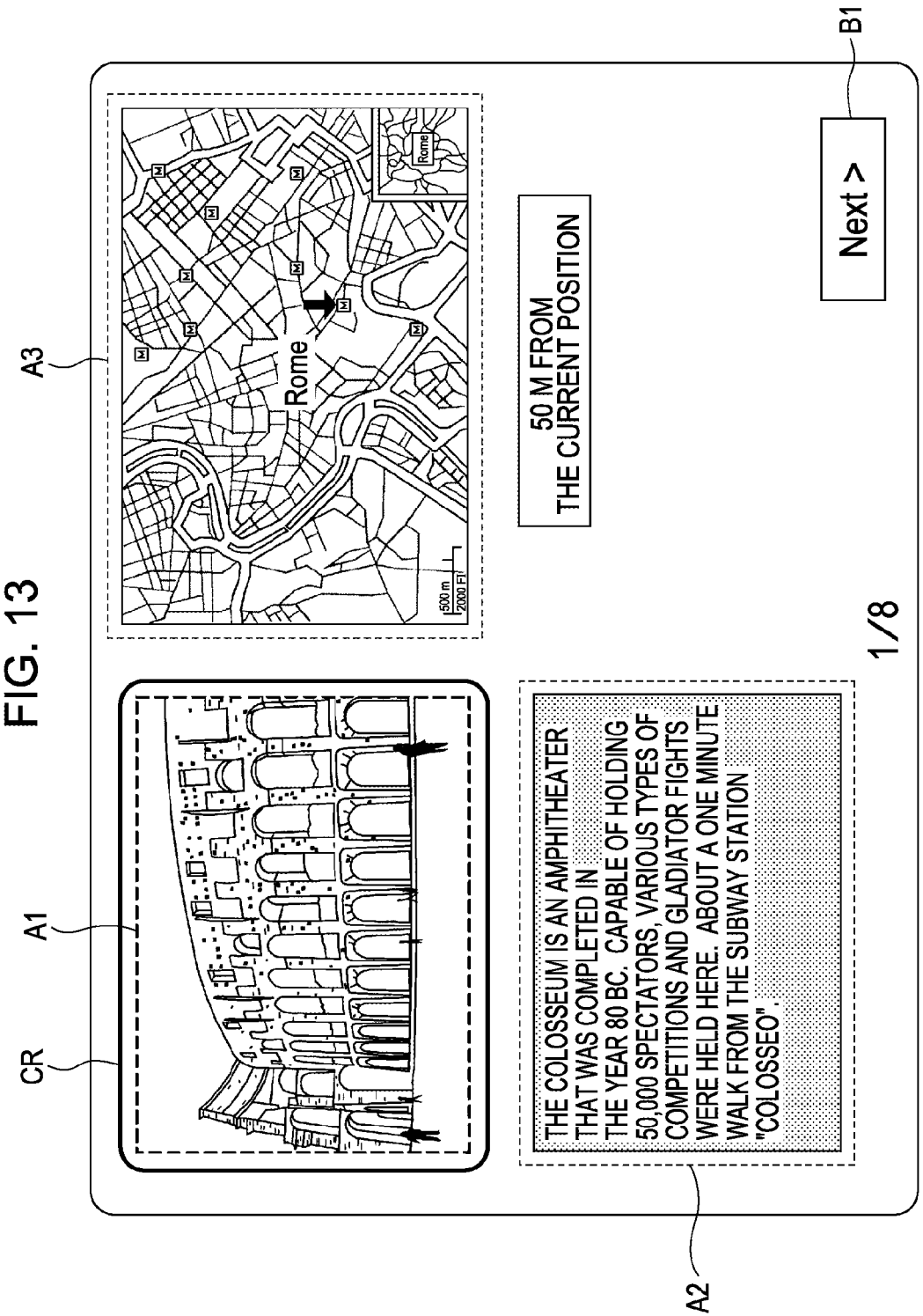
FIG. 13 is a diagram illustrating a configuration example of a page screen in which a photographed image has been fit.

FIG. 13 illustrates an example of a page screen in a case of photographed image data having been fit into the target region A1 in this way. As can be understood in comparison with FIG. 10, the target region A1 displays the photographed image data instead of the sample image and the message "Shoot This!" which had been displayed before photography.

While a case of fitting photographed image data to the target region A1 of the first page of the template alone has been exemplarily illustrated here, the user can fit photographed image data to the target region A1 of the next page by specifying the page-turn button B1 shown in FIG. 13 to go to the next page, and perform a specified shutter operation for the target region A1 in that page as well. In the same way, the user can fit photographed image data into the target region A1 of each subsequent page by specifying the page-turn button B1 shown and performing a specified shutter operation for the target region A1 in that page.

Finally, in the event that fitting of photographed image data has been performed for all pages of the template, a message such as "project has been completed" for example, is displayed notifying that the project has been completed, following which the screen display for selecting projects, such as shown in FIG. 9 as described earlier, is displayed.

Note that with the description so far, note that while the description so far implies that once a user specifies an item, the user cannot return to the hierarchical level above the hierarchical level of the selected item, but processing for returning to a hierarchical level screen above the display screen can be realized by a configuration wherein the previous hierarchical level is returned to by operating a predetermined operating element provided to the operation input unit 7, for example. Alternatively, a configuration may be made wherein an icon is displayed as a "return" button within each screen, and processing for returning the screen to that of the upper hierarchical level is executed by specifying this icon.

Processing Operations

Next, processing operations to be executed to realize the operations of the embodiment described above will be described with reference to the flowcharts in FIGS. 14 through 16. Note that the processing operations shown in these diagrams are executed based on programs stored in the internal ROM and the like, for example, which the system controller 2 has.

Figure 14:
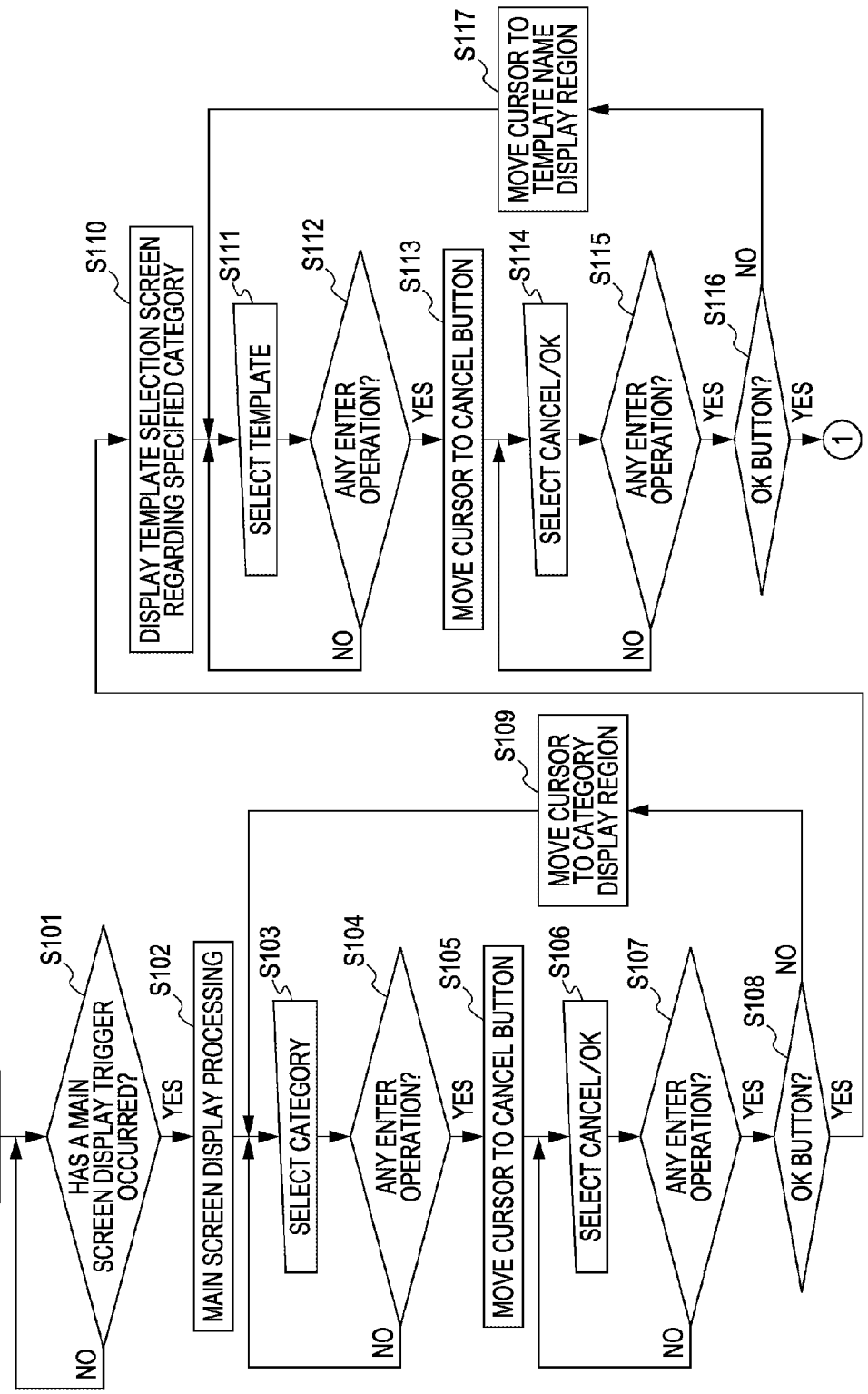
FIG. 14 is a flowchart illustrating processing operations to be performed corresponding primarily to display of the main screen through specification of a template in a template selection screen (FIGS. 7 and 8), as processing operations to be executed to realize operations as a first embodiment.

FIG. 14 illustrates the processing operations to be performed corresponding to the flow from display of the main screen to specification of a template in the template selection screen (FIGS. 7 and 8).

In FIG. 14, first, in step S101, the flow stands by awaiting an occurrence of a main screen display trigger. That is to say, the flow stands by for a predetermined operation, input via the operation input unit 7 determined beforehand to display the main screen for example, as a main screen display trigger.

In the event that the predetermined main screen display trigger, such as the predetermined operation input or the like, has occurred, in step S102 main screen display processing is executed. That is to say, display screen data to serve as a main screen such as shown in FIG. 7 as described above is generated, this is supplied to the display driving control unit 6, and instruction is performed so as to display the display screen data on the display unit 5.

The processing in the following steps S103 and S104 is processing for accepting category specification (tentative specification). First, in step S103, processing for moving the display position of the cursor CD displayed within the template category display region A4 in accordance to the case of the D-pad having been operated is executed, and in step S104, determination is made regarding whether or not an operation input with the enter key (deciding operation) has been made. In the event that a negative result is obtained, i.e., that no deciding operation has been performed, the flow returns to the category selection processing in step S103, while in the event that positive result is obtained that a deciding operation has been performed, the flow proceeds to step S105.

In step S105, processing for moving the cursor CR to the Cancel button B2 is executed. Thereafter, processing for accepting specification of the Cancel button B2 or the OK button B3 is executed in steps S106 and S107. That is to say, in step S106, processing is executed for moving the display position of the cursor CU between the Cancel button B2 and the OK button B3 in accordance with a case of the D-pad having been operated, as processing for selecting Cancel or OK, and in step S107 determination is made regarding whether or not an enter operation has been performed with the enter key.

Note that in the following processing as well, processing for accepting specification of the cancel button B2 or OK button B3 is performed regularly, but the processing thereof is the same as that described with reference to steps S106 and S107, and accordingly redundant description in the following will be omitted.

In the event that a negative result is obtained in step S107 to the effect that an entering operation has not been performed, the flow returns to the selection processing in step S106, and in the event that a positive result is obtained to the effect that an entering operation has been performed, the flow proceeds to step S108.

In step S108, determination is made regarding whether or not the button entered was the OK button B3. In the event that a negative result is obtained to the effect that the button entered was not the OK button B3, processing is executed in step S109 for returning the cursor CR to within the template category display region A4, following which the flow returns to step S103.

On the other hand, in the event that a positive result is obtained in step S107 to the effect that an entering operation has been performed, in step S110 the display processing of the template selection screen regarding the specified category is executed. That is to say, processing for displaying the template selection screen for templates belonging to the category selected and entered (i.e., specified) by the processing in steps S103 and S104 is executed.

Now, in order to search the template data 13a belonging to the specified category, from the multiple sets of template data 13a stored in the non-volatile memory 13, all that is necessary is to determine whether or not the name information of the <category> in the display data layout management information (FIG. 3A) within each template data 13a and the name information of the specified category match. That is to say, template data 13a regarding which the name information of the <category> and the name information of the specified category match is identified as being template data 13a regarding templates belonging to the specified category.

The processing in the following steps S111 and S112 is processing for accepting tentative specification of a template. That is to say, in step S111, as processing for selecting a template, processing is executed for moving the display position of the cursor CR displayed within the template name display region A8 in accordance to a case wherein the D-pad has been operated, and in step S112, determination is made regarding whether or not an enter operation has been made with the enter key.

In the event that a negative result is obtained in step S112 to the effect that an enter operation has not been performed, the flow returns to the template selecting processing in step S111, and in the event that a positive result is obtained to the effect that an enter operation has been performed, the flow proceeds to step S113.

In step S113, processing is executed for moving the cursor CR to the Cancel button B2. Thereafter, processing for accepting specification of the Cancel button B2 or the OK button B3 is executed in steps S114 and S115. In the event that a negative result is obtained in step S115 to the effect that an enter operation has not been performed, the flow returns to the selection processing in step S114, and in the event that a positive result is obtained to the effect that an enter operation has been performed, the flow proceeds to step S116.

In step S116, determination is made regarding whether or not the button entered was the OK button B3. In the event that a negative result is obtained to the effect that the button entered was not the OK button B3, processing is executed in step S117 for returning the cursor CR to within the template name display region A8, following which the flow returns to step S111.

Figure 15:
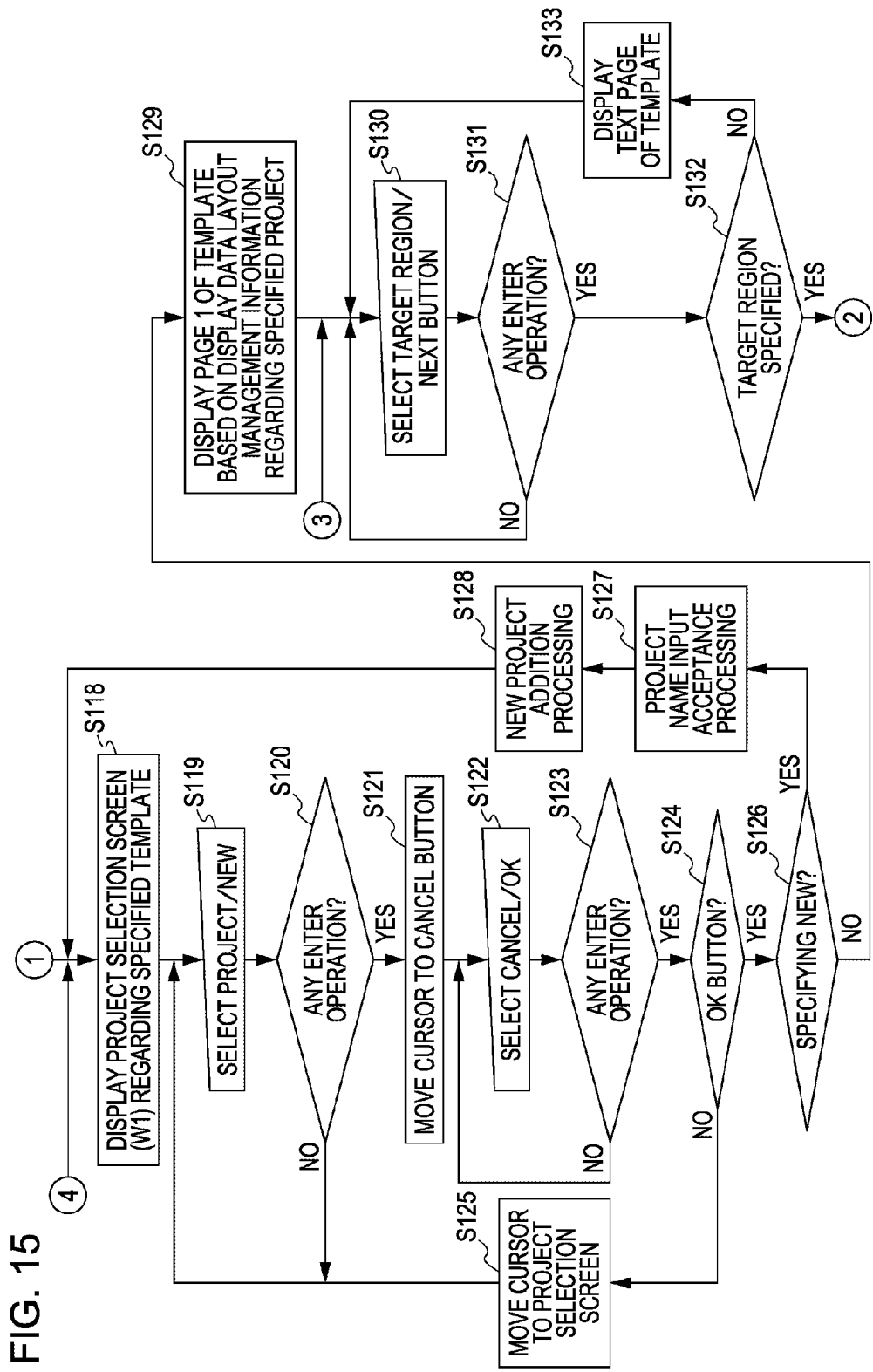
FIG. 15 is a flowchart illustrating processing operations to be performed corresponding primarily to following specification of a template through specifying of a target region (FIGS. 9 through 11), as processing operations to be executed to realize operations as the first embodiment.

On the other hand, in the event that a positive result is obtained in step S107 to the effect that the button entered was the OK button B3, the processing proceeds to step S118 shown next in FIG. 15.

FIG. 15 illustrates processing operations to be performed in accordance to following specification of a template through specifying of a target region (FIGS. 9 through 11). In FIG. 15, in step S118 display processing is performed for a content selection screen for the specified template. That is to say, a project selection screen such as shown as the popup window W1 in FIG. 9 for example is displayed on the display unit 5 with regard to the template specified by the series of processing in steps S111 through S116 in FIG. 14.

Now, as can be understood by making reference to FIG. 9, a list of projects within the specified template is displayed in the project selection screen, and in order to search the template data 13a which is the specified template protect from the multiple sets of template data 13a stored in the non-volatile memory 13, all that is necessary is to determine whether or not the name information of the <theme> in the display data layout management information (FIG. 3A) within each template data 13a and the template name of the specified template match. That is to say, template data 13a regarding which the name information of the <theme> and the template name information of the specified template match is identified as being template data 13a which is the specified template project.

The processing in the following steps S119 and S120 is processing for accepting tentative specification of a project displayed in the project selection screen or to create a new project. That is to say, in step S119, as processing for selecting a project displayed in the project selection screen or to create a new project, processing is executed for moving the display position of the cursor CR to a project or to the New button B4 in accordance to a case wherein the D-pad has been operated, and in step S120, determination is made regarding whether or not an enter operation has been made with the enter key.

In the event that a negative result is obtained in step S120 to the effect that an enter operation has not been performed, the flow returns to the selection processing in step S119, and in the event that a positive result is obtained to the effect that an enter operation has been performed, the flow proceeds to step S121.

In step S121, processing is executed for moving the cursor CR to the Cancel button B2. Thereafter, processing for accepting specification of the Cancel button B2 or the OK button B3 is executed in steps S122 and S123. In the event that a negative result is obtained in step S123 to the effect that an enter operation has not been performed, the flow returns to the selection processing in step S122, and in the event that a positive result is obtained to the effect that an enter operation has been performed, the flow proceeds to step S124.

In step S124, determination is made regarding whether or not the button entered was the OK button B3. In the event that a negative result is obtained to the effect that the button entered was not the OK button B3, processing is executed in step S125 for returning the cursor CR to within the project selection screen, following which the flow returns to step S119.

On the other hand, in the event that a positive result is obtained in step S124 to the effect that the button entered was the OK button B3, the flow proceeds to step S126, where determination is made regarding whether or not the item specified was the New button B4.

In the event that a positive result is obtained in step S126 to the effect that the item selected and entered in steps S119 and S120 is the New button B4, the flow proceeds to step S127, where input acceptance processing is first executed for the project name. That is to say, an information input screen for input of the title of the template (project) is displayed on the display unit 5 as described earlier, which accepts information input of the title from the user.

In the event that an enter operation is performed with the enter key for example to finalize the input operation in this acceptance processing, in step S128 processing for adding the newly-created project is executed. That is to say, a template data 13a with the name information of <title> in the display data layout management information as the title information regarding which input has been finalized is newly generated as a new project (template data 13a) using the specified template within the specified category, and this is added to the non-volatile memory 13.

Upon executing the processing in step S128 being executed, the flow returns to the display processing of the project selection screen in step S118. Accordingly, in response to a new template having been created as described above, information of the title of the newly-created template is added to the popup window W1, and then the title (project) becomes selectable from the list.

In the event that a positive result is obtained in step S126 to the effect that the item selected is not the New button B4, i.e., one of the projects, in step S129 processing for displaying page 1 of the template is executed, based on the display data layout management information of the specified project. That is to say, the display data layout management information of the specified project (template data 13a) selected and entered in the steps S119 and S120 is referenced, and the image data for page 1 of the specified project is displayed on the display unit 5 based on the information contents of the display data layout management information.

Note that as described earlier as well, at the time of performing display regarding template data, the correlation management information is referred to based on the information of the photoID (target ID) within the display data layout management information, in order to identify the image data to be displayed in the target region A1, and whether or not there is correlation of photographed image data as to the target ID is confirmed. In the event that there is no correlation of photographed image data as to the target ID in the correlation management information, default (ref_default) sample image data and a message such as "Shoot This!" correlated as to the target region A1 in the display data layout management information is displayed in the target region A1 within the page. Also, in the event that correlation of photographed image data as to the target ID has been made in the correlation management information, the photographed image data identified by the ID of the photographed image is read out from the memory card 15, and fit into and displayed in the target region A1 within the page.

Upon executing the processing in step S129, processing for accepting specification of the target region A1 or Next button (page-turn button) B1 is performed by the processing in the subsequent steps S130 and S131. That is to say, in step S130, processing for moving the cursor CR to the target region A1 or the Next button B1 in accordance with D-pad operations is executed, and in step S131, determination is made regarding whether or not an enter operation has been performed with the enter key.

In the event that a negative result is obtained in step S131 to the effect that an enter operation has not been performed, the flow returns to the selection processing in step S130, and in the event that a positive result is obtained to the effect that an enter operation has been performed, the flow proceeds to step S132.

In step S132, determination is made regarding whether or not the target region A1 has been specified. That is to say, determination is made regarding whether or not the target region A1 has been specified by the selection and entering performed in steps S130 and S131.

In the event that a negative result is obtained in step S132 to the effect that the target region A1 has not been specified, processing for displaying the next page of the template is executed in step S133, following which the flow returns to step S130. On the other hand, in the event that a positive result is obtained in step S132 to the effect that the target region A1 has been specified, the flow proceeds to step S134 shown in FIG. 16.

Figure 16:
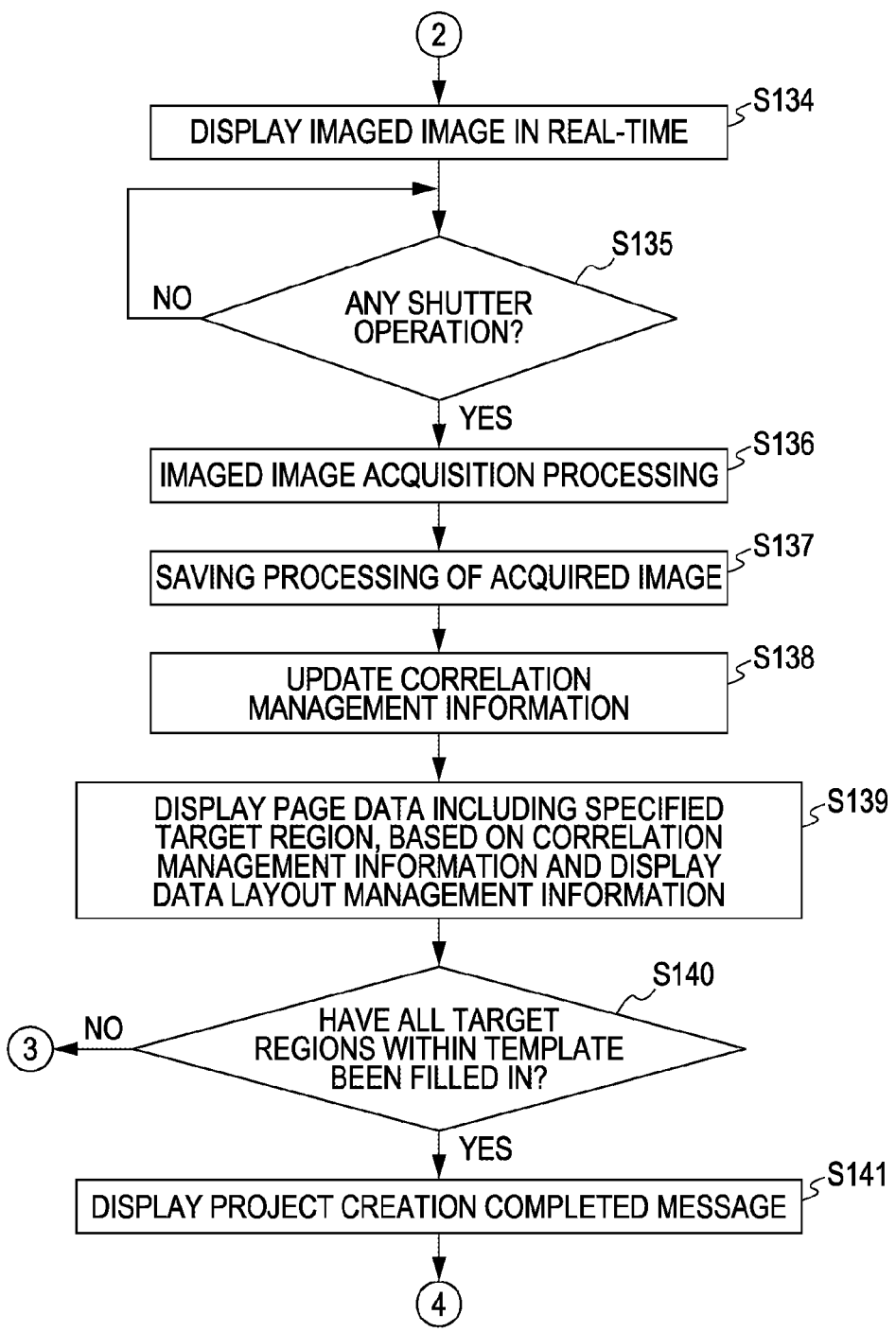
FIG. 16 is a flowchart illustrating processing operations to be performed corresponding primarily to photography of an image to be fit into a target region through correlation of the target region and photographed image, as processing operations to be executed to realize operations as the first embodiment.

FIG. 16 illustrates the processing operations to be performed correlating to photographing of the image to be fit into the target region A1 up to correlation of the target region A1 and the photographed image.

In step S134 in FIG. 16, real-time display processing of the photographed image is performed. That is to say, an instruction is given to the imaging control unit 4 so as to start transfer of the imaged image data (moving image) obtained based on the imaging operations of the imaging unit 3 to the display driving control unit 6, so as to perform real-time display of the imaged image on the display unit 5.

In step S135, the flow stands by for a shutter operation, and in the event that a shutter operation is performed, the flow proceeds to step S136.

In step S136, the photographed image data (still image) acquired by the above shutter operation having been performed is temporarily saved in appropriate memory (e.g., the non-volatile memory 13 or the like), as photographed image acquisition processing.

In the following step S137, processing for saving the acquired photographed image data in the memory card 15 is executed as photographed image saving processing. At this time, the system controller assigns an ID to the photographed image data saved in the memory card 15 in this case (the earlier-described photographed image ID), and also executes processing for correlating the saving destination of the photographed image data with this ID.

At the next step S138, updating processing of the correlation management information is executed. That is to say, the information contents of the correlation management information are updated so as to correlate the ID of the photographed image saved in step S137 as to the target ID of the target region A1 specified by the selecting and entering operation in steps S130 and S131 in FIG. 15.

Further, in step S139, processing for displaying page data including the specified target region A1 is executed based on the correlation management information and the display data layout management information. That is to say, display image data is generated regarding a page including the target region A1 specified by being selected and entered in steps S130 and S131, based on the above-described updated correlation management information and display data layout management information, the display driving control unit 6 is instructed to display an image display based on this display image data on the display unit 5.

In the following step S140, determination is made regarding whether or not all target regions A1 within the template have been filled in. That is to say, determination is made regarding whether or not photographed image data has been correlated with all target regions A1 based on the display data layout management information and correlation management information thereof for the template data 13a (project) specified by the selecting and entering in steps S119 and S120 in FIG. 15. In the event that a negative result is obtained in step S140 to the effect that not all target regions A1 in the template have been filled in, the flow is returned to step S130 in FIG. 15, and the user is prompted to fit a photographed image to the next target region A1.

In the event that a positive result is obtained in step S140 to the effect that all target regions A1 in the template have been filled in, the flow advances to step S141, and a display processing for a project completed message is performed. For example, message data for notifying the user of completion, such as "Your project has been completed", is displayed on the display unit 5. Upon the display processing of step S140 being executed, the flow returns to step S118, and following display of the project completed message, the project selection screen shown in FIG. 9 earlier is displayed.

As described so far, according to the present embodiment, instruction information for instructing what sort of photograph should be taken can be presented to the user with the photography apparatus 1 which is a digital camera. Accordingly, the user can perform photography based on the instruction information, and consequently, photographs can be prevented from becoming monotonous.

Also, enabling instruction information to be displayed at a camera apparatus enables the user to perform photography based on the instruction information, and accordingly the user will be provided with more chances to use the various functions of the camera device through photography of various subjects based on such instruction information, and eventually, the user can be led to use such functions in a natural manner.

Also, by displaying a screen in a display format wherein photographed images have not yet been filled in, as a template, provides the user with motivation to fill in the images based on the instruction information, i.e., motivation for photography.

Also, a technique is employed wherein a form for displaying images at the time of viewing is provided beforehand as a template, and photographed images are fit therein, whereby post-photography image organizing becomes unnecessary, and saving unorganized photographed images can be prevented. Consequently, when a user desires to browse the imaged images again, the images can be efficiently viewed as memories with a story.

Also, instruction can be given such as to "photograph so-and-so by a such-and-such time" for example, as the instruction information. That is to say, depending on the contents of the instruction, a template with gaming nature can be realized.

Also, the present embodiment has been described with predetermined image data serving as sample image data prepared beforehand having been displayed in target regions A1 regarding which correlation of photographed image data has not been performed, which can increase the desire of the user to take a photograph such as the sample image, leading to improved motivation for photography. Further, the text information such as "Shoot This!" that is also displayed as with the above example can further increase motivation of the user regarding photography.

Second Embodiment

Next, a second embodiment will be described. The second embodiment involves adding at least a part of the instruction information as metadata of the photographed image data.

Now, in the event that the photographed image data acquired by the user operations has been saved as a JPEG (Joint Photographic coding Experts Group) for example, appropriate text information and position information and the like can be added as metadata, as so-called Exif (Exchangeable Image File Format) information. With the second embodiment, metadata is automatically added to the photographed image data in accordance with cases wherein the photographed image data can be saved with metadata such as Exif being added.

Note that with the second embodiment, the configuration of the image photographing/viewing system (the photography apparatus 1, personal computer 20, server device 40) is the same as that described with the first embodiment, and accordingly description thereof will be omitted here. This holds true with the subsequent embodiments as well.

Figure 17:
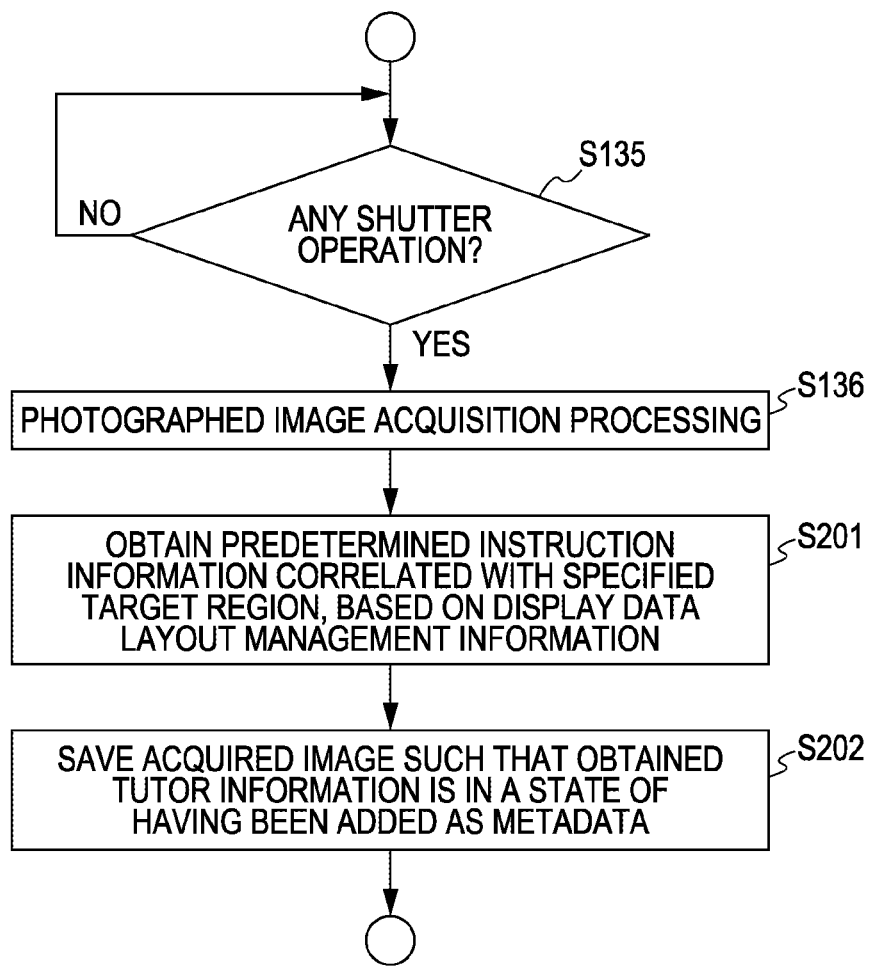
FIG. 17 is a flowchart illustrating processing operations to be executed to realize operations as a second embodiment.

FIG. 17 is a flowchart for describing processing operations to be performed for realizing operations of the second embodiment. Note that the processing operations shown in FIG. 17 are also executed by the system controller 2 shown in FIG. 2 based on programs stored in the internal ROM or the like, for example.

The processing operations for realizing the operations of the second embodiment are executed in accordance with arrival of a timing wherein an acquired image should be saved, such as following a shutter operation having been performed in step S135 in FIG. 16 described earlier, and acquisition processing of the photographed image have been executed accordingly in step S136, as shown in FIG. 17 for example.

In the example in FIG. 17, in response to acquisition processing being executed for the photographed image in step S136, processing is executed for obtaining predetermined instruction information correlated with the specified target region A1 in step S201, based on the display data layout management information. In this case for example, the instruction information that has been set is the text data to be displayed in the text display region A2 and location information indicating the location of the subject.

Note that which of the instruction information to be added as metadata can be specified by the <object> attribute in the display data layout management information, for example. In this case, step S201 is processing for obtaining the data of <object> to which such attribute information has been provided.

In step S202, processing is executed for saving the acquired image such that the obtained instruction information is added as metadata. For example, in the event of adding the metadata as Exif information as with the present example, processing is executed for generating a JPEG file wherein the text data and position data has been added as Exif information, based on the acquired image data that has been compressed, obtained from the imaging control unit 4, and the obtained text data and position data, and the JPEG file is saved in the memory card 15.

Due to the processing of step S202 having been performed, the photographed data is in a saved state, in the same as following the processing of step S137 in FIG. 16. Accordingly, in the case of applying the second embodiment to the first embodiment, after execution of step S202 the flow can proceed to step S138. Accordingly, operations the same as with the first embodiment following saving of the photographed data (correlation of the specified target region A1 and the saved photographed data, etc.) can be performed.

Now, metadata added to the image data, such as the Exif information and so forth, is information which the user can use for organizing and searching image data after photography. For example, with the example of Exif information, in the event of selecting desired image data from a list of photographed image data displayed on the screen (a thumbnail image list or the like) following having acquired the photographed image data at the personal computer 20 or the like, the Exif information added to the selected image data is displayed. The user can organize the photographed images based on the added information of image data displayed in this way.

Alternatively, some operating systems have image search functions based on Exif information, whereby image data can be searched for to which text data matching keywords input by the user has been added.

In the related art, in the event of performing such image organizing and image searching, there has been performed an operation of correlating information which the user has manually input or the like with the photographed image data as metadata.

In contrast with this, with an arrangement wherein information such as description of the subject, location information, and so forth, which is instruction information, is automatically added to the photographed image data as metadata as with the second embodiment described above, the user does not need to perform operations for inputting information for organizing and searching images, nor adding of the input information. That is to say with the second embodiment as described above, the troublesome work for adding metadata following photography can be done away with, and in this, the load on the user in managing photographed images can be greatly alleviated.

Note that in the above description, a case of adding metadata in the form of Exif information has been exemplarily illustrated, but in a case wherein correlation between the photographed image data and metadata is to be managed by other management information for example, processing may be performed wherein, as the processing of step S202, the photographed image data and obtained instruction information are saved in the memory card 15 and the information contents of the management information are updated such that the saved photographed image data and instruction information are correlated, for example.

Third Embodiment

So far, description has been made regarding an arrangement wherein photographed image data photographed by the user with the target region A1 being specified is always correlated with that target region A1. However, in the event of considering a case of performing photography using a template of a category having a gaming nature for example, unconditionally correlating a photographed image with the specified target region A1 might cause problems, such as the gaming nature being diminished. For example, let us consider a template belonging to a category "games", which is the aforementioned stamp rally (to photograph predetermined subjects by a certain time). If a photographed image is correlated with the target region A1 regardless of being taken after the time limit or regardless of being an incorrect subject, the gaming nature would be markedly diminished.

Accordingly, with the third embodiment, conditions for correlating the photographed image to the specified target region A1 are set, and only photographed images matching the conditions are correlated with the target region A1, i.e., a sort of filtering is applied to the photographed images.

First, with the third embodiment, matching items are set for the target region A1 for filtering, to set which information that matching will be performed based on to carry out filtering. That is to say, information is correlated with each target region A1, regarding whether filtering is to be performed based on matching results with position information as a reference, or filtering is to be performed based on matching results with point-in-time information as a reference, or the like, for example.

Further, information to use as a reference at the time of matching (matching reference information) is set to the target region A1 which will use filtering. For example, with a target region A1 of which the matching item is "position", position information indicating the location of the target subject is correlated as matching reference information. With a target region A1 of which the matching item is "point-in-time", reference point-in-time information is correlated as matching reference information. That is to say, in a case of instruction to "photograph a such-and-such sunset" or to "photograph a such-and-such on Christmas", point-in-time information corresponding to evening time or to Christmas (date) is correlated beforehand as matching reference information.

Thus, by correlating the item information for matching at the time of performing filtering for the target region A1 with the matching reference information, images to be correlated with each target region A1 using filtering can be filtered, based on the results of having performed matching of reference information relating to preset items.

FIG. 18 illustrates an example of the structure of matching condition management information for correlating matching item information and matching reference information as to the target region A1. As shown in FIG. 18, matching item information and matching reference information are correlated for each target ID of the target regions A1 for which matching is to be performed.

Now, examples of matching items can include "position", "point-in-time" (including date-and-time), "color of image", "person (face)", "inter-image distance", and so forth.

"Position" is for performing matching based on position information. The matching item "position" has information of longitude (x) and latitude (y) as matching reference information (position information). As for a specific example of matching by "position", determination may be made regarding whether or not a position (x, y) obtained at the timing of the photography performed with regard to the specified target region A1 is within a radius distance r centered on the position serving as the matching reference information (reference position x, y)). Alternatively, in the event that the instructions are to "photograph a so-and-so at a location so many km or more away", determination may be made regarding whether or not the obtained position (x, y) is not within the radius distance r centered on the position serving as the matching reference information (reference position x, y)).

"Point-in-time" is for performing matching based on point-in-time information as exemplarily described above, and point-in-time information is correlated as the matching reference information. Specific examples of matching may be whether or not a point-in-time obtained at the timing of the photography performed with regard to the specified target region A1 is before a point-in-time serving as the matching reference information (reference point-in-time), or is after the point-in-time, or matches the point-in-time, or further is included (or not included) in a time range including the reference point-in-time.

"Image color" is matching performed regarding color features of the image, with color range information correlated as the matching reference information as shown in FIG. 18. With matching by this "image color", whether or not the color information (RGB) of the object image is included (or not included) in a color range (an RGB range) serves as matching reference information.

"Person (face)" is matching performed regarding the face of a person in the image, and facial data is correlated as the matching reference information. The related art already includes technology whereby the face of a person can be made into feature data, in the form of relative position information of the components of the face. For example, the ratio Ed/EN of the distance EN between the center of eye and nose as to the distance Ed between the eyes, and the ratio Ed/EM of the distance EM between the center of eye and mouth as to the distance Ed between the eyes, differ for each individual, and are not affected by external changes such as hairstyle, glasses, clothes, and so forth. Moreover, this information does not change with age.

In light of this, the facial data may have information representing facial features such as Ed/EN or Ed/EM which differs for each individual correlated, and an example of matching using such facial data might be filtering regarding the target region A1 for which instruction has been given to photograph a certain individual that has been pre-registered.

"Inter-image distance" is matching performed regarding predetermined image features as to a reference image (e.g., predetermined features such as shapes and patterns of objects shown in an image, other than the above-described color or face), and image feature data is correlated as matching reference information. With matching using this "inter-image distance", having a sample image to serve as a matching reference set beforehand is a prerequisite. Specifically, the distance (similarity) relating to the predetermined image features between such a sample image and the photographed image (acquired image) serves as the confirming for determining whether or not within a predetermined value.

In this case, data representing features amount regarding the predetermined image features (image feature data), extracted as a result of analysis (calculation) performed on the sample image beforehand is correlated as the matching reference information. That is to say, for actual matching, the image feature data is calculated for the predetermined image features by performing image analysis on the photographed image data, and determination is made regarding whether the similarity between the image feature data and the image feature data serving as the matching reference information is at a predetermined value or above—in terms of distance, within a predetermined value—(or whether the similarity is at a predetermined value or below—in terms of distance, at or above a predetermined value).

The matching condition management information shown in FIG. 18 is information for managing the correlation between the target region A1 and the matching item and matching reference information for each template, for example. The matching condition management information is stored in the non-volatile memory 13 shown in FIG. 2, as a part of the template data 13a. Note that the contents of such matching condition management information may be specified as being <data> attributes in the display data layout management information.

Next, an actual processing operating example of a case of applying the filtering technique based on matching as described above will be described with reference to the flowcharts in FIGS. 19 through 21. The processing operations shown in these drawings are also executed by the system controller 2 shown in FIG. 2 based on programs stored in the internal ROM or the like, for example.

Figure 19:
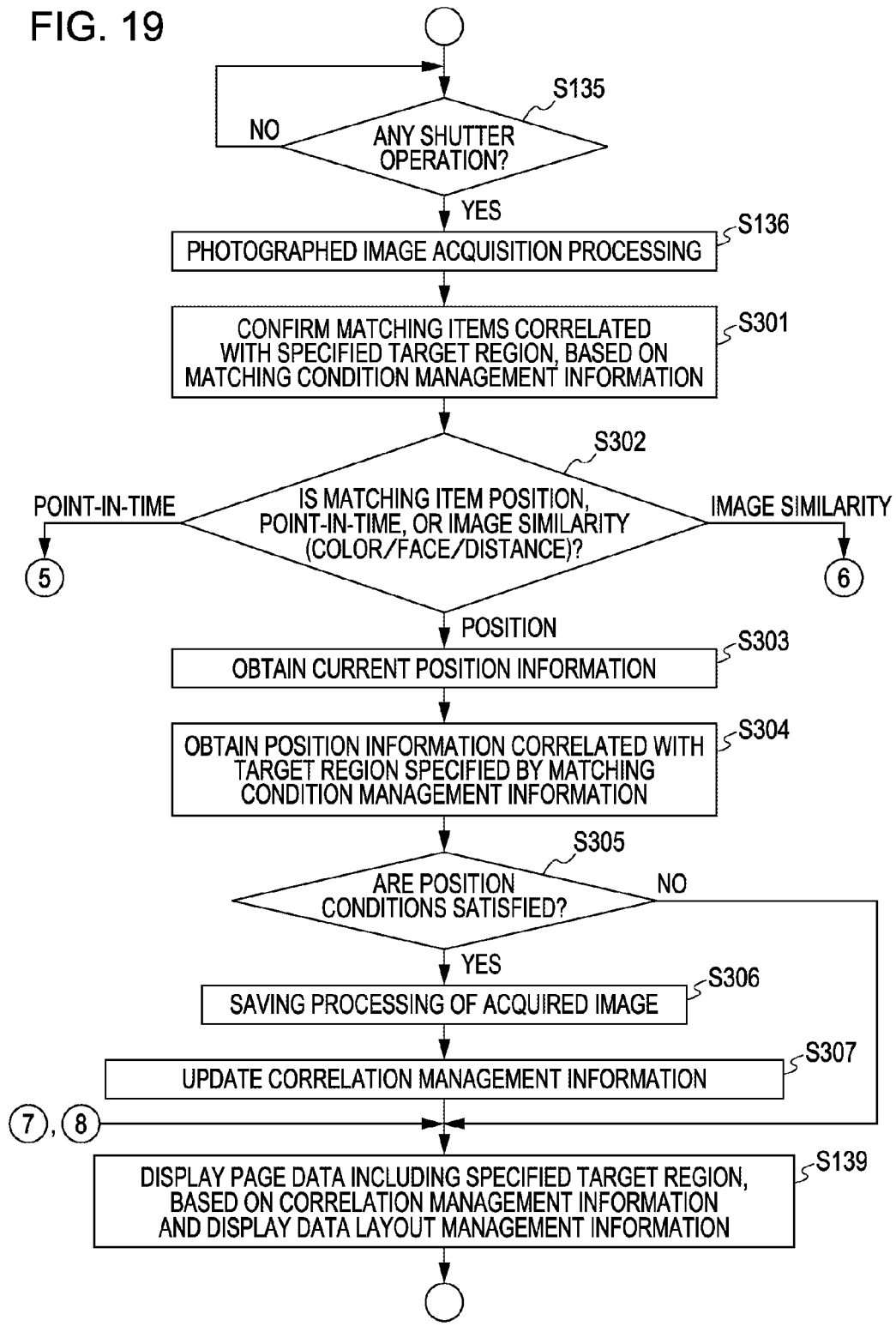
FIG. 19 is a flowchart illustrating processing operations to be performed corresponding primarily to a case of performing filtering regarding a target region for which matching by "position" has been set, as processing operations to be executed to realize operations as a third embodiment.
Figure 20:
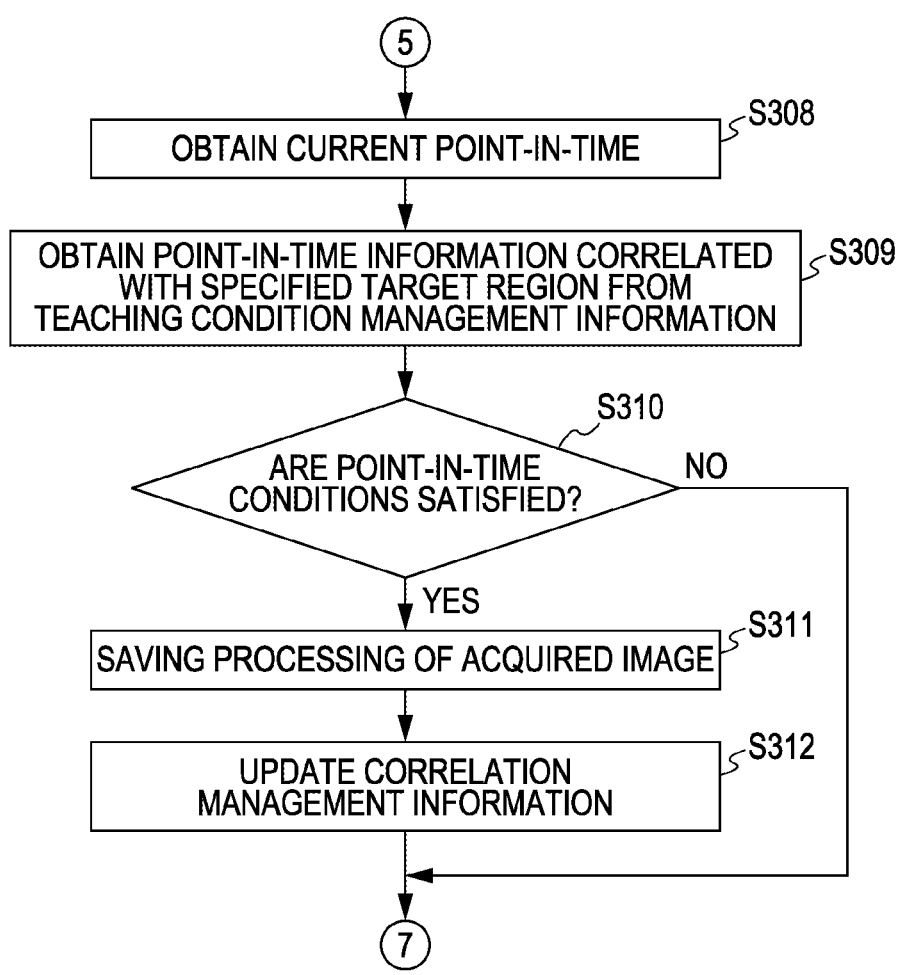
FIG. 20 is a flowchart illustrating processing operations to be performed corresponding primarily to a case of performing filtering regarding a target region for which matching by "point-in-time" has been set, as processing operations to be executed to realize operations as the third embodiment.

First, FIG. 19 primarily illustrates processing operations to be executed in accordance with a case of performing filtering regarding a target region A1 which has been set to perform matching by position information.

Now, as can be understood from description so far, with the third embodiment, following performing specification of the target region A1, filtering is performed relating to correlation of the photographed image data as to the specified target region A1. Accordingly, the processing operations for realizing the filtering as the third embodiment will be executed at least after specification of the target region A1 has been performed.

In the example in FIG. 19, this "after specification of the target region A1 has been performed" means a case wherein the shutter operation has been performed in step S135 in FIG. 16, and processing for filtering has started, in response to which the photographed image acquisition processing is executed in step S136, for example.

In FIG. 19, in response to acquisition processing of the photographed image being performed in step S136, in step S301 processing for confirming the matching item correlated with the specified target region A1 is performed based on the matching condition management information. That is to say, the matching item correlated with the target ID of the specified target region A1 is confirmed by making reference to the matching condition management information stored as template data 13a for the template which includes the specified target region A1.

In the subsequent step S302, processing is executed for determining which of "position" "point-in-time", and "image similarity" the matching item is. Now, we will say that "image similarity" encompasses the matching items "image color", "person (face)" and "inter-image distance". Since the series of processing operations for realizing filtering based on these "image color", "person (face)" and "inter-image distance" can be represented as a common flow of processing in a flowchart, these three will be shown in a flow of processing operations for filtering, in a form of having been integrated into one item, for the sake of facilitating illustration in the drawings. That is to say, in step S302, there should be determination regarding these "image color", "person (face)" and "inter-image distance" in addition to "position" and "time", so there are actually five branches at step S302 corresponding to each.

In step S302, in the event that the matching item confirmed in step S301 is "position", the processing proceeds to step S303. Also, in the event that the matching item in step S302 is "point-in-time", the processing proceeds to step S308 in FIG. 20, and in the event that the matching item in step S302 is "image similarity", the processing proceeds to step S313 in FIG. 21; these will be described later.

In step S303, current position information is obtained from the position detecting unit 8. In the following step S304, processing is performed for obtaining position information correlated with the target region A1 as specified with the matching condition management information. That is to say, the position information correlated as matching reference information with the target ID of the specified target region A1 in the matching condition management information is obtained.

Thereafter, in step S305, determination processing is performed regarding whether or not the position condition has been satisfied. That is to say, in the event that a condition is that the current position is included in a range based on a reference position as in the above-described example, determination is made regarding whether or not the position (x, y) indicated by the current position information obtained in step S303 is included in a radius distance r centered on the position (x, y) indicated by the position information serving as the matching reference information.

In the event that determination is made in step S305 that the current position (x, y) is included in a radius distance r referencing a reference position (x, y), meaning that the position condition has been satisfied, the processing proceeds to step S306, and saving processing of the acquired image is first executed.

In the following step S307, the correlation management information is updated, so as to correlate the saved photographed image data with the specified target region A1, following which the processing proceeds to step S139 in FIG. 16 described earlier.

Accordingly, in the event that photographed image data which satisfies the position condition is obtained, this photographed image data is saved and correlated with the specified target region A1, and then page data wherein the photographed image data has been fit into the specified target region A1 is displayed. Processing performed from step S139 and on is the same as that shown in FIG. 16.

On the other hand, in the event that a negative result is obtained that the current position (x, y) is not included in a radius distance r referencing a reference position (x, y), meaning that the position condition has not been satisfied, the processing proceeds directly to step S139. That is to say, in the event that the position condition has not been satisfied, no photographed image data is saved and correlated with the specified target region A1, and page data with no photographed image data fit into the specified target region A1 is displayed. Thus, filtering based on position conditions is realized.

Next, the processing operations to be executed in the event that the matching item is "point-in-time" will be described with reference to FIG. 20. In step S308 in FIG. 20, obtaining processing is executed for current point-in-time information. That is to say, the current point-in-time information, which is being clocked by the clocking function described above, is obtained.

In the following step S309, processing is performed for obtaining point-in-time information correlated with the target region A1 as specified with the matching condition management information. That is to say, the point-in-time information correlated as matching reference information with the target ID of the specified target region A1 in the matching condition management information is obtained.

Thereafter, in step S310, determination processing is performed regarding whether or not the point-in-time condition has been satisfied. That is to say, in the event that a condition is that the current point-in-time is before a reference point-in-time as in the above-described example, determination is made regarding whether or not the point-in-time indicated by the current point-in-time information obtained in step S308 (current point-in-time) is before the reference point-in-time indicated by the point-in-time information serving as the matching reference information.

In the event that determination is made in step S310 that the current point-in-time is before the reference point-in-time, meaning that the point-in-time condition has been satisfied, the processing proceeds to step S311, saving processing of the acquired image is executed, and in the following step S312, the correlation management information is updated, so as to correlate the saved photographed image data with the specified target region A1, following which the processing proceeds to step S139.

On the other hand, in the event that a negative result is obtained that the current point-in-time is not before the reference point-in-time, meaning that the point-in-time condition has not been satisfied, the processing proceeds to step S139.

Accordingly, in the event that photographed image data which satisfies the point-in-time condition is obtained, this photographed image data is saved and correlated with the specified target region A1, and then page data wherein the photographed image data has been fit into the specified target region A1 is displayed. On the other hand, in the event that the point-in-time condition has not been satisfied, no photographed image data is saved and correlated with the specified target region A1, and page data with no photographed image data fit into the specified target region A1 is displayed. Thus, filtering based on point-in-time conditions is realized.

The processing operations to be executed in the event that the matching item is "image similarity" will be described with reference to FIG. 21. To reiterate a point made earlier, FIG. 21 illustrates processing to be executed in a case that the matching item is "image color", a case of "person (face)", and a case of "inter-image distance", which are executed as separate processes based on the determination results in step S302, in a form represented as a common flow of processing in a flowchart.

Figure 21:
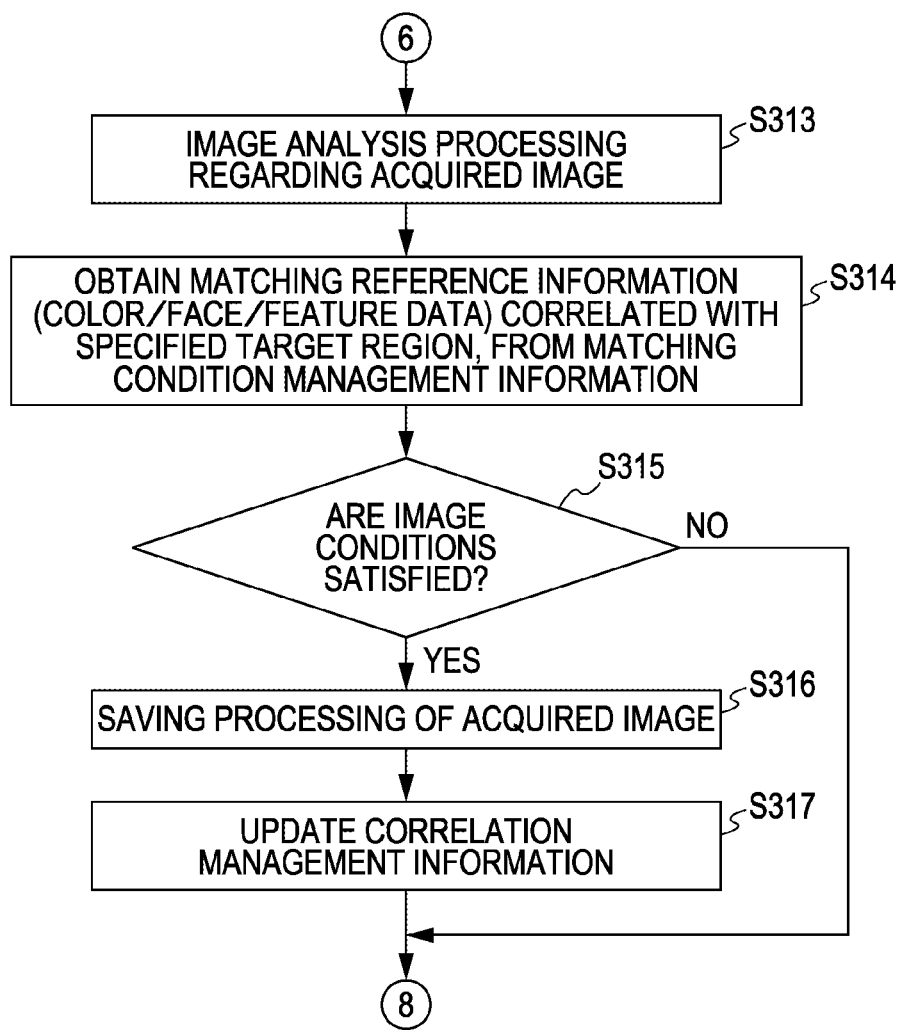
FIG. 21 is a flowchart illustrating processing operations to be performed corresponding primarily to a case of performing filtering regarding a target region for which matching by "image similarity" has been set, as processing operations to be executed to realize operations as the third embodiment.

In step S313 in FIG. 21, first, image analysis processing of an acquired image is executed. That is to say, in the event that the matching item is "image color", image analysis processing is executed for extracting color information (RGB) described earlier from the acquired photographed image data. In the event that the matching item is "person (face)", image analysis processing is executed for extracting a data portion within the photographed image data which can be realized as a face (hereafter referred to as "facial data portion") and calculating the facial data on the extracted facial data portion, and in the event that the matching item is "inter-image distance", image analysis processing is executed for extracting image feature data described earlier from the acquired photographed image data.

In the following step S314, processing is executed for obtaining matching reference information (color/face/feature data) correlated with the target region A1 as specified with the matching condition management information. That is to say, in the event that the matching item regarding the specified target region A1 is "image color, the aforementioned color range information (RGB range) is obtained, in the event of "person (face)", facial data is obtained, and in the event of "inter-image distance", image feature data is obtained.

Thereafter, in step S315, determination processing is performed regarding whether or not the image condition has been satisfied. That is to say, in the event that the matching item is "image color", determination is made regarding whether or not the color information (RGB) extracted from the photographed image data in step S313 is included in the color range information (RGB range) obtained in step S314. Also, in the event that the matching item is "person (face)", the similarity between the facial data calculated in step S313 and the facial data obtained in step S314 is calculated, and determination is made regarding whether or not the similarity is a predetermined value or higher. In the event that the matching item is "inter-image distance", the similarity between the image feature data extracted from the photographed image data obtained in step S313 and the image feature data obtained in step S314 is calculated, and determination is made regarding whether or not the similarity is within a predetermined value (whether or not the similarity is a predetermined value or higher). Determination processing corresponding to each case determines whether or not the acquired photographed image data satisfies the predetermined image conditions.

In step S315, in the event that a positive result is obtained that the image conditions are satisfied, the processing proceeds to step S316, where saving processing of the acquired image is performed, and further the correlation management information is updated in the subsequent step S317, whereby correlation of the photographed image data saved as to the specified target region A1 is performed. Thereafter, the processing proceeds to step S319. On the other hand, in the event that a negative result is obtained that the image conditions are not satisfied, the processing proceeds to step S319.

Accordingly, in the event that photographed image data which satisfies the image condition is obtained, this photographed image data is saved and correlated with the specified target region A1, and then page data wherein the photographed image data has been fit into the specified target region A1 is displayed, while in the event that a negative result is obtained that the image condition has not been satisfied, no photographed image data is saved and correlated with the specified target region A1, and page data with no photographed image data fit into the specified target region A1 is displayed. Thus, filtering based on image conditions such as image color, person (face), and inter-image distance, is realized.

As described earlier, according to the third embodiment, filtering can be performed with regard to correlation of photographed image data to the specified target region A1, based on the results of performing matching based on predetermined conditions, such as position, point-in-time, image features, and so forth. According to the third embodiment as described above, applying a template with a gaming nature in particular to photography allows an arrangement wherein only images photographed within a certain range are to be correlated to the target region A1, and so forth, thereby realizing templates with increased gaming nature and greater entertainment.

Note that the filtering according to the third embodiment can be applied to templates of various usages other than templates for a stamp rally described above, and arrangements can be conceived wherein, depending on the template to be applied, instructions may be provided to correlate the photographed image with the specified target region A1 when the conditions for matching are not satisfied. For example, there may be a case wherein a target subject is instructed to be photographed from a position so many kilometers away, or photography with nobody in the picture may be instructed. In such a case, saving of the acquired image and updating processing of the correlation management information may be executed in response to the condition predetermined regarding the position, point-in-time, image feature, or the like, not being satisfied.

Also, while description has been made so far assuming that all target regions A1 in a template will be subjected to filtering for the sake of facilitating description, there will be cases as a matter of course wherein target regions A1 subjected to filtering and target regions A1 not subjected to filtering coexist in the same template.

In such a case, processing is inserted before the processing of step S301 in FIG. 19 where matching item information is obtained from the matching condition management information, to determine whether or not the target ID of the specified target region A1 exists in the matching condition management information. In the event that determination is made that the target ID of the specified target region A1 is there, the processing proceeds to step S301 and thereafter, and in the event that determination is made that the target ID of the specified target region A1 is not there, processing for saving the acquired image and correlating the saved image to the target region A1 (updating processing of the correlation management information) is performed in the same way as with the first embodiment.

Also, whether or not to subject to filtering may be set for each template besides settings for each target region A1 in the same template as described above. That is to say, the templates may be classified such that filtering is performed for all target regions A1 for templates of which the category is "game" for example, but no target regions A1 are filtered for templates of other categories.

In such a case, whether or not filtering is to be performed can be determined for each template. That is to say, in this case, management information is prepared beforehand determining whether or not to subject to filtering, in increments of templates. Thereafter, following template specification being performed, processing for determining whether or not the template (project) specified based on the management information is to be subjected to filtering is inserted at a point at least before the matching item obtaining processing is performed in step S301, so that the processing of step S301 and on is performed only in the event that determination is made in this determining processing that the template is to be subjected to filtering. On the other hand, in the event that determination is made that the template is not to be filtered, processing for saving acquired images and correlating to the target regions A1 (updating processing of the correlation management information) is performed for all target regions A1 in the specified template in the same way as with the first embodiment.

Also, while the matching reference information has been described above as being information correlated separately by the matching condition management information, in the event there is information which can be used as matching reference information within the instruction information correlated to each target region A1 for example, the relevant information within the instruction information may be used as the matching reference information, as a matter of course.

Also at this time, an arrangement may be made wherein performing matching for which matching item for each target region A1 can be specified based on the matching reference information within the instruction information correlated thus to the target region A1. For example, the correlation between the information to be used as matching reference information within the instruction information and the matching item can be determined beforehand, and based on such correlation, performing matching for which matching item can be specified from the matching reference information within the instruction information.

It should be noted that even in the event of using a part of the instruction information in this way as matching reference information, with matching items being identified from the matching reference information, the matching reference information and matching item information are still information correlated with the target region A1.

Also, while an example has been illustrated above wherein correlation with the photographed image data is made based on a single condition, arrangements may be made wherein correlation is performed upon multiple conditions, such as position and point-in-time, and image similarity and position being satisfied, for example.

As an example, let us say that there is instruction information regarding a certain target region A1 to "photograph so-and-so in a sunset". In this case, the specified target region A1 and the photographed image data would be correlated in the event that the position is within a radius distance r from the position of the subject, and the color of the image is within a predetermined color range corresponding to the color of a sunset, such as orange or red. Performing matching combining multiple conditions in this way can enable more accurate filtering.

Also, even in cases of performing the filtering according to the third embodiment, automatic addition of metadata according to the second embodiment can be performed as well. That is to say, in accordance with the photographed image data satisfying the matching conditions, metadata can be added to the photographed image data and saved. Specifically, the processing of steps S201 and S202 described with FIG. 17 above can be executed instead of the saving processing in step S306 in FIG. 19, step S311 in FIG. 20, and step S316 in FIG. 21.

Fourth Embodiment

With the first through third embodiments described so far, description has been made regarding a case wherein the target region A1 with which the photographed image is to be correlated is specified by none other than user operations, and the apparatus side correlates the photographed image data with the specified target region A1, but with the fourth embodiment, this point is modified to where the apparatus side automatically searches for a target region A1 to which the photographed image data can be correlated.

Now, matching condition management information similar to that described with the third embodiment described above is used for searching for the target region A1 to which to correlate the photographed image data. That is to say, in this case as well, information is prepared beforehand correlated with the matching item information and matching reference information, as the matching condition management information, for each target region A1 (target ID), as described above in FIG. 18. As can be understood from the above description, the matching item information and matching reference information function as information for defining the conditions of the photographed image to be fit into the target region A1. That is to say, correlating matching item information of "position" and matching reference information of position information representing the location of the subject as to a target region A1 regarding which an instruction of "photograph so-and-so" given enables determination to be performed regarding whether or not photographed image data satisfies conditions to be fit into the object target region A1, by performing matching according to each information.

With the fourth embodiment, such matching condition management information is used to determine whether or not the photographed image data satisfies matching conditions defined with the matching item information and matching reference information function, for each target region A1. Thus, a target region A1 in which to fit the photographed image data is searched.

Note that with the fourth embodiment as well, the matching condition management information is stored in the non-volatile memory 13 as a part of the template data 13a.

FIGS. 22 through 25 are flowcharts illustrating processing operations to be executed to realize the automatic search for target regions A1 according to the fourth embodiment. The processing operations shown in these drawings are also executed by the system controller 2 shown in FIG. 2 based on programs stored in the internal ROM or the like, for example.

First, we will assume that in this case as well, the user performs operations for specifying the category→specifying the template (theme)→specifying the project to perform photography using a template, so as to display a desired template. That is to say, in this case, automatic searching for the target region A1 is executed following the user having specified the project, and accordingly, the range of the search within a single project.

Figure 22:
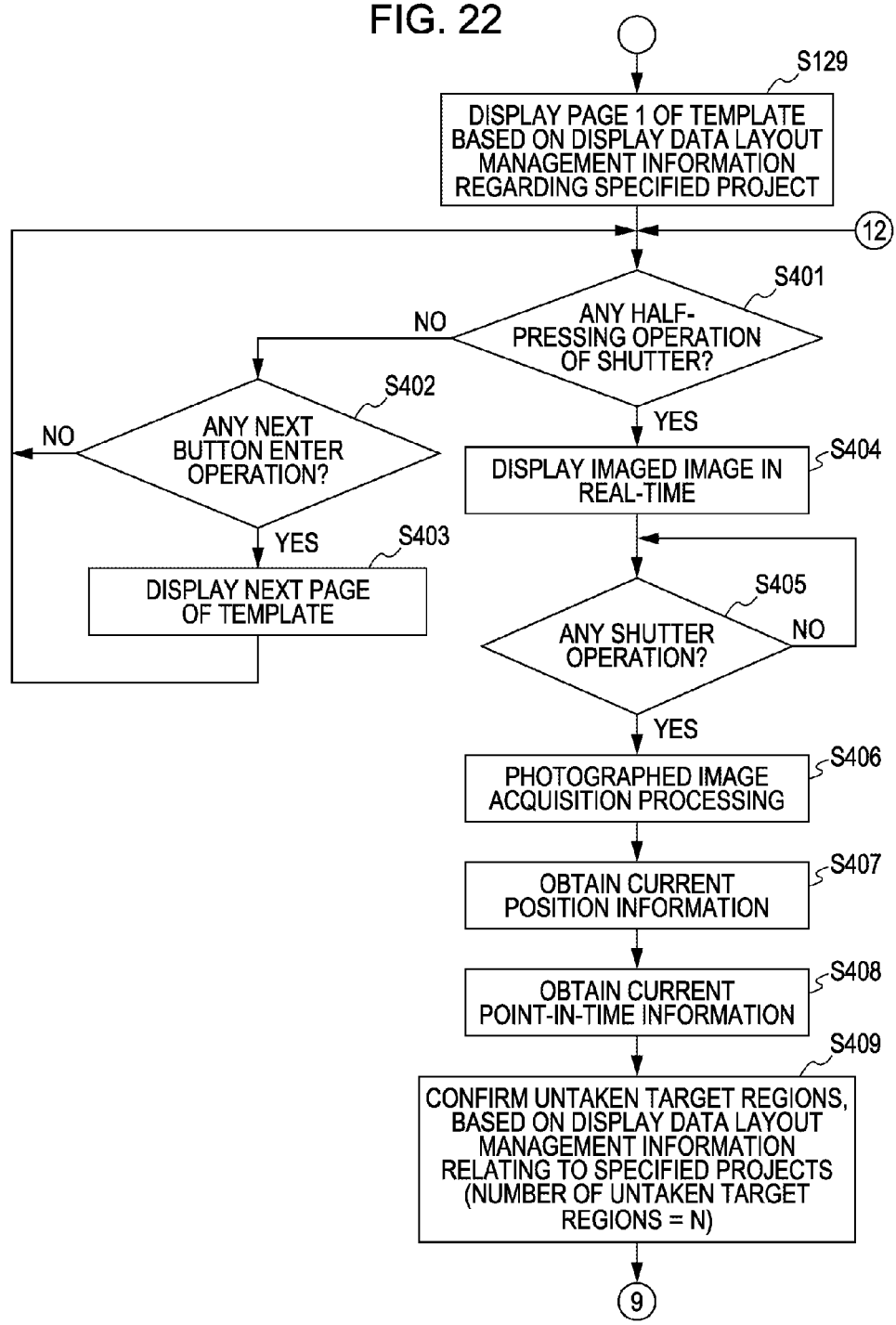
FIG. 22 is a flowchart illustrating processing operations to be performed corresponding primarily to operations after a certain project specification operation is performed until an untaken target region within the project is confirmed, as processing operations to be executed to realize operations as a fourth embodiment.

FIG. 22 primarily illustrates the processing following specification operations being performed for a certain project, up to configuration of an unphotographed target region A1 within the project. As described above, in the same way as with the above-described first embodiment, this case assumes the user performing operations for specifying the category→specifying the template (theme)→specifying the project, being performed in common.

In FIG. 22, step S129 is processing for displaying the first page of the template, based on the display data layout management information regarding the specified project, in response to the project having been specified.

In the fourth embodiment, the processing following this step S129 is modified. In this case, in response to step S129 having been executed processing for standing by for a half-pressing operation of the shutter and an enter operation of the Next button B1 is executed by the processing in steps S401 and S402.

In the event that determination has been made in step S402 that an enter operation of the Next button B1 has been performed, processing is executed for displaying the next page of the template in step S403, and the flow returns to step S401. On the other hand, in the event that determination is made in step S401 that a half-pressing operation of the shutter has been performed, the processing proceeds to step S404.

In step S404, real-time display processing of the imaged image is performed, in the same way as with the step S134. In the following step S405, processing for standing by for a shutter operations is performed.

In the event that determination is made in step S405 that a shutter operation has been performed, processing is performed in this case as well to acquire the photographed image in step S406. In this case, following the photographed image being acquired, processing for acquiring current position information is first performed, following which processing for acquiring current point-in-time information is performed, in steps S407 and S408.

In the next step S409, processing is executed for confirming unphotographed target regions A1 based on the display data layout management information for the specified project. That is to say, the target ID information for all of the target regions A1 within the specified project is obtained with reference to the display data layout management information for the specified project (within the specified template data 13a). The target regions A1 that are unphotographed (the target regions A1 to which photographed images have not been fit yet) within the specified project are confirmed by confirming whether or not these obtained target IDs exist. This confirmation processing tells the number of unphotographed target regions A1 as well. In the following we will say that the number of such unphotographed target regions A1=N. Upon the processing in step S409 being executed, the processing proceeds to step S410 shown in the next FIG. 23.

Figure 23:
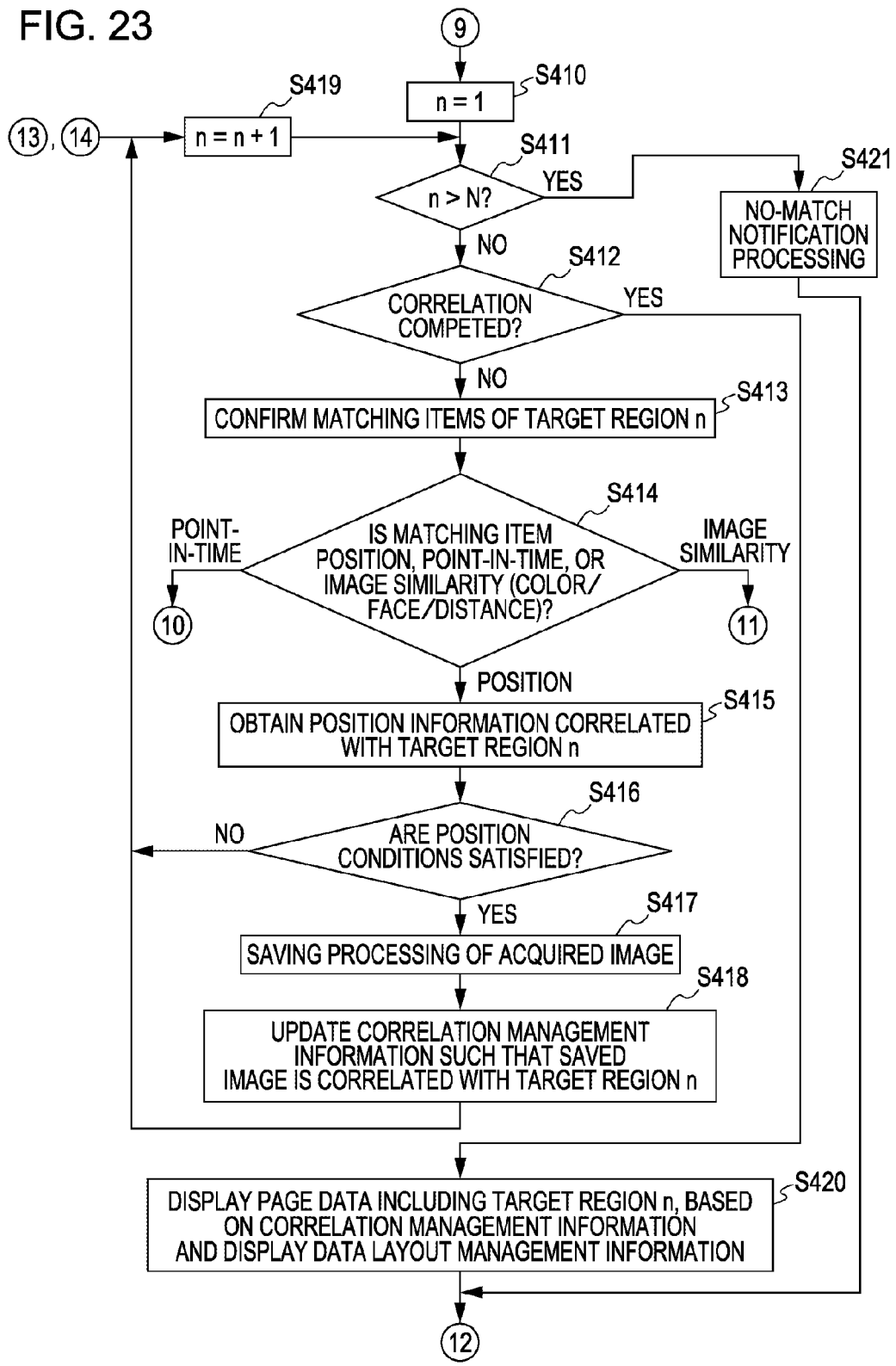
FIG. 23 is a flowchart illustrating processing operations to be performed corresponding primarily to a case of performing filtering regarding a target region for which matching by "position" has been set, as processing operations to be executed to realize operations as the fourth embodiment.

FIG. 23 is a specific example of matching processing to be executed for automatic searching, primarily illustrating processing operation to be executed in accordance with a case of performing matching with regard to a target region A1 of which the matching item has been set to "position".

In step S410 in FIG. 23, first, processing for setting n=1 is performed. The numerical value of "n" is a value which the system controller 2 counts, in order to identify the target region A1 which is currently the object of matching, and to determine whether or not matching processing has been performed for all target regions A1 within the search range, as can be seen in later description.

In the following step S411, determination is made regarding whether or not n>N holds. That is to say, the processing in this step S411 is equivalent to processing for determining whether or not matching processing has been performed for all target regions A1 to be searched.

In the event that determination is made in step S411 that n>N does not hold and that the matching processing has not been performed for all target regions A1, determination is made in step S412 regarding whether or not correlation has been completed. That is to say, determination is made regarding whether or not a target region A1 to which photographed image data (acquired image data) is to be correlated (i.e., a relevant target region A1) has already been searched and photographed image data has been correlated with this relevant target region A1.

In the event that a negative result is obtained in step S412 to the effect that correlation has not been completed, the processing proceeds to step S413, where first, processing is executed for confirming the matching item of the target region n. Note that the term "target region n" refers to the n'th target region A1 of the unphotographed target regions A1. In step S413, the matching item information correlated with the target ID of the target region n is obtained from the matching condition management information.

In the processing in step S414, in the same way as with step S302 in FIG. 19 described earlier, which of "position", "point-in-time", and "image similarity" the matching item is, is determined. In the event that determination is made in step S414 that the matching item is "point-in-time", the processing proceeds to step S422 in the later-described FIG. 24. Also, in the event that determination is made in step S414 that the matching item is "image similarity", the processing proceeds to step S426 in the later-described FIG. 25. Also, in the event that determination is made that the matching item is "position", the processing proceeds to step S415. It should be noted that the actual handling of "image similarity" in this case also is similar to that in the case of the third embodiment.

In step S415, processing is executed for obtaining the position information correlated with the target region n. That is to say, the position information serving as the matching reference information, which has been correlated with the target ID of the target region n, is obtained from the matching condition management information.

The processing in the following steps S416 through S418 is processing the same as the steps S305 through S307. That is to say, in step S416, determination processing is performed regarding whether or not the position condition has been satisfied, based on the current position information obtained (the current position information obtained in step S407 in this case) and the position information obtained in step S415 (reference position information). In the event that a positive result is obtained from the determination processing that the position condition has been satisfied, the acquired image saving processing and correlation management information updating processing is performed by the processing in steps S417 through s418, so that the saved photographed image data is correlated with the relevant target region A1 (i.e., in this case, the target region n).

In this case, following updating of the correlation management information in step S418, the flow proceeds to step S419 as shown in FIG. 23 and n=n+1 is performed, and then the processing returns to step S411. On the other hand, in the event that a negative result is obtained that the position condition has not been satisfied, the processing proceeds as is to step S419 and n=n+1 is performed, after which the processing returns to step S411.

Due to the processing described above being executed, matching by position is performed for the unphotographed target regions A1 regarding which "position" has been set as the matching information, and consequently, in the event that the condition is satisfied the target region A1 is detected as the relevant target region A1, and the photographed image is correlated to the relevant target region A1. On the other hand, in the event that determination is made that the target region A1 does not satisfy the condition, processing for confirming the matching item for the next unphotographed target region A1 and matching processing based on that matching item, is performed.

Next, the processing operations to be performed in the event that the matching item is "point-in-time" will be described with reference to FIG. 24.

Figure 24:
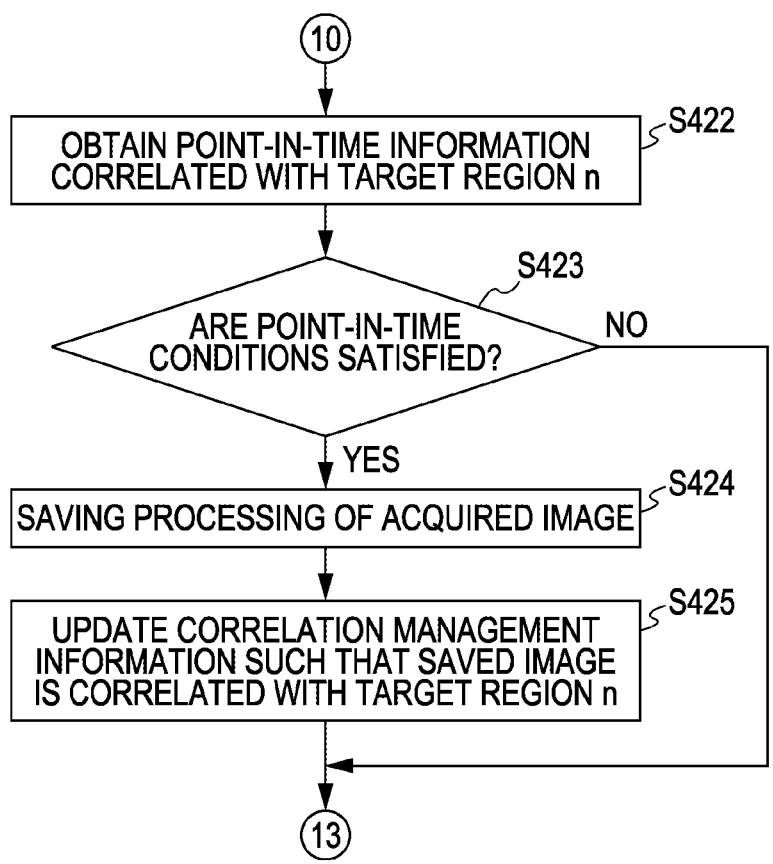
FIG. 24 is a flowchart illustrating processing operations to be performed corresponding primarily to a case of performing filtering regarding a target region for which matching by "point-in-time" has been set, as processing operations to be executed to realize operations as the fourth embodiment.

In step S422 in FIG. 24, first, processing is executed for obtaining the point-in-time information correlated with the target region n. That is to say, the point-in-time information serving as the matching reference information, which has been correlated with the target ID of the target region n, is obtained from the matching condition management information.

The processing in the following steps S423 through S425 is processing the same as the steps S310 through S312 described above with reference to FIG. 20. That is to say, in step S423, determination processing is performed regarding whether or not the point-in-time condition has been satisfied, based on the current point-in-time information obtained (the current point-in-time information obtained in step S408 in this case) and the point-in-time information obtained in step S422. In the event that a positive result is obtained from the determination processing that the point-in-time condition has been satisfied, the acquired image saving processing and correlation management information updating processing is performed by the processing in steps S424 and S425, so that the saved photographed image data is correlated with the relevant target region A1 (the target region n).

In this case as well, following updating of the correlation management information in step S425, the flow proceeds to step S419 as shown in FIG. 23 and n=n+1 is performed, and then the processing returns to step S411. On the other hand, in the event that a negative result is obtained that the point-in-time condition has not been satisfied, the processing proceeds as is to step S419 and n=n+1 is performed, after which the processing returns to step S411.

Due to the processing described above being executed, matching by point-in-time is performed for the unphotographed target regions A1 regarding which "point-in-time" has been set as the matching information, and consequently, in the event that the condition is satisfied the target region A1 is detected as the relevant target region A1, and the photographed image is correlated to the relevant target region A1. On the other hand, in the event that determination is made that the target region A1 does not satisfy the condition, processing for confirming the matching item for the next unphotographed target region A1 and matching processing based on that matching item, is performed.

Figure 25:
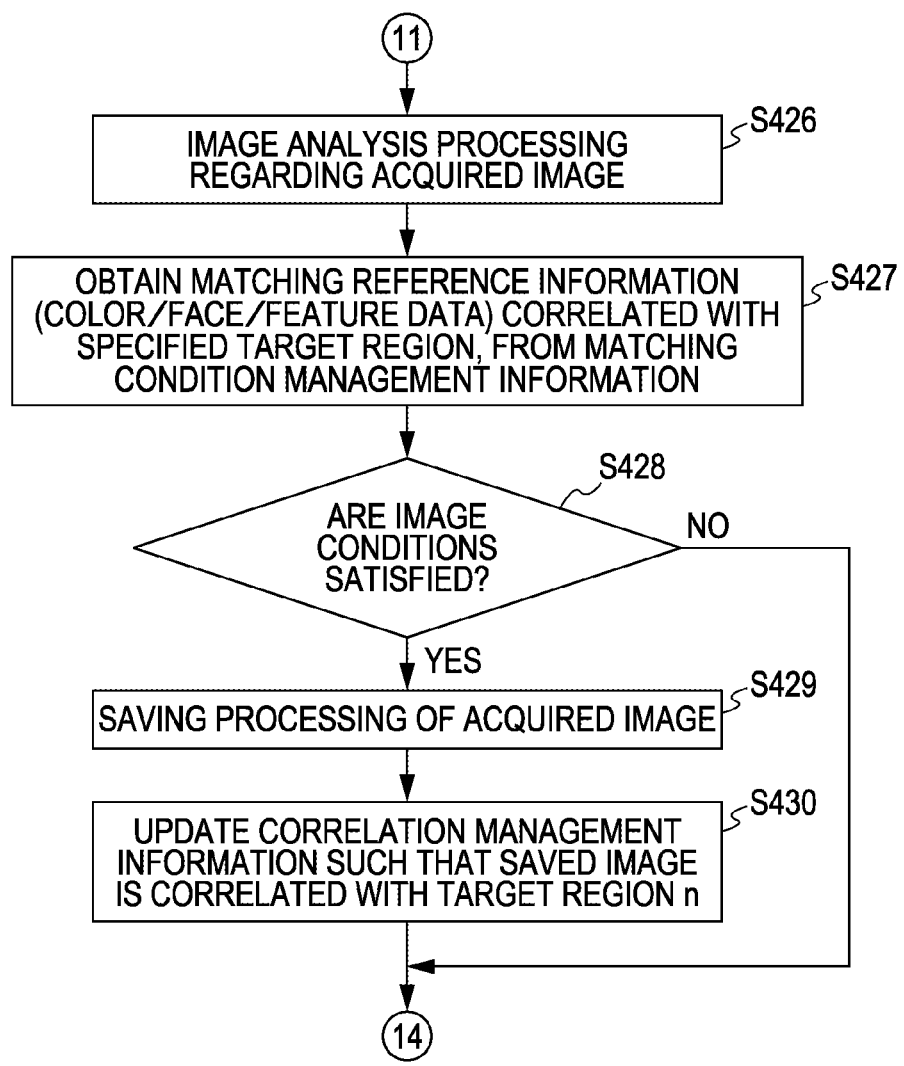
FIG. 25 is a flowchart illustrating processing operations to be performed corresponding primarily to a case of performing filtering regarding a target region for which matching by "image similarity" has been set, as processing operations to be executed to realize operations as the fourth embodiment.

Next, the processing operations to be performed in the event that the matching item is "image similarity" will be described with reference to FIG. 25.

In step S426, first, image analysis processing of an acquired image is executed. That is to say, as with step S313 described above, in the event that the matching item "image color", image analysis processing is executed for extracting color information (RGB) described earlier from the acquired photographed image data, in the event that the matching item is "person (face)", image analysis processing is executed for extracting a data portion within the photographed image data which can be realized as a face (hereafter referred to as "facial data portion") and calculating the facial data on the extracted facial data portion, and in the event that the matching item is "inter-image distance", image analysis processing is executed for extracting image feature data described earlier from the acquired photographed image data.

In the following step S427, processing is executed for obtaining matching reference information (color/face/feature data) correlated with the target region n from the matching condition management information. That is to say, in the event that the matching item regarding the target region n is "image color, the color range information (RGB range) correlated with the target ID of the target region n is obtained, in the event of "person (face)", facial data is obtained, and in the event of "inter-image distance", image feature data is obtained.

The processing in the following steps S428 through S430 is processing the same as the steps S315 through S316 described above. That is to say, in step S428, determination processing is performed regarding whether or not the acquired photographed image data satisfies the predetermined image condition, corresponding to each of the case of the matching items being "image color", "person (face)", or "inter-image distance", as with the above-described step S315. In the event that a positive result is obtained from the determination processing that the image condition has been satisfied, the acquired image saving processing and correlation management information updating processing is performed by the processing in steps S429 and S430, so that the saved photographed image data is correlated with the relevant target region A1 (the target region n).

In this case as well, following updating of the correlation management information in step S430, the flow proceeds to step S419 as shown in FIG. 23 and n=n+1 is performed, and then the processing returns to step S411. On the other hand, in the event that a negative result is obtained in step S428 that the image condition has not been satisfied, the flow proceeds to step S419 as it is and n=n+1 is performed, and then the processing returns to step S411.

Due to the processing described above being executed, matching by predetermined conditions relating to images performed for the unphotographed target regions A1 regarding which "image similarity" has been set as the matching information, and consequently, in the event that the condition is satisfied the target region A1 is detected as the relevant target region A1, and the photographed image is correlated to the relevant target region A1. On the other hand, in the event that determination is made that the target region A1 does not satisfy the condition, processing for confirming the matching item for the next unphotographed target region A1 and matching processing based on that matching item, is performed.

With the processing described so far, matching processing according to the matching set for each target region A1 is repeated on all unphotographed target regions A1 until a relevant target region A1 is found. In the event that the result of repeating such matching processing shows that there is no relevant target region A1 in the unphotographed target regions A1 in the project, n>N is found to hold in step S411 in FIG. 23, which is a positive result.

In the event that the positive result of n>N is found to hold in step S411 the flow proceeds to step S421 as shown in FIG. 23, and executes notification processing that there is no match. This no-match notification processing can be performed by notifying the user that there was no relevant target region A1 in the specified project by displaying a predetermined message on the display unit 5, for example.

Upon performing the notification processing in step S420, the flow is returned to step S401 in FIG. 22. That is to say, the user can be allowed to photograph again.

On the other hand, in the event that a positive result is obtained in the determination processing of any of the steps S416, S423, and S428, and updating processing of the correlation management information is executed in any of the steps S418, S425, and S430, the positive result that correlation has been completed is obtained in step S412 in FIG. 23.

In the event that the positive result is obtained in step S412 that correlation has been completed, the processing proceeds to step S420 as shown in the diagram, and processing is executed for displaying page data including the target region n, based on the correlation management information and display data layout management information. Executing this step S420 results in page data with the photographed image data fit into the target region A1 being displayed in the event there a relevant target region A1 has been found. Accordingly, the user can be notified of the target region A1 to which the photographed image data has been fit, and also the user can make confirmation regarding the saved image data. After executing the processing of step S420, the flow returns to step S401 in FIG. 22.

Note that while description has been made so far that the operation for going from viewing of the specified project (template) to real-time display of the imaged image is a half-pressing operation of the shutter, but it goes without saying that other operations may be used for bringing up the real-time display as well.

Also, description has been made above regarding an arrangement wherein the user performs up to the operation for specifying the project, the reason thereof being as follows. With this example, multiple projects can be made with a single template, such as visiting Rome in 2005 and 2006 for example, which would mean that there are multiple target regions A1 with exactly the same instructions, so the apparatus side would not be able to determine which of the projects (templates) the photographed image data should be fit to the target regions A1.

However, with an arrangement where multiple projects are not created from one template, specification of the project by the user can be done away with. Further, instructions for category and template can be done away with as well. That is to say, with an arrangement where multiple projects do not coexist, trouble wherein multiple target regions A1 with exactly the same instructions exist can be avoided, and accordingly there is no need for the user to specify category or template.

Accordingly, if we do away with the concept of projects in this way and say that only one template exists per template theme, the photography apparatus 1 can automatically search all target regions A1 in all categories to be searched. Thus, the user can correlate the photographed image data with a relevant target region A1 simply by performing shutter operations at the least.

Now, in the event of performing automatic searching with all target regions A1 of all categories as the search range, there is no need to use a technique of the user always viewing templates before photographing, as with the above embodiments.

For example, a technique such as described next can be used. First, we will assume that the photography apparatus 1 in this case is provided with a template viewing mode and a template photography mode for photographing images to be fit into templates.

The template viewing mode is a mode wherein image transition is performed as described earlier with reference to FIGS. 7 through 11 (excluding the project selection screen in FIG. 9) in accordance with user operations, so that the specified template within the specified category is displayed. No instructions of target regions A1 are accepted at the time of template viewing.

Also, with the template photography mode, the screen is first switched over to real-time display of the imaged image in response to the user having specified this mode for example, and all templates of all categories are searched in response to a shutter operation being made during the real-time display. Further, in the event that a matching target region A1 has been found as the result of the search the photographed image data is saved and the photographed image data is correlated with the target region A1. On the other hand, in the event that no matching target region A1 has been found, the photographed image data is not saved, and no photographed image data is correlated with any of the target regions A1, for example.

Even in the event of using such a viewing/photography mode switching technique, the user can still view specified templates in the template viewing mode, and accordingly, the user can still be presented with instruction information at the photography apparatus 1.

Also, with the template photography mode, when fitting the photographed image to the template, the user does not have to perform category specification and template specification operations as described above at the time of photography. In this case for example, operations necessary for starting photography can be made to be only the one operation for switching from the viewing mode to the photography mode, at the least.

According to the fourth embodiment as described above, the load on the user regarding operations to fit photographed images into templates can be alleviated. Also, in addition to alleviating the load on the user regarding such operations, templates such as described below can be realized.

For example, a template can be realized for "visiting all States" with automatic placement (automatic searching) with "position" as the matching item. This "visiting all States" is a template with instructions to take photographs of all States in the USA. A map of the USA showing state lines is displayed, and the photographed images are positioned at blanked-out state shapes on the map. In this case, the regions corresponding to the states in the map are the target regions A1, and the shapes and names of the states, and so forth on the map, are information instructions to take a photograph in that State.

Another example of automatic placement in the case that "image similarity" is the matching item is a "create a mosaic" template. With this "create a mosaic" template, a base image is divided into a grid of 20×20 for example, and disposed on each page. Each of the 20×20=400 squares are a target region A1, and photographs taken by the user are to be fit into the closest-matching square thereof. For example, if we say that the base image is the face of a certain individual, and there is a square corresponding to the "eye" of that individual, a photograph that is taken which has a black center portion surrounded by a white portion might be reduced and placed at the "eye" portion thereof. In this case, the matching item of the target region A1 serving as the "eye" would be "inter-image distance", and the matching reference information would be a sample image where "a black center portion is surrounded by a white portion".

With this "create a mosaic" template, the user would look for compositions which would yield a color placement or appearance like that of the image displayed there, for each square that is unphotographed. That is to say, the images displayed in each square serve primarily as instruction information.

Note that with this fourth embodiment as well, as with the third embodiment, multiple condition combinations can be used for matching. In this case as well for example, if there is instruction information regarding a certain target region A1 to "photograph so-and-so in a sunset", conditions of position, point-in-time, and image features would be combined, and the specified target region A1 and the photographed image data would be correlated in the event that the position is within a radius distance r from the position of the subject, and the color of the image is within a predetermined color range corresponding to the color of a sunset, such as orange or red.

With the fourth embodiment, performing matching with multiple conditions combined allows correlation with automatic matching to be performed more accurately.

Also, with the fourth embodiment as well, as with the third embodiment, a part of the instruction information correlated with the target region A1 can be used as matching reference information, and also, matching items can be identified from such matching reference information in the instruction information.

Fifth Embodiment

The fifth embodiment involves fitting of photographed images to the templates not at the photography apparatus 1 side but rather at an external information processing device (in this case, the personal computer 20).

In the fifth embodiment, the photography apparatus 1 performs as far as display of templates in accordance with user operations (i.e., display of instruction information), and photographed image data acquisition and saving in accordance with shutter operations.

As a specific example, the photography apparatus 1 can switch between a template viewing mode and photography mode, as described earlier. That is to say, providing a template viewing mode enables the user to view templates (view instruction information). In this case, the technique used in the first through third embodiments wherein the target region A1 is specified from the template viewing screen and an image to be fit into the specified target region A1 is taken, is not employed, with the user switching the mode to the photography mode at the time of photographing. That is to say, with this photography apparatus 1, first, real-time display of the imaged image is performed upon being switched to the photography mode, so as to be in a photography standby state. The photography apparatus 1 stands by for a shutter operation by the user, and in response to a shutter operation having been performed, image data acquisition and saving processing is performed. That is to say, the "photography mode" in this case is a normal photography mode wherein a photographed image is saved in a normal manner without being correlated with a target region A1.

Correlation of the photographed image data saved at the photography apparatus 1 in this way to a target region A1 is performed at the personal computer 20 side. At the personal computer 20 in this case, first, the photographed image data and template data 13a are acquired from the photography apparatus 1 side, with the template data/photographed image acquisition function F3 of the photography apparatus management application 30a described earlier with reference to FIG. 5. Thereafter, the template viewing function F4 is used to specify the target region A1 to which the photographed image data is to be fit into.

Now, in the case of the fifth embodiment, the template viewing function F4 not only simply performs category specification→template theme specification→project specification→page turning, but can also specify the target region A1. That is to say, the target region A1 to which the photographed image data should be fit can be specified at the personal computer 20 side.

In response to the target region A1 having been specified, a list of the photographed image data is displayed, and specification of the photographed image data to be fit to the specified target region A1 is accepted. The photographed image data that is specified form the list screen is correlated with the specified target region A1.

Here, from the perspective of the user regarding the operations of the fifth embodiment, the user who holds the photography apparatus 1 first switches to the template viewing mode, so as to display a main screen such as shown in FIG. 7. Consequently, category specification→template theme specification→project specification is performed, so as to display a template to serve as a project into which photographed image data is to be fit, and further, a page including the target region A1 in the project to which photographed image data is to be fit is displayed, thereby obtaining instruction information on what sort of photograph should be taken. Thereafter, at the time of photographing the image to be fit therein, the mode is switched to the photography mode and a shutter operation is performed, thereby acquiring and saving photographed image data. For example, after several images have been taken to fit into several target regions A1 in this way, the photographed image data saved in the memory card 15 and the template data are transferred to the personal computer 20 side.

At the time of fitting the photographed image data acquired in this way to the desired target region A1 at the personal computer 20 side, first, the photography apparatus management application 30a is activated. The user performs category specification→template theme specification→project specification, and→page turning if necessary, performing operations based on the screen display, so as to view the template. The target region A1 to fit to is then specified.

In response to specifying of the target region A1, a list screen of the photographed image data acquired in the HDD 30 is displayed, from which the user specifies the photographed image data to be fit to the target region A1. This instruction instructs correlation of the photographed image data to the target region A1.

Figure 26:
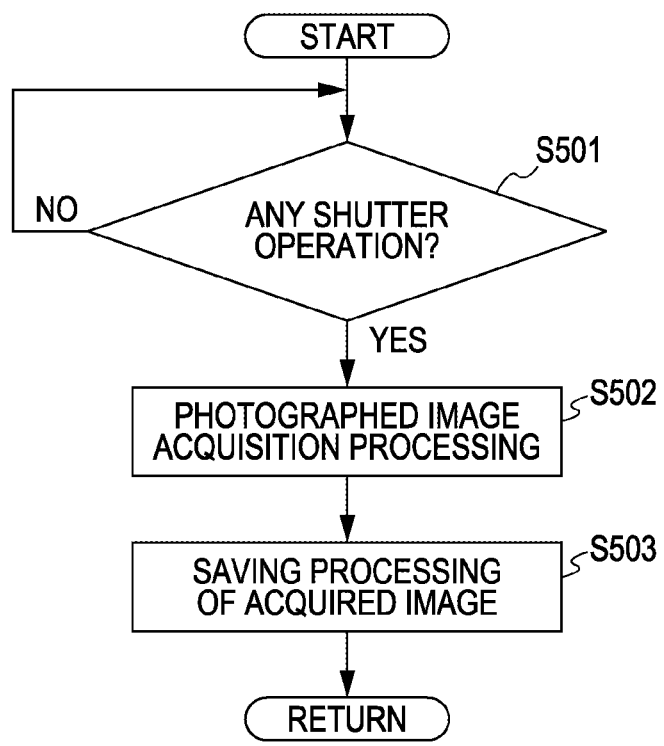
FIG. 26 is a flowchart illustrating processing operations to be executed corresponding to the photography apparatus being in a state of photographing, as a fifth embodiment.
Figure 27:
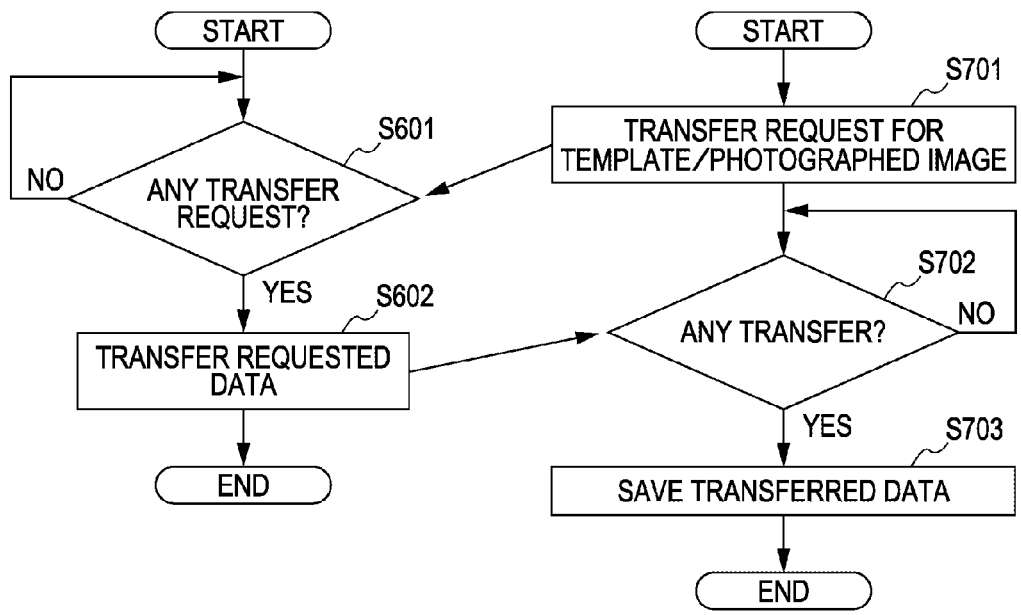
FIG. 27 is a flowchart illustrating processing operations to be executed at the photography apparatus and information processing device corresponding to being in a state of transferring a template.
Figure 28:
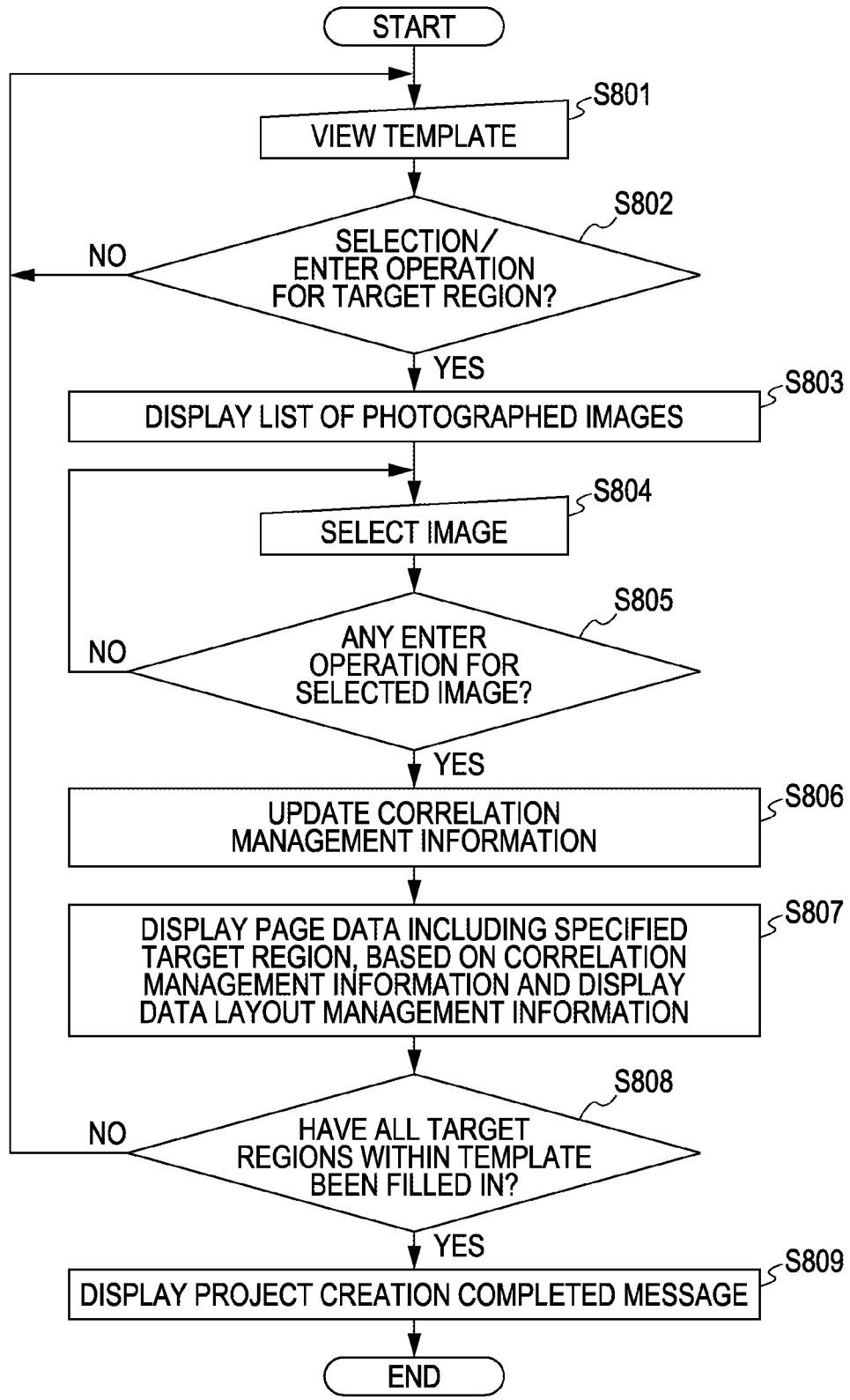
FIG. 28 is a flowchart illustrating processing operations to be executed at the information processing device, as the fifth embodiment.
Figure 29:
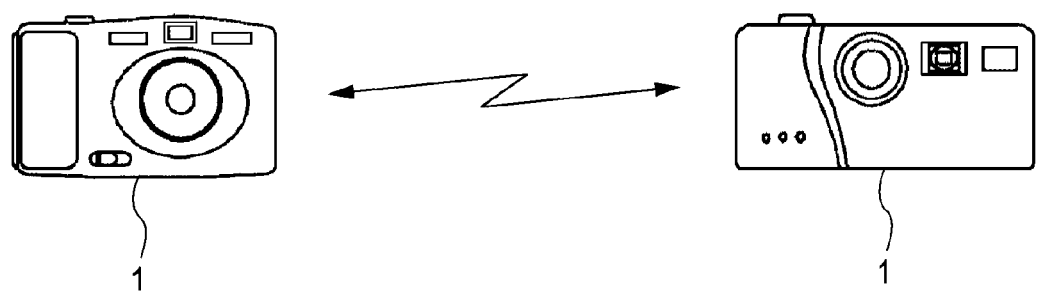
FIG. 29 is a diagram illustrating an example of a system configuration as a sixth embodiment.

FIGS. 26 through 28 are flowcharts for describing processing operations to be executed in order to realize the operations of the fifth embodiment described above. Note that the processing operations shown in these drawings are also executed by the system controller 2 shown in FIG. 2 based on programs stored in the internal ROM or the like, for example. Also, the processing operations shown as being performed by the personal computer are executed by the CPU 21 shown in FIG. 4 based on a program serving as the photography apparatus management application 30a.

First, FIG. 26 illustrates processing operations to be executed at the photography apparatus 1 side at the time of image photography. We will assume that at the time of the processing operations shown in this drawing being executed, the mode has already been switched to the photography mode.

In step S501 in FIG. 26, the flow stands by for a shutter operation, and in the event that a shutter operation has been performed, the photographed image acquisition processing of step S502 is performed. Following saving processing of the acquired image in the subsequent step S503, the flow returns.

Note that the processing operations shown in FIG. 26 may be ended in accordance with the mode being switched from the photography mode to another mode (e.g., template viewing mode or the like).

FIG. 27 illustrates the processing operations to be executed in accordance with transfer of template data 13a and photographed image data from the photography apparatus 1 side to the personal computer 20 side.

FIG. 27 shows an example wherein the photography apparatus 1 and the personal computer 20 are connected with a communication cable for example, and the personal computer 20 side acquires the template data 13a and photographed image data via the external communication interface 29.

In step S701 in FIG. 27, the personal computer 20 side performs a transfer request for templates and photographed images.

The photography apparatus 1 side stands by for the transfer request from the personal computer 20 side in step S601, and in the event that there is a transfer request, executes the transfer processing of requested data in step S602. That is to say, the photographed image data saved in the memory card 15 and the template data 13a stored in the non-volatile memory 13 are transferred to the personal computer 20 side by the communication unit 12 shown in FIG. 2.

At the personal computer side, in step S702 following step S701, the transfer of data from the photography apparatus 1 is being awaited, and in the event that the data is transferred, saving processing of the transferred data executed in step S703. As described earlier, the location where the photographed image data and template data 13a acquired from the photography apparatus 1 is, for example, the HDD 30.

It should be noted that with the template data/photographed image acquisition function F3 at the personal computer 20 side, the photographed image data saved at the photography apparatus 1 can be acquired via the memory card interface 31 as well, besides being obtained by communication cable as with this example. In the event of obtaining template data at the personal computer 20 side via the memory card interface 31, the template data 13a stored at the non-volatile memory 13 is copied to the memory card 15 side at the photography apparatus 1.

FIG. 28 illustrates the processing operations to be executed at the personal computer 20 side at the time of fitting photographed images to the target region A1. We will say that at the time of executing the processing operations shown in FIG. 28, the user has already performed category specification→template theme specification→project specification, and the page data within the template of the specified project is already in a displayed state.

In steps S801 and S802 in FIG. 28, first, processing is executed for accepting instructions of a target region A1 to which the photographed image is to be fit. That is to say, in step S801, in the event that an operation for selecting and entering the Next button B1 within the page data being displayed on the display 27 (e.g., an operation of placing a pointer displayed on the screen at the input unit 25 over the Next button B1 by mouse operations and then double-clicking the mouse in that state) as processing for viewing the template, processing is executed for displaying the page data of the next page, and the template is viewed as the project specified by the user. In step S802, determination is made regarding whether or not a target region A1 has been selected and an entering operation has been performed. That is to say, determination is made regarding whether or not an operation of placing a pointer displayed on the screen at the input unit 25 over the Next button B1 by mouse operations and then double-clicking the mouse in that state, has been performed.

In the event that a negative result is obtained in step S802 that a selecting/entering operation (specifying operation) of the target region A1 has not been performed, the flow returns to step S801. On the other hand, in the event that a positive result is obtained in step S802 that a specifying operation of the target region A1 has been performed, the processing proceeds to step S803.

In step S803, processing for displaying a list of photographed images is executed. That is to say, a list of photographed image data acquired from the photography apparatus 1 side with the template data/photographed image acquisition function F3 and stored in the HDD 30 is displayed as thumbnail images or the like, for example.

In the subsequent steps S804 and S805, processing for accepting instructions of a photographed image to be fit to the specified target region A1 is performed. That is to say, in step S804, processing for moving the position of the pointer within the list screen displayed by the processing in step S803 is performed in accordance with a mouse operation at the input unit 25, and in step S805, determination is made regarding whether or not an entering operation has been made regarding the selected image. In the event that a negative result is obtained in step S805 that a predetermined operation for entering the selected image, such as double clicking the mouse in the state that a desired photographed image (thumbnail image in this case) in the list screen has been selected with the pointer, has not been performed, the flow returns to step S804. On the other hand, in the event that a positive result is obtained in step S805 that a predetermined operation for entering the selected image has been performed, the processing proceeds to step S806.

In step S806, updating processing of the correlation management information is performed. That is to say, processing is performed whereby the photographed image data specified by the steps S804 and S805 is correlated with the target region A1 specified by the processing in steps S801 and S802, and the correlation management information within the template data 13a for the template including the specified target region A1 stored in the HDD 30 is updated.

In the following step S807, processing is executed for displaying page data including the specified target region A1, based on the correlation management information and display data layout management information. By the processing of this step S807 being executed, the user can confirm a screen wherein the specified photographed image data has been fit into the specified target region A1.

At the next step s808, determination is made regarding whether all target regions A1 within the template have been filled in. That is to say, determination is made regarding whether or not all target regions A1 have been correlated with photographed image data for the specified project (template data 13a), based on the display data layout management information and correlation management information.

In the event that a negative result is obtained in step S808 that not all target regions A1 in the template have been filled in, the flow returns to step S801. Accordingly, the photographed image can be fit to the next target region A1.

On the other hand, in the event that a positive result is obtained in step S808 that all target regions A1 in the template have been filled in, the flow advances to step S809 and a project creation completed message is displayed. For example, message data for notifying completion, such as "Your project has been completed" is displayed on the display 27.

While only processing after a certain project has been specified has been illustrated here, in reality, a configuration is made wherein the user can return to a screen of a higher hierarchical level. For example, in this case a configuration may be made wherein an icon is displayed as a "return" button within each screen, and processing for returning the screen to that of the upper hierarchical level is executed by specifying this icon.

Thus, according to the fifth embodiment, image data photographed based on the instruction information of a template at the photography apparatus 1 can be correlated with a specified target region A1 at the personal computer 20 side.

Also, with the fifth embodiment as well, automatic addition of metadata at the photography apparatus 1 can be performed as well, as with the second embodiment.

Also, while the fifth embodiment has been described with the photographed image data being correlated to the specified target region A1 without change, in the same way as with the first embodiment, filtering described with the third embodiment may be performed as well. In this case, matching condition management information such as shown in FIG. 18 earlier may be included in the template data 13a.

Also, at the photography apparatus 1 side, the position information and point-in-time information of photography is correlated to the photographed image data and saved at the time of saving the photographed image data. Further, photographed image data to which the position information and point-in-time information have been correlated in this case are transferred to and saved at the personal computer 20 side.

Specifically, in the case of applying the filtering according to the third embodiment to the fifth embodiment, the processing of steps S801 through S805 shown in FIG. 28 is executed, and in response to a positive result being obtained in step S805 that a selected image entering operation has been performed, processing the same as the steps S301 through S317 in FIG. 19 is performed. Note however, that the position information obtaining processing in step S303 and the point-in-time information obtaining processing in step 308 will be processing for obtaining the position information and the point-in-time information saved corresponding to the photographed image data as described above.

Following executing the steps S307, S312, and S317, the processing of step S807 shown in FIG. 8 and the subsequent steps is performed.

Also, besides the target region A1 to which the photographed image is to be correlated by being specified by user operations, an arrangement may be made as with the fourth embodiment described earlier, wherein the photographed image data is correlated with the target region A1 automatically by matching. In this case as well, matching condition management information is included in the template data 13a. Also, in this case as well, at the photography apparatus 1 side, the position information and point-in-time information of photography is correlated to the photographed image data and saved at the time of saving the photographed image data, and the photographed image data to which the position information and point-in-time information have been correlated in this case are transferred to and saved at the personal computer 20 side.

In the case of applying the automatic correlation of the fourth embodiment to the fifth embodiment in this way, the personal computer 20 side performs up to specification of the project, and does not specify the target region A1. That is to say, in this case, the user only specifies the protect and the photographed image to be fit in.

Specifically, at the personal computer 20 side in this case, specification of a photographed image to be fit in is accepted in response to a project having been specified, and in response to the photographed image to be fit in having been accepted, matching item confirmation and obtaining of matching reference information is performed for each unphotographed target region A1 within the template of the specified project. Matching is performed according to the confirmed matching item, and in the event that the specified photographed image is an image satisfying the conditions of the matching item, processing for correlating the specified photographed image to the target region A1 (i.e., target region n) is performed.

As for a specific example of the processing operations, in this case, following a desired project having been specified by the user, the processing of step S803 through S805 in FIG. 28 is performed, so as to accept specification of photographed image data to be fit in. In the event that photographed image data has been specified, the processing of steps S407 and S408 in FIG. 22 is performed. Note that the processing of steps S407 and S408 in this case is processing for obtaining the point-in-time information and position information correlated to the photographed image data.

Following having executed the processing of step S804, processing the same as steps S409 through S430 is executed. Note that in this case however, following performing the page data display processing in step S420 or performing no-match notification processing in step S421, the flow returns to step S804 in FIG. 28, thereby enabling specification acceptance of new photographed image data.

Note that while description has been made above regarding an operation example of applying automatic correlation by matching wherein multiple projects can exist within the theme of a single template, but a configuration may be made here as well wherein multiple projects are not permitted, and only one template data 13a exists for the theme of a single template.

As described earlier as well, in this case specification of category→specification of template theme can be done away with, and in this case, matching item confirmation and obtaining of matching reference information is performed for each target region A1 within all templates of all categories, with matching being performed with the photographed image data specified to be fit in.

Also, while a case has been exemplarily illustrated above wherein photographed image data to be fit in is specified by the user, in the event of automatic correlation by matching, specification of the photographed image data to be fit in can be done away with. That is to say, if matching between each photographed image and each target region A1 is performed, specification operation of photographed image data to be fit in can be done away with.

For example, in the event of the user performing up to project specifying operations in a case of permitting multiple projects of the same template to exist, matching is performed between all target regions A1 in the specified project with each photographed image data saved in the HDD 30, and in the event that there is photographed image data satisfying the condition, the photographed image data is correlated with the target region n which is the object of matching.

Also, in the event that multiple projects are not permitted, matching is performed between all target regions A1 in all templates of all categories with each photographed image data saved in the HDD 30, and in the event that there is photographed image data satisfying the condition, the photographed image data is correlated with the target region n which is the object of matching.

Thus, in the event of performing automatic correlation by matching, user operations for specifying the photographed image data to be fit in can be done away with, thereby alleviating the operation load on the user.

Sixth Embodiment

The sixth embodiment enables templates to be shared among different photography apparatuses 1. In this case, photography apparatuses 1 are configured to be capable of wirelessly communicating with external photography apparatuses 1. Specifically, the photography apparatus 1 in this case is configured so as to be capable of wireless communication by Bluetooth or Wi-Fi (Wireless Fidelity) ad hoc mode or the like, besides cable communication via the network terminal TI/F.

Now, with the sixth embodiment, a photography apparatus 1 to serve as a sharing party of a template can be specified, a point which will be described later. Accordingly, the photography apparatuses 1 are assigned ID information so as to enable identification of individual photography apparatuses 1. In this case, the communication unit 12 searches an external photography apparatus 1 with which wireless communication can be performed, and upon a photography apparatus 1 with which wireless communication can be performed being detected, the ID information of this photography apparatus 1 is notified to the system controller 2. Accordingly, the system controller 2 in this case can identify the external photography apparatus 1 with which wireless communication can be performed.

Also, in this case, a sharing template, which can be shared between photography apparatuses 1, is determined. That is to say, at the photography apparatus 1 in this case, processing for sharing a sharing template with the external photography apparatus 1 is executed in response to the sharing template having been specified.

Description will be made with reference to the flowchart in FIG. 30 regarding the processing operations for realizing the operations from specifying of such a sharing template to the specified sharing template being shared with the external photography apparatus 1.

Note that the processing operations shown in these drawings are also executed by the system controller 2 shown in FIG. 2 based on programs stored in the internal ROM or the like, for example. Also, at the time of processing operations shown in FIG. 30 being performed, we will assume that there is already an external photography apparatus 1 in a state capable of wireless communication, and that the system controller 2 has already found out the ID information of this photography apparatus 1.

Figure 30:
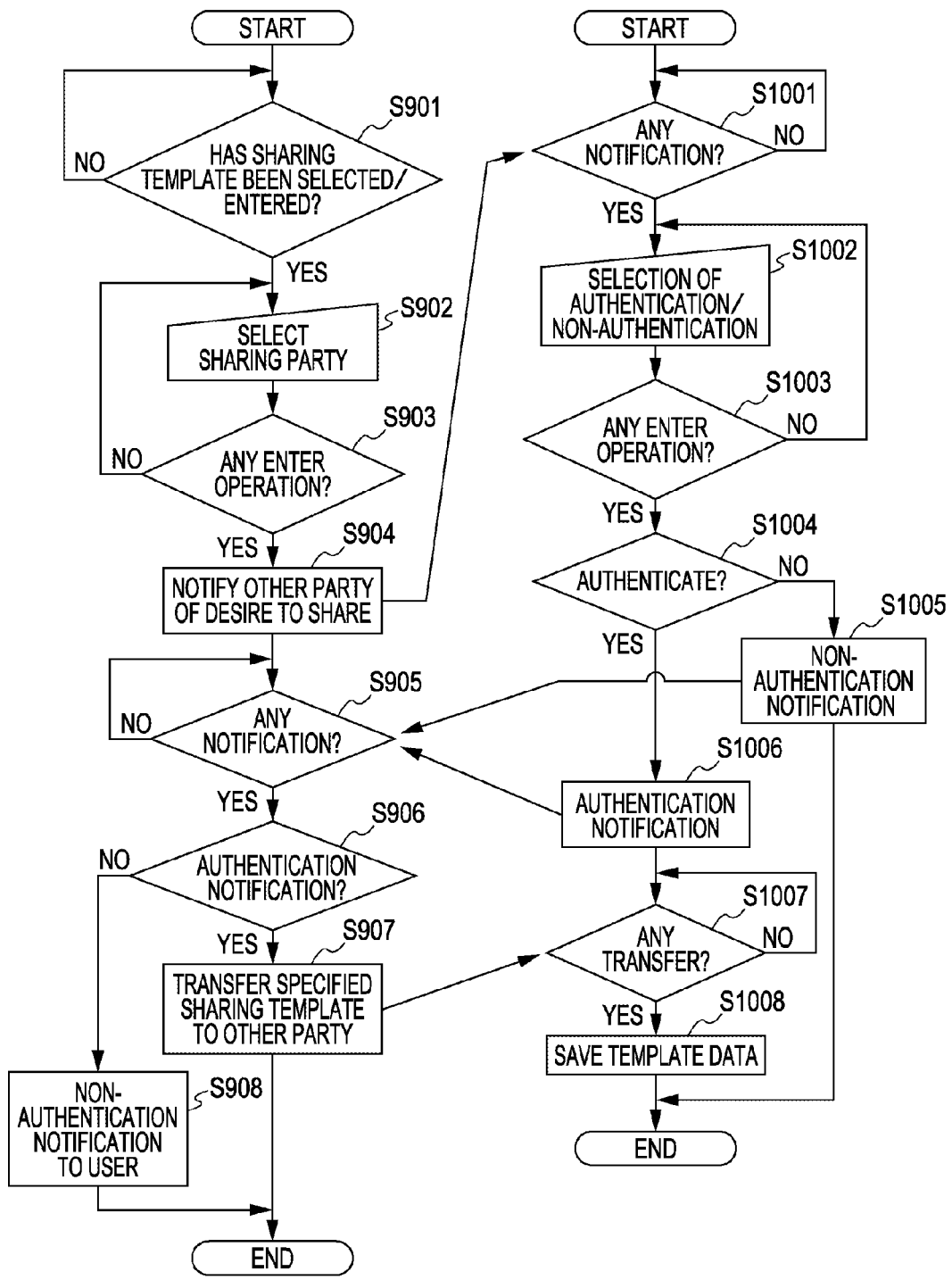
FIG. 30 is a flowchart illustrating processing operations to be executed at the photography apparatus, in a case of implementing the system configuration shown in FIG. 29.

Note that due to limitations of drawings, the illustration in FIG. 30 may seem to imply that the processing operations of the flow shown to the left in the drawing that are to be performed by the photography apparatus 1 (also referred to here as "sharing source photography apparatus 1") which performs notification for sharing to the external photography apparatus 1 and the processing operations of the flow shown to the right in the drawing that are to be performed by the photography apparatus 1 of the other party which accepts communication for sharing are executed by one photography apparatus 1 alone, but each photography apparatus 1 performs its own processing in parallel. That is to say, each photography apparatus 1 can perform operations corresponding to being both the sharing source and the other party, by executing both processing operations.

In FIG. 30, first, at the sharing source photography apparatus 1 side, in step S901 the flow stands by until a sharing template is selected and entered. Upon a sharing template having been selected and entered (specified), processing for accepting specification of a sharing party is executed by the processing in steps S902 and S903.

That is to say, in step S902, the user selects ID information (i.e., the photography apparatus 1 of the other party) by displaying a list of ID information of external photography apparatuses 1 with which wireless communication is available, and a screen display of the cursor CR with which to select ID information from the list, and executing processing for moving the position of the cursor CR by operation of the D-pad. In step S903, determination is made regarding whether or not an enter operation has been performed by the enter key, and in the event that a negative result is obtained that an enter operation has not been performed the flow returns to step S902, while in the event that a positive result is obtained that an enter operation has been performed, the processing proceeds to step S904.

In step S904, processing for performing notification of desire to share is performed to the other party. That is to say, the communication unit 12 performing notification to the photography apparatus 1 of the other party specified by the processing in steps S902 and S903 of the desire to share a template.

The other party photography apparatus 1 side is standing by in step S1001 for such a sharing desire notification. In the event that there is notification of such as sharing desire, processing is executed for accepting specification of authentication/non-authentication by the processing in steps S1002 and S1003. That is to say, in step S1002, the user selects authentication or non-authentication by displaying a display screen including an icon representing "authentication" and an icon representing "non-authentication" and a cursor CR for selecting these icons, and executing processing for moving the position of the cursor CR by operation of the D-pad. In step S1003, determination is made regarding whether or not an enter operation has been performed by the enter key, and in the event that a negative result is obtained that an enter operation has not been performed the flow returns to step S1002, while in the event that a positive result is obtained that an enter operation has been performed, the processing proceeds to step S1004.

In step S1004, determination processing is performed regarding whether authentication has been made or not. That is to say, determination is made regarding whether or not the icon specified by the processing in the steps S1002 and S1003 is "authentication". In the event that a negative result is obtained in step S1004 that authentication has not been specified, a non-authentication notification is given to the sharing source photography apparatus 1 in step S1005. On the other hand, in the event that a positive result is obtained in step S1004 that authentication has been specified, an authentication notification is given to the sharing source photography apparatus 1 in step S1006.

The sharing source photography apparatus 1 side stands by in the processing of step S905 following the above-described step S904, for non-authentication notification in step S1005 or authentication notification in step S1006. In the event that there has been notification one way or the other in step S905, determination processing of whether an authentication or not is performed in step S906.

In the event that a negative result is obtained in step S906 that the notification from the other party was not an authentication notification, in step S908 non-authentication notification is made to the user. An example of non-authentication notification being made to the user is displaying a message to the effect that authentication was not obtained from the other party and accordingly the template cannot be shared.

On the other hand, in the event that a positive result is obtained in step S906 that the notification from the other party was an authentication notification, the flow proceeds to step S907 where processing for transferring the specified sharing template data is transferred to the other party is executed. That is to say, the template data 13a serving as a sharing template specified by the processing in step S901 and S902 is transferred to the other party photography apparatus 1 by the communication unit 12.

The other party photography apparatus 1 is standing by in the processing of step S1007 following the authentication notification processing of the previous step S1006 for such transfer of the template data 13a. In the event that the template data 13a is transferred, in step S1008, saving processing of the template data is executed. That is to say, processing for saving the transferred template data 13a in a suitable recording medium such as the non-volatile memory 13 is executed. Thus, through such processing, the photography apparatus 1 can share templates with an external photography apparatus 1.

Figure 31:
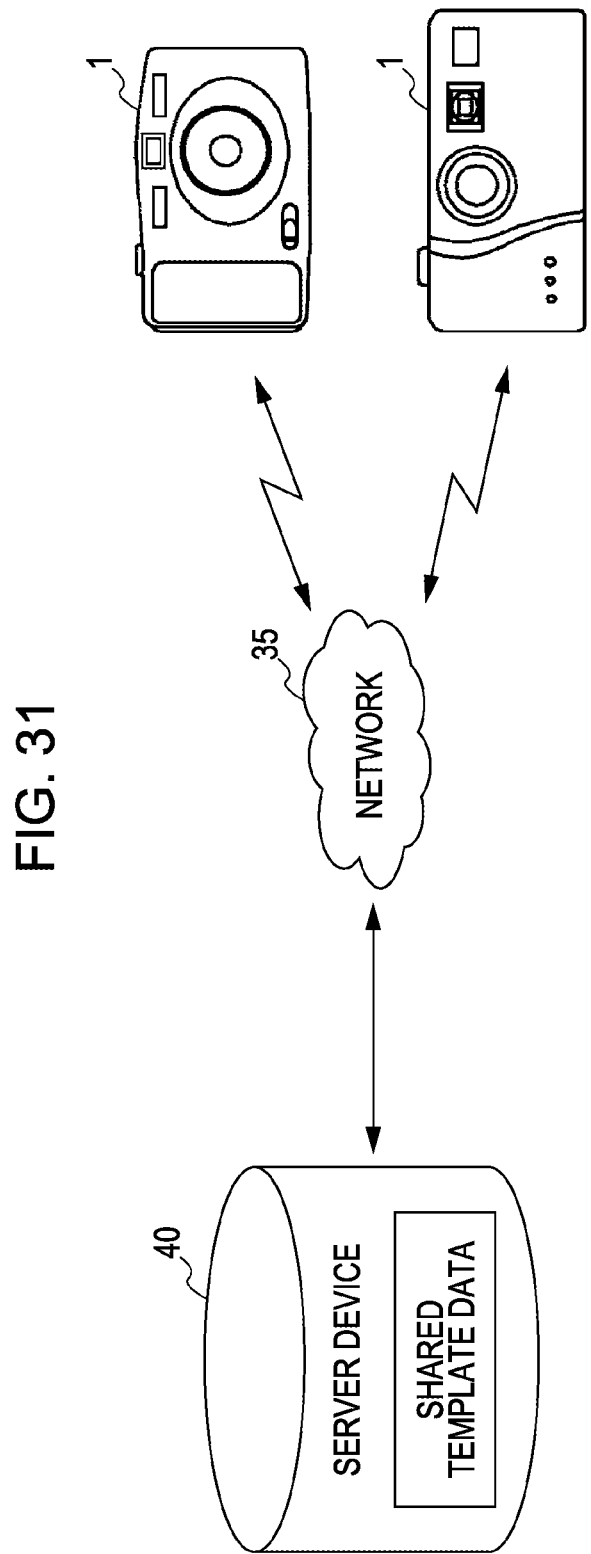
FIG. 31 is a diagram illustrating another system configuration example as the sixth embodiment.

Now, while an example has been described above of operations corresponding to a case wherein the template data serving as the sharing template is held at the photography apparatus 1 side, but an arrangement may be made such as shown in FIG. 31, wherein the photography apparatus 1 does not hold sharing template data, but rather the sharing template data is held in the external server device 40. In this case, each photography apparatus 1 is configured so as to be capable of data communication with the server device 40 via the network 35. Specifically, the communication unit 12 is configured so as to be capable of network communication by Near Field Communication as to a network access point, by wireless LAN (Local Area Network), Bluetooth, or the like.

Description will be made with reference to the flowchart in FIG. 32 regarding the processing operations for sharing templates in the event that the template data for sharing templates is stored at the server device 40 side.

Figure 32:
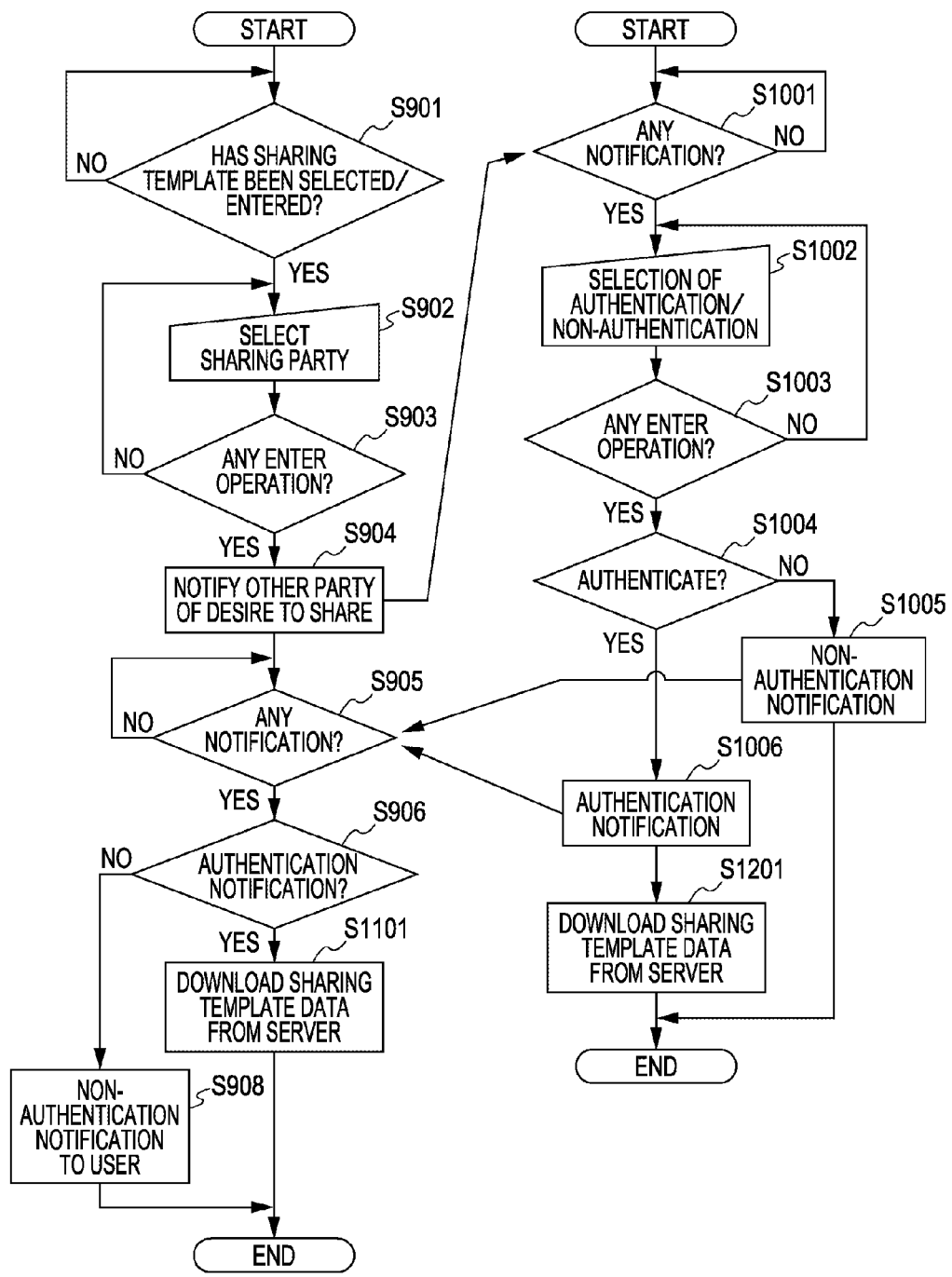
FIG. 32 is a flowchart illustrating processing operations to be executed at the photography apparatus, in a case of implementing the system configuration shown in FIG. 31.

Note that the processing operations shown in these drawings are also executed by the system controller 2 shown in FIG. 2 based on programs stored in the internal ROM or the like, for example, and that at the time of processing operations shown in FIG. 32 being performed, there is already an external photography apparatus 1 in a state capable of wireless communication.

Further, in the same way as with the processing operations in FIG. 30 described earlier, each photography apparatus 1 actually performs processing operations of the flow shown to the left in the drawing of the sharing source photography apparatus 1 and the processing operations of the flow shown to the right in the drawing of the photography apparatus 1 of the other party.

As can be understood by comparing the processing operations shown in FIG. 32 with the processing operations shown in FIG. 30 earlier, the processing of step S1101 I executed at the sharing source photography apparatus 1 side instead of the processing of step S907 in FIG. 30, and the processing of step S1201 is performed at the other party photography apparatus 1 side instead of the processing of step S1007 in FIG. 30.

That is to say, the template data of the sharing template is stored in the server device 40 side, so at the sharing source photography apparatus 1 side, in the event that the notification from the other party is an authentication notification, the template data of the specified sharing data is downloaded and obtained form the server device 40 via the network 35.

In the same way, at the other party photography apparatus 1 side, in response to a having performed authentication notification to the sharing source photography apparatus 1 in accordance with the user having specified "authentication" through user operations, the template data of the relevant sharing template is downloaded and obtained from the server device 40 via the network 35.

Note that in the event that there are multiple types of sharing templates, the other party side uses information regarding which template the template selected and entered (specified) at the sharing source, for downloading the same template data as the sharing source in step S1201. In this case, the sharing source photography apparatus 1 can perform notification of information identifying the specified sharing template along with the notification of desire to share in step S904 for example. The other party photography apparatus 1 side can download the template identified by such a notification form the server device 40 in step S1201.

Note that in the event that the photography apparatuses 1 have functions for connecting to the network 35 as described above, the template data serving as a sharing template can be held at the photography apparatus 1 side. In this case, transferring of the template data from the sharing source to the other party can be performed via the network 35.

With the description made so far, a case of sharing templates before creating a project from a template has been exemplarily illustrated, but a project created from a template can also be shared.

Specifically, in such a case, a project regarding which fitting of photographed images to all target regions A1 has been completed is transferred to another user (photography apparatus 1) by wireless transmission for example, in accordance with operation input. Alternatively, this may be uploaded to a server device of a service provider, such as the server device 40, via the network 35. The uploaded project is usable by other user devices, and accordance the completed project can be shared with other users. Also, protects partly created can also be shared with other photography apparatuses 1 with the same technique.

According to the sixth embodiment as described above, templates can be shared with external photography apparatuses 1. Sharing the templates yields the following advantages. For example, users of photography apparatuses 1 sharing the same template can perform photography as to the same theme, so the users can compare and enjoy photographed images following photography, learn photography techniques of other users, and so forth, thereby promoting communication.

Also sharing templates enables the following templates to be realized. For example, an arrangement may be made wherein, with a "stamp rally" template illustrated exemplarily earlier in the "game" category, only the first image photographed satisfying the conditions is correlated to the target region A1. In this case, the users of the photography apparatuses 1 perform photography of images following (satisfying) the instruction of the target region A1, but only the first-taken image is taken as an image satisfying the conditions. That is to say, with such a template, gaming nature can be provided by competing among users how quickly an image can be photographed satisfying the instructions, further improving entertainment.

Now, in order to realize such a template, there is the need to share photographed images among the photography apparatuses 1. Processing operations performed for realizing this template, including processing for sharing photographed images in real-time among the photography apparatuses 1, will be described with reference to the flowchart in FIG. 33.

Note that the processing operations shown in these drawings are also executed by the system controller 2 shown in FIG. 2 based on programs stored in the internal ROM or the like, for example. Also, in the same way as with the processing operations in FIGS. 30 and 32 described earlier, each photography apparatus 1 actually performs processing operations of the flow shown to the left in the drawing of the sharing source photography apparatus 1 and the processing operations of the flow shown to the right in the drawing of the photography apparatus 1 of the other party. Further, at the time of processing operations shown in FIG. 33 being performed, there is already a sharing template being shared among the external photography apparatuses 1.

First, the sharing source photography apparatus 1 to the left in the drawing stands by in step S1301 until photography is performed with the target region A1 within the sharing template specified. That is to say, the sharing source photography apparatus 1 stands by until a sharing template is specified, a target region A1 in the sharing template is specified, and an operation for photographing an image to be fit into the target region A1 (shutter operation) is performed.

Note that the flow of specification of the template (project) →specification of target region A1→standby for shutter operation may be the same as that described with the first embodiment.

In the following step S1302, photographed image acquisition processing is executed, and then in the following step S1303, matching processing is executed. That is to say, matching is performed regarding position, point-in-time, or image similarity, for example, for determining whether or not the acquired photographed image data satisfies the predetermined conditions, based on the matching item and matching reference information correlated with the target region A1. For example, with "position", the processing of steps S301 through S304, with "point-in-time", the processing of steps S301 through S309, and with "image similarity", the processing of steps S301 through S314, described with the third embodiment, will be executed.

In the following step S1304, determination processing is made regarding whether or not the conditions are satisfied, and in the event that a negative result is obtained that the conditions are not satisfied, the following steps S1305 through S1308 are skipped. On the other hand, in the event that a positive result is obtained that the conditions are satisfied, updating processing of the correlation management information is executed in step S1306 after having performed saving processing of the acquired image in step S1305. That is to say, the contents of the correlation management information are updated such that the saved photographed image is correlated with the specified target region A1.

In the following step S1307, processing is executed for transferring the target ID of the specified target region A1 and the photographed image (the photographed image data saved in step S1305) to the photography apparatus 1 of the other party. That is to say, the target ID of the specified target region A1 and a photographed image satisfying the conditions are transferred to the other party, so the photographed image is correlated to the target region A1 at the other party as well.

The other party photography apparatus 1 stands by in step S1401 for information transfer from the sharing source photography apparatus 1. In the event that there is an information transfer from the sharing source, in step S1402 first a reception notification is made to the sharing source. In the following step S1403 saving processing is executed form the transferred photographed image data, and in step S1404, processing is executed for updating the contents of the correlation management information so that the saved photographed image data is correlated with the target region A1 specified by the transferred target ID.

The sharing source photography apparatus 1 stands by in step S1308 for reception notification made in step S1402, and in the event that there has been a reception notification, goes to subsequent processing accordingly. Note that for processing following step S1308, processing may be performed wherein a message or the like is displayed to the effect that the image which the user of the hearing source photography apparatus 1 has photographed has been fit in the specified target region A1, such as a message of "the image which you photographed has been applied", for example, following which the flow returns to step S1301. In fact, for the processing following step S1308, processing suitable for the actual embodiment should be executed.

Also, at the other party side, following executing the processing in step S1404, the flow may return to step S1401 for example, but for this was well, processing suitable for the actual embodiment should be executed.

It should be noted that in this case, a target region A1 regarding which a photographed image has already been correlated should be made to where specification thereof cannot be made any longer. Thus, performing the processing operations shown in FIG. 33 enables only the first image photographed satisfying the conditions that is taken by the multiple photography apparatuses 1 to be correlated to the target region A1.

In this case as well, in the event that there are multiple types of sharing templates, information indicating which sharing template will also be transferred to the other party photography apparatus 1.

Also, with the processing described according to 33, the photographed images can be shared among the photography apparatuses 1. Various templates wherein photographed images are shared in real time can be conceived, other than templates for stamp rallies as described above.

For example, an arrangement may be conceived wherein no filtering is performed on the photographed images, and the photographed image is transferred to the other party and correlated to the relevant target region A1 of the sharing template. In this case, the processing of steps S1303 and S1304 can be omitted form the processing operations shown in FIG. 33.

Alternatively, for a template wherein photographed images are shared in real time, a template may be conceived wherein specification reception of a target region A1 is not performed, and automatic searching of a target region A1 to which the photographed image should be correlated is performed as with the fourth embodiment. In this case, processing is executed in step S1301 in FIG. 33 to standby until a sharing template (project) is specified and shutter operations are performed. Also, following acquisition of the photographed image, instead of the processing of steps S1304 through S1306, confirmation of the matching item and matching conditions is made for each target region A1 within the specified template, and determination processing is performed regarding whether or not the conditions are satisfied. In the event that there is a target region A1 satisfying the conditions, the acquired image is saved, and processing for correlating the saved image to the target region A1 (updating processing of the correlation management information) is executed.

It should be noted that specification of the target region A1 is not performed in this case, so with the processing in step S1307, information indicating the specified sharing template is transferred to the other party instead of the target ID information of a specified target region A1. Also, in this case, at the other party photography apparatus 1 side, the processing for automatic searching for the target region A1 described above is inserted between steps S1403 and S1404.

Modifications

While embodiments of the present invention have been described, the present invention is by no way restricted to the specific examples described so far. For example, categories and themes of templates are not restricted to those exemplarily illustrated above, and various other arrangements can be conceived. The following is a few examples.

Category "interests": the user can freely decide the subject, and can automatically or manually determine the layout of the photographed images within the templates in accordance with the subject. At this time, the display format and so forth of the template can be dynamically changed using ambient environment information and metadata added to the photographed image. A template display format suitable for viewing and organizing photographs of interests and collections is automatically created.

Examples of themes for such templates might include "railway photo collection", "gourmet report", and so forth. In this case, one set of instruction information is correlated to one template, and in the event of the "railway photo collection" for example, text information of "railway photos" for example would serve as the instruction information.

Category "family history": a template (category) used of photographing family members of the user, such as children, over a long period of time, to accumulate an album of photographs of daily growth and milestones in their lives. Automatic layout centered on people, using facial detection technology, automatic insertion of birthday effects and so forth by user input, and so forth, can be performed.

Also, while a case has been described so far wherein the instruction information is fixed information, the contents of the instruction information can be updated by word of mouth and local information obtained from SNS (social networking services) and blogs and the like. Thus, using word of mouth and local information obtained from a network as instruction information for the category "travel guide" may present a user with various information that is different from a general travel guidebook.

Also, in the event of a connection to a network being available, information such as the weather, news, and so forth, at the timing at which the image was taken, can be obtained from the network, with such information being correlated to the photographed image data (target region A1) within the template. Specifically, in this case, at the timing at which an image to be fit into the specified target region A1 is taken, information may be obtained from a predetermined server device on then network 35, with the information contents of the display data layout management information being updated such that the obtained information is correlated to the specified target region A1.

Note that information such as weather and so forth is information which does not change in the matter of a day or so, so even in the event that a network is not available for access at the timing at which the image was photographed and the information is not obtained, the information can be obtained and the display data layout management information can be updated at a later time when a network is available.

Also, an arrangement may be made wherein the user can register keywords and the like beforehand regarding topics in which the user is interested, for information to be obtained from the network and correlated with images in the template, so as to obtain and correlate only information matching the keywords.

Figure 34B:
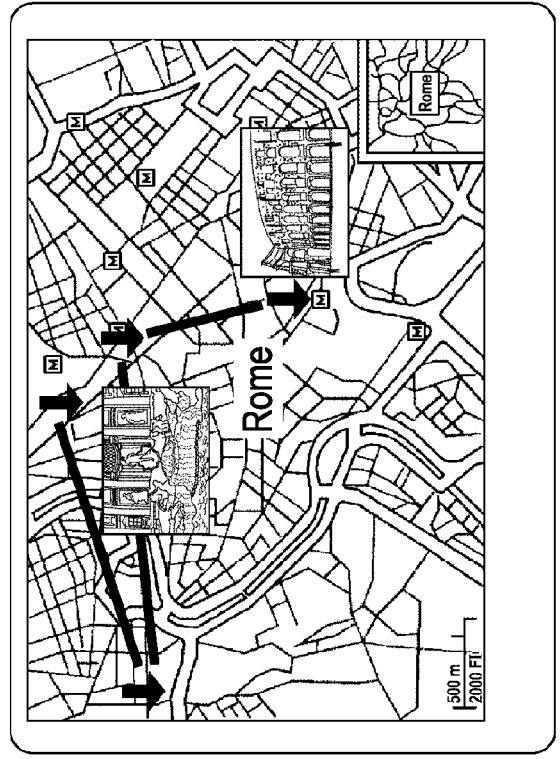
FIGS. 34A and 34B are diagrams illustrating a modification of a template display format.
Figure 34A:
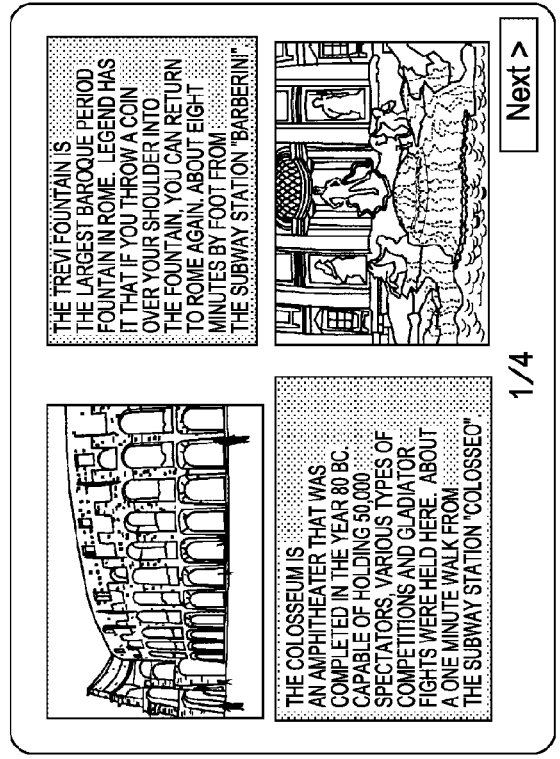

Also, while examples of display forms of templates have been shown in FIGS. 10, 11, and 13, other various forms may be conceived, such as the forms shown in FIGS. 34A and 34B, for example.

FIG. 34A illustrates an example wherein the location display region A3 (map, aerial photo, etc.) has been excluded from the screen shown in FIG. 13, so as to have a photograph+description text mode. In the example in this drawing, the space vacated by the location display region A3 having been omitted is used to distribute two sets of target region A1 and text display region A2 (instruction information) on one page.

FIG. 34B illustrates a map+photograph mode wherein a map or aerial photograph is displayed generally over the entire face, with photographed images (target region A1) being placed at positions corresponding to the locations of the target subjects in the map. In this case, positions of the target subjects displayed on the map (or aerial photograph) and the sample images (and/or predetermined text information) fit to the target regions A1 function as instruction information.

Also, the display form of the templates may be switched among multiple display forms. In this case, buttons (icons) for instructing switching of display may be provided on the screen for example, with the display form being switched in accordance with the icons being selected and entered.

Also, while an example has been exemplarily illustrated of a case wherein all the user can view all pages within a template by operating the page-turn button B1 displayed within the template, page viewing can be restricted, such as a next page becoming viewable only after all target regions A1 before that being having been filled in first. Such restrictions in page viewing of templates would further improve entertainment with "game" templates and the like. Also, this would increase the desire of the user to know what is to be photographed on the next page, increasing motivation of the user to take pictures.

Also, description has been made so far regarding an arrangement wherein created projects (templates) are saved as template data 13a, with the photographed image data and management information such as display data layout management information and correlation management information saved separately. Created projects saved in the form of the template data 13a can be viewed with an external device in which a compatible application has been installed, but not with an external device in which a compatible application has to been installed. Accordingly, a function may be provided where created projects are converted into file formats with versatility, such as commonly-used JPEG or MPEG (Moving Pictures Experts Group) still image or moving image files, to be handled as regular contents.

In this case, data of each page of the project is generated based on the photographed image data and the management information at the device which correlates the photographed image data with the target region A1, such as the photography apparatus 1 for example, and converts the data into multiple JPEG files, or a moving image MPEG file for displaying multiple pages of data in slideshow fashion, for example.

Also, with the description so far, cases have been primarily exemplarily illustrated wherein photographed image data acquired and saved based on shutter operations is correlated with templates and managed, as the photography mode, but a normal photography mode may be provided wherein the photographed image data is saved without being correlated with templates, such as the photographed image data acquired based on shutter operations being stored in a predetermined folder or the like.

In this case, the system controller may performing switching processing of these modes in accordance with predetermined conditions set for mode switching beforehand being established, such as a switching operation element for switching between a template photography mode/normal photography mode being operated, operating buttons (icons) for switching between the modes provided on the menu screen being selected and entered, and so forth.

Also, with the description so far, an arrangement has been exemplarily illustrated wherein correlation between the target region A1 and the photographed image data is performed separately using correlation management information, but an arrangement may be made wherein the correlation management information is omitted, and the display data layout management information directly manages whether or not there is photographed image data to be fit to each target region A1, and the saving destination of the photographed image data.

Also, in the case of performing automatic fitting by filtering and matching as with the third and fourth embodiments in particular, description has been made that photographed images not satisfying conditions are not saved, but an arrangement may be made wherein the photographed image data is saved but is not correlated with the target region A1.

Also, with the fifth embodiment, description has been made that only saving of photographed images is performed at the photography apparatus 1 side and correlation of the target region A1 and the photographed images is performed at the personal computer 20 side, but an arrangement may be made wherein the processing of the personal computer 20 side is performed at the photography apparatus 1 side.

That is to say, while the photography apparatus 1 performs up to saving of photographed images in the photography mode, a correlation mode is provided wherein processing for viewing a specified template→reception of specification of a target region A1→reception of instruction of a photographed image to be fit to the specified target region A1→correlation of the specified photographed image as to the specified target data A1. Processing operations in such a correlation mode may be the same as the processing operations in FIG. 28.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising: circuitry configured to receive a request for selecting one of a plurality of image-data templates by a first client terminal, wherein the image-data template comprises an image-data filling region;

receive image data by the first client terminal;

detect metadata information of the image data based on the image-data template, wherein the metadata information includes at least one piece of information of a place, a time, an image color, an object, or a face; and separately provide the image-data template and the image data based on the metadata information corresponding to the image-data template to a second client terminal.

2. The information processing apparatus according to claim 1, wherein the image data is provided to the second client terminal wirelessly or via a network.

3. The information processing apparatus according to claim 1, wherein the image data is disposed at the image-data filling region based on image-filling instructions associated with the image-data template.

4. The information processing apparatus according to claim 1, wherein the circuitry is further configured to:

filter the image data with image-filling instructions associated with the image-data template.

5. The information processing apparatus according to claim 1, wherein the face information including tag information indicating that the image data associated with the face information is to be filled in the image-data filling region.

6. A method performed by circuitry, comprising:

receiving a request for selecting one of a plurality of image-data templates by a first client terminal, wherein the image-data template comprises an image-data filling region;

receiving image data by the first client terminal;

detecting metadata information of the image data based on the image-data template, wherein the metadata information includes at least one piece of information of a place, a time, an image color, an object, or a face; and separately providing the image-data template and the image data based on the metadata information corresponding to the image-data template to a second client terminal.

7. The method according to claim 6, wherein the image data is provided to the second client terminal wirelessly or via a network.

8. The method according to claim 6, wherein the image data is disposed at the image-data filling region based on image-filling instructions associated with the image-data template.

9. The method according to claim 6, further comprising:

filtering the image data with image-filling instructions associated with the image-data template.

10. The method according to claim 6, wherein the face information including tag information indicating that the image data associated with the face information is to be filled in the image-data filling region.

11. A non-transitory computer-readable recording medium storing a program which, when executed by circuitry, causes the circuitry to perform:

receiving a request for selecting one of a plurality of image-data templates by a first client terminal, wherein the image-data template comprises an image-data filling region;

receiving image data by the first client terminal;

detecting metadata information of the image data based on the image-data template, wherein the metadata information includes at least one piece of information of a place, a time, an image color, an object, or a face; and separately providing the image-data template and the image data based on the metadata information corresponding to the image-data template to a second client terminal.

* * * * *